United States Patent
Yamada et al.

(10) Patent No.: US 8,457,151 B2
(45) Date of Patent: Jun. 4, 2013

(54) MOBILE STATION DEVICE, BASE STATION DEVICE, MOBILE STATION DEVICE OPERATING FREQUENCY BAND MAPPING METHOD, LOCATION MANAGEMENT DEVICE, MOBILE STATION DEVICE LOCATION REGISTRATION METHOD, PAGING METHOD, AND PROGRAM FOR EXECUTING THE SAME AND RECORDING MEDIUM

(75) Inventors: Shohei Yamada, Chiba (JP); Wahoh Oh, Chiba (JP); Keiichi Hibi, Matsudo (JP)

(73) Assignee: Sharp Kabushiki Kaisha, Osaka (JP)

( * ) Notice: Subject to any disclaimer, the term of this patent is extended or adjusted under 35 U.S.C. 154(b) by 825 days.

(21) Appl. No.: 12/420,505

(22) Filed: Apr. 8, 2009

(65) Prior Publication Data

US 2009/0190534 A1    Jul. 30, 2009

Related U.S. Application Data

(62) Division of application No. 12/083,049, filed on Apr. 3, 2008.

(30) Foreign Application Priority Data

Oct. 4, 2005  (JP) .................................. 2005-290707
Nov. 2, 2005  (JP) .................................. 2005-319363

(51) Int. Cl.
*H04L 12/43* (2006.01)

(52) U.S. Cl.
USPC ........... 370/458; 370/310; 370/311; 370/328; 370/330; 370/345; 370/347; 370/350; 370/436

(58) Field of Classification Search
None
See application file for complete search history.

(56) References Cited

U.S. PATENT DOCUMENTS

| | | | | |
|---|---|---|---|---|
| 5,515,366 | A | * | 5/1996 | Chieu et al. .................. 370/347 |
| 6,044,069 | A | * | 3/2000 | Wan .............................. 370/311 |
| 6,138,034 | A | * | 10/2000 | Willey .......................... 455/522 |
| 6,438,375 | B1 | | 8/2002 | Muller et al. |
| 2001/0028637 | A1 | | 10/2001 | Abeta et al. |
| 2002/0105960 | A1 | * | 8/2002 | Das et al. ...................... 370/442 |
| 2003/0114177 | A1 | | 6/2003 | Sinnarajah et al. |

(Continued)

FOREIGN PATENT DOCUMENTS

| | | |
|---|---|---|
| CN | 1572094 A | 1/2005 |
| EP | 1906689 A1 | 4/2008 |

(Continued)

OTHER PUBLICATIONS

Ericsson, "Paging Mechanism in E-UTRAN," 3GPP TSG-RAN WG2 (Radio Meeting #54, Tallinn, Estonia, Aug. 28-Sep. 1, 2006. R2-062128, XP050131748.*

(Continued)

*Primary Examiner* — Jason Mattis
*Assistant Examiner* — James P Duffy
(74) *Attorney, Agent, or Firm* — Birch, Stewart, Kolasch & Birch, LLP

(57) ABSTRACT

In a method for mapping an operating frequency band of a mobile station device in a mobile communication system, an operating frequency band position at the time of idle mode of respective mobile station devices is arranged so as to be distributed throughout a unique frequency bandwidth of a base station device.

9 Claims, 39 Drawing Sheets

U.S. PATENT DOCUMENTS

| | | |
|---|---|---|
| 2003/0203735 A1 | 10/2003 | Andrus et al. |
| 2003/0224731 A1 | 12/2003 | Yamaura et al. |
| 2004/0156386 A1 | 8/2004 | Atarashi et al. |
| 2004/0196803 A1 | 10/2004 | Yi et al. |
| 2004/0266445 A1 | 12/2004 | Burgess et al. |
| 2005/0070283 A1 | 3/2005 | Hashimoto et al. |
| 2005/0085236 A1 | 4/2005 | Gerlach et al. |

FOREIGN PATENT DOCUMENTS

| | | |
|---|---|---|
| EP | 2066462 A1 | 6/2009 |
| JP | 2001-069167 A | 3/2001 |
| JP | 2001-237803 | 8/2001 |
| JP | 2002-077990 A | 3/2002 |
| JP | 2002-538744 A | 11/2002 |
| JP | 2003-249908 A | 9/2003 |
| JP | 2003-250000 A | 9/2003 |
| JP | 2004-297756 A | 10/2004 |
| JP | 2005-500762 A | 1/2005 |
| JP | 2005-45778 A | 2/2005 |
| JP | 2005-109570 A | 4/2005 |
| JP | 2005-512432 A | 4/2005 |
| JP | 2005-130491 A | 5/2005 |
| JP | 2005-524366 | 8/2005 |
| JP | 2005-532709 A | 10/2005 |
| JP | 2006-352381 | 12/2006 |
| WO | WO-00/52948 | 9/2000 |
| WO | WO 03/017693 A2 | 2/2003 |
| WO | WO03/017693 A3 | 2/2003 |
| WO | WO 03/049483 A1 | 6/2003 |
| WO | WO 03/058989 A1 | 7/2003 |
| WO | WO-03/094568 | 11/2003 |
| WO | 2004/013978 A2 | 2/2004 |
| WO | WO 2007/128712 A1 | 11/2007 |
| WO | WO 2008/022782 A1 | 2/2008 |

OTHER PUBLICATIONS

3GPP TS 25.211 V6.4.0 (Mar. 2005), Physical channels and mapping of transport channels onto physical channels.

Tachikawa, "W-CDMA Mobile Communications Systems", ISBN4-621-04894-5, pp. 103-106, 114-115.

3GPP TR (Technical Report) 25.858, and 3GPP documents related to HSDPA specifications.

3GPP TR (Technical Report) 25.913, V2.1.0 (May 2005), Requirements for evolved Universal Terrestrial Radio Access (UTRA) and Universal Terrestrial Radio Access Network (UTRAN).

3GPP R1-050592 NTT DoCoMo "Physical Channel Concept for Scalable Bandwidth in Evolved UTRA Downlink".

Sharp, "Monitoring of Paging Information for Evolved UTRA Scalable Bandwidth", 3GPP TSG RAN WG1 #43, Nov. 7-11, 2005, pp. 1-4, R1-051340, Seoul, Korea, XP050100937, ("last modified" at 3GPP ftp site on Nov. 1, 2005).

3GPP TS 04.08, No. V6.21.1 (Sep. 2003). "3rd Generation Partnership Project; Technical Specification Group Core Network; Digital cellular telecommunications system (Phase 2+); Mobile radio interface layer 3 specification," 3GPP Standard; Mobile Competence Centre (Release 1997), (Sep. 1, 2003, pp. 1-633.

Ericsson, "Paging Mechanism in E-UTRAN," 3 GPP TSG-RAN-WG2 (Radio) Meeting #54, Tallinn, Estonia, Aug. 28-Sep. 1, 2006, R2-062128, France, vol. RAN WG2, XP050131748, Retrieved Aug. 23, 2006.

Qualcomm Europe, "Detailed proposal for Nl mapping," 3GPP TSG-RAN1 #37b (Ref-6 AH), Jun. 21-24, 2004, Cannes, France, R1-04-0714, 3rd Generation Partnership Project (3GPP), Mobile Competence Centre, vol. RAN WG1, XP050112126, Retrieved Jun. 19, 2004.

Richards, 3GPP TSG RAN WG2 LTE Ad-Hoc, "Shared Channels, IP Based QoS Etc.," IPWireless, Generations Ahead, Jun. 20-21, 2005, Sophia Antipolis, France, R2-051711. pp. 1-14.

Sharp, "Physical Allocation of PCH for 20MHz Operating Bandwidth," 3GPP TSG-RAN WG1 LTE Ad-Hoc, Cannes, France, Jun. 27-30, 2006, RI-061683 (PCH), vol. RAN WG1, pp. 1-6, XP050111515, Retrieved Jun. 20, 2006.

3GPP TS 04.08 V6.21.0 (Jul. 2003), Technical Specification Group Core Network: Mobile Radio Interface Layer 3 Specification (Release 1997), Jul. 2003, pp. 317 and 393.

3GPP TSG RAN WG2 LTE Ad-Hoc Jun. 20-21, 2005, "Shared Channels IP Based QoS Etc.", Sophia Abtiolis, France, R2-051711, Derek Richards.

\* cited by examiner

FIG. 10

| | TTL_0 | TTL_1 | TTL_2 | | | | | | | | | | | | | ..... | | | | | | | | |
|---|---|---|---|---|---|---|---|---|---|---|---|---|---|---|---|---|---|---|---|---|---|---|---|---|
| F_0 | 0 | 16 | 32 | 48 | 64 | 80 | 96 | 112 | 128 | 144 | 160 | 176 | 192 | 208 | 224 | 240 | 256 | 272 | 288 | 304 |
| F_1 | 1 | 17 | 33 | 49 | 65 | 81 | 97 | 113 | 129 | 145 | 161 | 177 | 193 | 209 | 225 | 241 | 257 | 273 | 289 | 305 |
| F_2 | 2 | 18 | 34 | 50 | 66 | 82 | 98 | 114 | 130 | 146 | 162 | 178 | 194 | 210 | 226 | 242 | 258 | 274 | 290 | 306 |
| | 3 | 19 | 35 | 51 | 67 | 83 | 99 | 115 | 131 | 147 | 163 | 179 | 195 | 211 | 227 | 243 | 259 | 275 | 291 | 307 |
| | 4 | 20 | 36 | 52 | 68 | 84 | 100 | 116 | 132 | 148 | 164 | 180 | 196 | 212 | 228 | 244 | 260 | 276 | 292 | 308 |
| | 5 | 21 | 37 | 53 | 69 | 85 | 101 | 117 | 133 | 149 | 165 | 181 | 197 | 213 | 229 | 245 | 261 | 277 | 293 | 309 |
| | 6 | 22 | 38 | 54 | 70 | 86 | 102 | 118 | 134 | 150 | 166 | 182 | 198 | 214 | 230 | 246 | 262 | 278 | 294 | 310 |
| .... | 7 | 23 | 39 | 55 | 71 | 87 | 103 | 119 | 135 | 151 | 167 | 183 | 199 | 215 | 231 | 247 | 263 | 279 | 295 | 311 |
| | 8 | 24 | 40 | 56 | 72 | 88 | 104 | 120 | 136 | 152 | 168 | 184 | 200 | 216 | 232 | 248 | 264 | 280 | 296 | 312 |
| | 9 | 25 | 41 | 57 | 73 | 89 | 105 | 121 | 137 | 153 | 169 | 185 | 201 | 217 | 233 | 249 | 265 | 281 | 297 | 313 |
| | 10 | 26 | 42 | 58 | 74 | 90 | 106 | 122 | 138 | 154 | 170 | 186 | 202 | 218 | 234 | 250 | 266 | 282 | 298 | 314 |
| | 11 | 27 | 43 | 59 | 75 | 91 | 107 | 123 | 139 | 155 | 171 | 187 | 203 | 219 | 235 | 251 | 267 | 283 | 299 | 315 |
| | 12 | 28 | 44 | 60 | 76 | 92 | 108 | 124 | 140 | 156 | 172 | 188 | 204 | 220 | 236 | 252 | 268 | 284 | 300 | 316 |
| | 13 | 29 | 45 | 61 | 77 | 93 | 109 | 125 | 141 | 157 | 173 | 189 | 205 | 221 | 237 | 253 | 269 | 285 | 301 | 317 |
| | 14 | 30 | 46 | 62 | 78 | 94 | 110 | 126 | 142 | 158 | 174 | 190 | 206 | 222 | 238 | 254 | 270 | 286 | 302 | 318 |
| F_15 | 15 | 31 | 47 | 63 | 79 | 95 | 111 | 127 | 143 | 159 | 175 | 191 | 207 | 223 | 239 | 255 | 271 | 287 | 303 | 319 |

(CALCULATION EXAMPLE) SPECIFICATION OF IM GROUP (IMSI/32 mod 16)

IMSI mod 512 = 010100010

SELECTED POSITION OF BAND    PI GROUP NUMBER (IMSI mod 32)
FOR 5 MHz (00, 01, 10, 11)    32 GROUPS OF PI ARE ALLOCATED
(IMSI/128 mod 4)    TO PI RECEPTION BAND (A)

(B)

| ID | FREQUENCY BANDWIDTH ABILITY OF MOBILE STATION |
|----|------------------------------------------------|
| 0  | 1.25MHz |
| 1  | 2.5MHz |
| 2  | 5MHz |
| 3  | 10MHz |
| 4  | 15MHz |
| 5  | 20MHz |

MOBILE STATION DEVICE, BASE STATION DEVICE, MOBILE STATION DEVICE OPERATING FREQUENCY BAND MAPPING METHOD, LOCATION MANAGEMENT DEVICE, MOBILE STATION DEVICE LOCATION REGISTRATION METHOD, PAGING METHOD, AND PROGRAM FOR EXECUTING THE SAME AND RECORDING MEDIUM

This application is a Divisional of co-pending application Ser. No. 12/083,049, filed on Apr. 3, 2008, the entire contents of which are hereby incorporated by reference and for which priority is claimed under 35 U.S.C. §120.

TECHNICAL FIELD

The present invention relates to a mobile station device, a base station device, a mobile station device operating frequency band mapping method, and a program for executing the method and a recording medium, and more particularly, to a technology of specifying operating frequency band positions adapted to mobile station devices in a mobile communication system with mobile station devices at different frequency bandwidth Bn (e.g., Bn=1.25 MHz, 2.5 MHz, 5 MHz, 10 MHz, 20 MHz) mobile station classes and a base station device, and mobile station devices location registration and paging technologies adapted to a location information management device that manages location information of the mobile station devices.

BACKGROUND OF THE INVENTION

In 3GPP (3rd Generation Partnership Project), W-CDMA (Wideband Code Division Multiple Access) mode is standardized as a third-generation cellular mobile communication mode and the service is sequentially started (see, e.g., non-patent document 1). One CDMA mode is a spread spectrum mode of FDD with 5-MHz radio frequency bandwidth, and radio physical channels are differentiated by spread codes and code-multiplexed for transmission in the same radio frequency bandwidth.

The W-CDMA mode includes a radio link from the mobile station to the base station (hereinafter, uplink) and a radio link from the base station to the mobile station (hereinafter, downlink). The uplink and the downlink include logical channels (Logical Channel) at SAP (Service Access point) between a layer 3 and a layer 2, transport channels (Transport Channel) for providing service from a layer 1 to the layer 2, and physical channels (Physical Channel) defined as a transmission channel between radio nodes (base station and mobile station) of the layer 1 for implementing transmission through the transport channel with the use of an actual radio transmission path (see, e.g., non-patent document 2).

The physical channels of the downlink of the W-CDMA are a common pilot channel CPICH (Common Pilot Channel), a synchronization channel SCH (Synchronisation Channel), a paging indicator channel PICH (Paging Indicator Channel), a primary common control physical channel P-CCPCH (Primary Common Control Physical Channel), a secondary common control physical channel S-CCPCH (Secondary Common Control Physical Channel), a downlink dedicated physical data channel DPDCH (Dedicated Physical Data Channel), a downlink dedicated physical control channel DPCCH (Dedicated Physical Control Channel), an acquisition indicator channel AICH (Acquisition Indicat Channel), etc.

The physical channels of the uplink of the W-CDMA are a physical random access channel PRACH (Physical Random Access Channel), an uplink dedicated physical data channel DPDCH, and an uplink dedicated physical control channel DPCCH.

In the downlink of the W-CDMA, the primary common control physical channel P-CCPCH includes a broadcast channel BCH (Broadcast Channel) of the transport channel, and the secondary common control physical channel S-CCPCH includes a forward access channel FACH (Forward Access Channel) and a paging channel PCH (Paging Channel). The downlink dedicated physical data channel DPDCH includes a downlink dedicated channel DCH (Dedicated Channel) of the transport channel.

In the uplink of the W-CDMA, the physical random access channel PRACH includes a random access channel RACH (Random Access Channel) of the transport channel, and the uplink dedicated physical data channel DPDCH includes an uplink dedicated channel DCH (Dedicated Channel).

A high-speed downlink packet wireless access HSDPA (High Speed Downlink Packet Access) (non-patent document 3) mode is standardized that applies the downlink of the W-CDMA mode to high-speed packet communication.

The downlink physical channels of the HSDPA mode are a high-speed physical downlink shared channel HS-PDSCH (High Speed Physical Downlink Shared Channel) and an HS-DSCH-related shared control channel HS-SCCH (HS-DSCH-related Shared Control Channel).

The uplink physical channels of the HSDPA mode includes an HS-DSCH-related uplink dedicated physical control channel HS-DPCCH (Dedicated Physical Control Channel for HS-DSCH).

In the downlink of the HSDPA, the high-speed physical downlink shared channel HS-PDSCH includes a high-speed downlink shared channel HS-DSCH (High Speed Downlink Shared Channel) of the transport channel.

The outline of the major physical channels and transport channels of the W-CDMA will then briefly be described.

The common pilot channel CPICH is a downlink common channel existing in each cell and is mainly used for propagation path status estimation (Channel Estimation) of downlink channels, cell selection for mobile stations (Cell Search), and timing reference of other downlink physical channels in the same cell, etc.

The synchronization channel SCH is a downlink common channel existing in each cell and is used in the initial stage of the mobile-station cell search.

The paging indicator channel PICH is a downlink common channel forming a pair with a paging channel PCH (Paging Channel) of the transport channel corresponding to the secondary common control physical channel S-CCPCH having a paging signal mapped thereon and transmits the presence or absence of voice-call (CS: Circuit Switch) or packet-call (PS: Packet switch) incoming-call information for incoming call groups that are groups of mobile stations. When a mobile station belonging to an incoming call group #n is notified of the presence of an incoming call for the incoming call group #n through the paging indicator channel PICH, the mobile station receives the paging channel PCH in the corresponding radio frame mapped on the secondary common control physical channel S-CCPCH to determine the presence or absence of the incoming call.

The paging indicator channel PICH is a channel set with the aim of reducing a discontinuous reception IR (Intermittent Reception) rate for improving battery saving in the mobile stations. The paging indicator channel PICH transmits a short paging indicator PI (Paging Indicator) for notifying the mobile stations of the presence or absence of an incoming call to the mobile stations belonging to the incoming call group #n and the mobile stations normally receive only the paging indicator PI in a standby state (idle mode). Only when the mobile station is notified of the presence of an incoming call through the paging indicator PI, the mobile station receives the paging channel PCH corresponding to the paging indicator PI.

Since the paging indicator PI is allocated to a plurality of the incoming call groups #n and a reception frequency per incoming call group #n can extremely be lowered, the mobile station in the standby state (idle mode) may receive only the short paging indicator PI, which can extremely reduce the frequency of receiving the paging signal of the long paging channel PCH (having a large amount of information).

The primary common control physical channel P-CCPCH is a downlink common channel existing in each cell and has a broadcast channel BCH (Broadcast Channel) of the transport channel mapped thereon to transmit broadcast information such as system information and cell information.

The secondary common control physical channel S-CCPCH is a downlink common channel and a plurality of these channels can exist in each cell. The forward access channel FACH (Forward Access Channel) and the paging channel PCH (Paging Channel) are mapped thereon, which are the transport channels. The forward access channel FACH is a downlink common channel and is used for transmitting control information and user data. The forward access channel FACH is shared and used by a plurality of mobile stations and is used for low-rate data transmission from a higher-level layer.

The paging channel PCH is a downlink common channel forming a pair with the paging indicator channel PICH as above and is used for transmitting the paging signal. The paging signal includes messages such as a mobile station ID (UE identity), a core network ID (CN identity), and a Paging case (Paging cause).

With regard to the downlink/uplink dedicated physical data channels DPDCH and the downlink/uplink dedicated physical control channels DPCCH, the downlink dedicated physical data channel DPDCH and the downlink dedicated physical control channel DPCCH are time-multiplexed in a time slot in the case of the downlink, and the uplink dedicated physical data channel DPDCH and the uplink dedicated physical control channel DPCCH are mapped to I-phase and Q-phase, respectively, in the case of the uplink. One or more downlink/uplink dedicated physical data channels DPDCH are allocated to a mobile station (spread code multiplexing) and used for the data transmission from a higher-level layer. Only one downlink/uplink dedicated physical control channel DPCCH is allocated to a mobile station and used for the physical layer control.

The acquisition indicator channel AICH is a downlink common channel forming a pair with the physical random access channel PRACH. The acquisition indicator channel AICH is used for the random access control of the physical random access channel PRACH.

The physical random access channel PRACH is an uplink common channel and has mapped thereon the random access channel RACH that is the transport channel. Random access is applied to use this channel for sending control information at the time of transmission. This channel is also used for data transmission (mainly at lower rate) from a higher-level layer.

The outline of the major physical channels and transport channels of the HSDPA mode will then briefly be described.

The high-speed physical downlink shared channel HS-PDSCH of the HSDPA mode is a downlink shared channel shared by a plurality of mobile stations and includes a high-speed downlink shared channel HS-DSCH (High Speed Downlink Shared Channel) of the transport channel for each mobile station. The HS-PDSH is used for transmitting packet data addressed to the mobile stations from a higher-level layer.

The HS-DSCH-related shared control channel HS-SCCH of the HSDPA mode is a downlink shared channel shared by a plurality of mobile stations and transmits to the mobile stations the information necessary for demodulating the high-speed downlink shared channel HS-DSCH (modulation mode, spread code) and the information necessary for error correction decoding process and a hybrid automatic repeat request HARQ (Hybrid Automatic Repeat reQuest).

The HS-DSCH-related uplink dedicated physical control channel HS-DPCCH is an uplink dedicated control channel and is used for transmitting downlink quality information CQI (Channel Quality Indication) representing a downlink radio propagation path status and ACK/NACK (Acknowledgement/Negative Acknowledgements) that is reception acknowledgement information corresponding to the hybrid automatic repeat request HARQ.

On the other hand, the evolution of the third generation radio access (Evolved Universal Terrestrial Radio Access, hereinafter, EUTRA) and the evolution of the third generation radio access network (Evolved Universal Terrestrial Radio Access Network, hereinafter, EUTRAN) are explored. The OFDM (Orthogonal Frequency Division Multiplexing) mode is proposed for the downlink of the EUTRA. The EUTRA technology applied to the OFDM mode is a technology such as adaptive modulation/demodulation error correction mode (AMCS: Adaptive Modulation and Coding Scheme, hereinafter, AMCS mode) based on adaptive radio link control (link adaptation) such as channel coding.

The AMCS mode is a mode of switching radio transmission parameters (hereinafter, AMC mode) such as an error correction mode, an encoding rate of error correction, a data modulation multi-valued number, a code spreading rate (SF: Spreading Factor) of time/frequency axes, and a multi-code multiplexing number depending on the propagation path statuses of the mobile stations to efficiently perform high-speed packet data transmission. For example, with regard to data modulation, the maximum throughput of a communication system can be increased by switching to the multi-valued modulation with higher efficiency such as from the QPSK (Quadrature Phase Shift Keying) to the 8-PSK modulation and the 16-QAM (Quadrature Amplitude Modulation) modulation as the propagation path status is improved.

With regard to disposition of the downlink physical channels and the transport channels in the OFDM mode, a method of multiplexing the physical control channel and the physical data channel in the same frequency band through the spread code multiplexing is proposed for the Spread-OFDM mode (see, e.g., patent document 1). In a method proposed for the Non Spread-OFDM mode (e.g., wireless LAN standard 802.16), the resources of the frequency axis (sub-carrier) and the time axis (OFDM symbol) of the OFDM are used to multiplex the channels in time/frequency through the time division multiplexing TDM (Time Division Multiplexing), the frequency division multiplexing FDM (Frequency Division Multiplexing), or a combination of TDM/FDM.

The technical requirements of the EUTRA/EUTRAN are proposed (see, e.g., non-patent document 4), which request spectrum flexibility for integration and coexistence with existing 2G and 3G services and request support for spectrum allocations to different size spectrum (frequency bandwidth, e.g., 1.25 MHz, 2.5 MHz, 5 MHz, 10 MHz, 20 MHz).

The technical information of the EUTRA is proposed (see non-patent document 5), which shows a method of frequency band position specification (center-frequency shifting) to be used for a mobile station capable of transmission/reception in different frequency bandwidths. Description will be made with reference to FIG. 37. When a base station supports a unique maximum frequency bandwidth, for example, a frequency bandwidth of 20 MHz and a mobile station supports a unique maximum frequency bandwidth, for example, a bandwidth of 5 MHz, the mobile station first uses the downlink synchronization channel DSNCH and the downlink pilot channel DPCH to perform cell search. Hereinafter, a group of mobile stations capable of transmission/reception in different frequency bandwidths, for example, Bn frequency bandwidths (Bn=1.25, 2.5, 5, 10, 15, and 20 MHz) is defined as a Bn mobile station class; a mobile station capable of transmission/reception in the Bn frequency bandwidth is defined as a mobile station of the Bn mobile station class; and a transmission/reception frequency bandwidth Bn of the mobile station defined by the Bn mobile station class is defined as a unique frequency bandwidth Bn of the mobile station.

Specifically, the mobile station detects a downlink synchronization channel DSNCH at 5 MHz, which is the center of the 20-MHz bandwidth, and then receives a downlink common control channel DCCCH. The downlink common control channel DCCCH includes transmission bandwidth information and frequency shift information for specifying frequency band positions to be used by respective mobile stations in different mobile station classes. The mobile station moves to the operating frequency band position in accordance with the control information to start data transfer. The downlink channels DSNCH and DCCCH will be described later.

As above, in the 3GPP (3rd Generation Partnership Project), the W-CDMA (Wideband Code Division Multiple Access) mode is standardized as the third generation cellular mobile communication mode and the service is sequentially started (see, e.g., non-patent document 1).

In the conventional mobile communication systems such as GSM (Global System for Mobile Communications) or W-CDMA, subscriber identifiers IMSI (International Mobile Subscriber Identity) are used for mobility management. The core network of the W-CDMA mode is configured based on the core network of the GSM. The movement managing method of the W-CDMA mode will be described with reference to FIG. 38.

An RNC (Radio Network Controller) (50) is a radio controlling device and a controlling device managing radio resources and controlling Nodes B (10). The RNC (50) controls handover, for example.

The Node B (10) is a logical node performing radio transmission/reception and is specifically a radio base station device. The Node B (10) is connected to a mobile station device 20 through a radio interface.

An SGSN (Serving GPRS Support Node) (30) is a control node for the packet switched service of the core network and includes a VLR (Visitor Location Register) (31) that manages subscriber information of visited subscribers.

Attach is mainly performed at the time of power-on of a mobile station 20. In a procedure for managing whether a terminal can receive an incoming call, an incoming call can be received in the attached state and an incoming call cannot be received in the detached state.

Location registration is performed if the mobile station moves a location registration area 40, and the subscriber information is downloaded from an HLR (Home Location Register) not shown in the procedure to the visited VLR (31).

The attach and the location registration process can concurrently be executed. When detecting a change in the location registration area 40 from broadcast information, the mobile station 20 makes a location registration request including a subscriber identifier IMSI to the VLR (31) of the SGSN (30) through the Node B (10) and the RNC (50). The VLR (31) downloads and allocates the subscriber information from the HLR as a temporary subscriber identifier to a TMSI (Temporary Mobile Subscriber Identity) and transmits a response message of the location registration to the mobile station 20.

Since the TMSI is used for identifying users over the air, security can be improved by hiding the IMSI as compared to the case of using the IMSI, and since the TMSI is used which has about half amount of information relative to the IMSI, an information amount can be reduced over the air.

A process procedure of paging will then be described with reference to FIG. 39. In mobile communication, if an incoming call exists for the mobile station 20, the mobile station 20 must be notified of the presence of the incoming call. The location information of the mobile station 20 is managed through the location registration area 40 in the network, and all the mobile stations are notified of the presence of the incoming call in a broadcasting manner in the location registration area 40 where the location of the mobile station 20 is registered. This procedure is referred to as paging.

The paging is performed by sending a paging request signal from the VLR (31) to all the RNC (50) containing the location registration area 40 registered in the visited VLR (31). Using the TMSI for the subscriber identifier in this case is advantageous as above from a viewpoint of security and signal amount as compared to the case of using the IMSI.

Since the mobile station 20 always monitors a channel for call-out in the case of the idle mode (standby state), the mobile station 20 can recognize the paging to the own station. The mobile station 20 returns a response to the network if the location registration area and the TMSI (IMSI) included in the paging request are identical to the location registration area and the TMSI (IMSI) stored in itself.

The outline of the major physical channels and transport channels of the W-CDMA will then briefly be described.

The paging indicator channel PICH is a downlink common channel forming a pair with the paging channel PCH (Paging Channel) of the transport channel corresponding to the secondary common control physical channel S-CCPCH having a paging signal mapped thereon. The PICH transmits the presence or absence of voice-call (CS: Circuit Switch) or packet-call (PS: Packet Switch) incoming-call information for incoming call groups that are groups of mobile stations.

When a mobile station belonging to an incoming call group #n is notified of the presence of an incoming call for the incoming call group #n through the paging indicator channel PICH, the mobile station receives the paging channel PCH in the corresponding radio frame mapped on the secondary common control physical channel S-CCPCH to determine the presence or absence of the incoming call to itself.

The paging indicator channel PICH is a channel set with the aim of reducing a discontinuous reception IR (Intermittent Reception) rate for improving battery saving in the mobile stations. The paging indicator channel PICH transmits a short paging indicator PI (Paging Indicator) for notifying the mobile stations of the presence or absence of an incoming call to the mobile stations belonging to the incoming call group #n and the mobile stations normally receive only the paging indicator PI in the standby state (idle mode). Only when the mobile station is notified of the presence of an incoming call through the paging indicator PI, the mobile station receives the paging channel PCH corresponding to the paging indicator PI.

The paging indicator PI is allocated to a plurality of the incoming call groups #n and a reception frequency per incoming call group #n can extremely be lowered. Therefore, the mobile station in the standby state (idle mode) may receive only the short paging indicator PI, which can extremely reduce the frequency of receiving the paging signal of the long paging channel PCH (having a large amount of information).

Patent Document 1: Japanese Laid-Open Patent Publication No. 2001-237803
Patent Document 2: Japanese Patent Application Laid-Open Publication No. 2004-297756
Non-patent Document 1: 3GPP TS 25.211, V6.4.0 (2005-03), Physical channels and mapping of transport channels onto physical channels. http://www.3gpp.org/ftp/Specs/html-info/25-series.htm
Non-patent Document 2: Keiji Tachikawa, "W-CDMA Mobile Communications System", ISBN4-621-04894-5, P103, P115, etc.
Non-patent Document 3: 3GPP TR (Technical Report) 25.858, and 3GPP documents related to HSDPA specifications, http://www.3gpp.org/ftp/Specs/html-info/25-series.htm
Non-patent Document 4: 3GPP TR (Technical Report) 25.913, V2.1.0 (2005-05), Requirements for evolved Universal Terrestrial Radio Access (UTRA) and Universal Terrestrial Radio Access Network (UTRAN). http://www.3gpp.org/ftp/Specs/html-info/25913.htm
Non-patent Document 5: 3GPP R1-050592 NTT DoCoMo "Physical Channel Concept for Scalable Bandwidth in Evolved UTRA Downlink".

DISCLOSURE OF THE INVENTION

Problems to be Solved by the Invention

However, no specific idea has been proposed for contents of transfer bandwidth information and frequency shift information for specifying a frequency band position to be used by a mobile station in a different mobile station class in above patent documents.

In general, it is contemplated that the control information is exchanged between the base station and the mobile stations through the downlink/uplink control channels and that the control information is transmitted to a certain mobile station to specify operating frequency band positions at the time of the idle mode and the active mode. If the control information is exchanged before shifting the operating frequency band position, communication is very congested at the center frequency band of the unique frequency bandwidth of the base station, for example, at a 5-MHz frequency band that is the center of a 20-MHz frequency bandwidth. Since the control information is exchanged between the base station and the mobile stations, radio resources are used, leading to reduction in the frequency utilization efficiency of the overall system. Complicated base station control is also needed such as management and storage of the operating frequency band position and avoidance of communication congestion in some frequency bands for a certain mobile station.

The present invention was conceived to solve the above problems and it is therefore an object of the present invention to provide a mobile station device, a base station device, a mobile station device operating frequency band mapping method, and a program for executing the method and a recording medium, which can efficiently use radio resources through the operating frequency bands adapted to mobile stations in different mobile station classes (shifting of the center frequency) to improve the frequency utilization efficiency of the overall communication system and which can efficiently execute the base station control of the operating frequency band for a certain mobile station.

In above patent documents, no specific idea has been proposed for how to specify the center frequency position to shift within the unique frequency bandwidth of the base station for mobile stations with different frequency bandwidth abilities (e.g., 1.25 MHz, 2.5 MHz, 5 MHz, 10 MHz, 20 MHz) and how to perform the paging for the mobile stations in the standby state at the shifted frequency positions.

In general, it is contemplated that the control information is exchanged between the base station and the mobile stations through the downlink/uplink control channels and that the control information is transmitted to a certain mobile station to specify a position of the center frequency to which the mobile station should be shifted. In this case, the mobile station in the idle mode must register a shifted frequency position to the base station each time the base station is changed and an amount of signals for control is significantly increased.

In an existing mechanism of location registration, only the subscriber identification information IMSI is registered in the VLR, and no information is maintained about which is the waiting frequency band position of the mobile station called through the paging. Therefore, the paging indicator channel PICH and the paging channel PCH must be prepared as in the W-CDMA mode to define the reception at a certain frequency band position.

In this case, since the mobile station must periodically shift the center frequency to acquire the paging indicator channel PICH and the paging channel PCH, the process becomes complicated. Since the base station cannot identify the shifted frequency position of the mobile station, delivery of the scheduling information to the mobile station becomes complicated and a longer time is required for transition from the paging to the communicating state.

The present invention was conceived to solve the above problems and it is therefore an object of the present invention to provide a mobile station device, a base station device, a location management device, a mobile station device location registration method, a paging method, and a program for executing the methods and a recording medium adapted to a mobile communication system containing mobile stations with different frequency bandwidth abilities (e.g., 1.25 MHz, 2.5 MHz, 5 MHz, 10 MHz, 20 MHz).

Means for Solving the Problems

In order to solve the above problems, a first technical means is a communication method used in a mobile communication system composing a shared control signaling channel and a shared data channel in one slot, wherein a packet specified by the shared control signaling channel is arranged in the shared data channel, wherein a base station transmits a signal indicating that paging information to a mobile station is included in the shared data channel, using the shared control signaling channel arranged at the head of a slot specified from identification information of the mobile station, and the mobile station in an idle mode receives discontinuously the signal indicating that the paging information to the mobile station is included in the shared data channel.

A second technical means is the communication method as defined in the first technical means, wherein the slot number is specified by the remainder on division of (the identification information of the mobile station divided by the number of paging group) by the number of paging slots.

A third technical means is a mobile station used in a mobile communication system composing a shared control signaling channel and a shared data channel in one slot, wherein a packet specified by the shared control signaling channel is arranged in the shared data channel, wherein the mobile station receives a signal from a base station, indicating that paging information to the mobile station is included in the shared data channel, using the shared control signaling channel arranged at the head of a slot specified from identification information of the mobile station, and the mobile station in an idle mode receives discontinuously the signal indicating that the paging information to the mobile station is included in the shared data channel.

A fourth technical means is the mobile station as defined in the third technical means, wherein the slot number is specified by the remainder on division of (the identification information of the mobile station divided by the number of paging group) by the number of paging slots.

A fifth technical means is a base station used in a mobile communication system composing a shared control signaling channel and a shared data channel in one slot, wherein a packet specified by the shared control signaling channel is arranged in the shared data channel, wherein the base station transmits a signal indicating that paging information to a mobile station is included in the shared data channel, using the shared control signaling channel arranged at the head of a slot specified from identification information of the mobile station.

A sixth technical means is the base station as defined in the fifth technical means, wherein the slot number is specified by the remainder on division of (the identification information of the mobile station divided by the number of paging group) by the number of paging slots.

A seventh technical means is a mobile station used in a mobile communication system, an operating frequency band position of the mobile station being a certain frequency position calculated at least from identification information of the mobile station.

An eighth technical means is a mobile station used in a mobile communication system, operating frequency band positions at the time of an idle mode of respective mobile stations being arranged to be distributed throughout a unique frequency bandwidth of a base station.

A ninth technical means is a mobile station used in a mobile communication system, an operating frequency band position at the time of an idle mode is a certain frequency position calculated at least from identification information of the mobile station.

A tenth technical means is the mobile station as defined in the ninth technical means, wherein the operating frequency band position of the mobile station is identified from the operating frequency band position at the time of the idle mode.

An eleventh technical means is the mobile station as defined in the ninth technical means, wherein an indicator of an incoming call to a group including the mobile station or paging information to the mobile station is received at the operating frequency band position at the time of the idle mode.

A twelfth technical means is the mobile station as defined in the seventh technical means, wherein cell search information and broadcast information transmitted from the base station are received at the operating frequency band position.

A thirteenth technical means is the mobile station as defined in the ninth technical means, wherein cell search information and broadcast information transmitted from the base station are received at the operating frequency band position at the time of the idle mode.

A fourteenth technical means is the mobile station as defined in the ninth technical means, wherein during a reception period of cell search information and broadcast information transmitted from the base station, the reception is performed at a frequency band position other than the operating frequency band position at the time of the idle mode.

A fifteenth technical means is the mobile station as defined in the eighth technical means, wherein the operating frequency band position at the time of the idle mode is also divided in the time direction depending on the identification information.

A sixteenth technical means is the mobile station as defined in the seventh or the ninth technical means, wherein the identification information is used at the time of an initial location registration process of the mobile station, and wherein after the location registration to a higher-level network node, temporary identification information acquired from the higher-level network node is used.

A seventeenth technical means is the mobile station as defined in the eleventh technical means, wherein the indicator is located as a downlink common control channel.

An eighteenth technical means is the mobile station as defined in the eleventh technical means, wherein the indicator is located as a downlink shared control signaling channel.

A nineteenth technical means is the mobile station as defined in the ninth technical means, wherein discontinuous reception is performed at the operating frequency band position at the time of the idle mode.

A twentieth technical means is a base station used in a mobile communication system, an operating frequency band position of a mobile station being a certain frequency position calculated at least from identification information of the mobile station.

A twenty-first technical means is a base station used in a mobile communication system, operating frequency band positions at the time of an idle mode of respective mobile stations being arranged to be distributed throughout a unique frequency bandwidth of the base station.

A twenty-second technical means is a base station used in a mobile communication system, an operating frequency band position at the time of an idle mode is a certain frequency position calculated at least from identification information of the mobile station.

A twenty-third technical means is the base station as defined in the twenty-second technical means, wherein the operating frequency band position of the mobile station is identified from the operating frequency band position at the time of the idle mode.

A twenty-fourth technical means is the base station as defined in the twenty-second technical means, wherein an indicator of an incoming call to a group including the mobile station or paging information to the mobile station is transmitted at the operating frequency band position at the time of the idle mode.

A twenty-fifth technical means is the base station as defined in the twentieth technical means, wherein cell search information and broadcast information are transmitted at the operating frequency band position.

A twenty-sixth technical means is the base station as defined in the twenty-second technical means, wherein the base station transmits cell search information and broadcast information at the operating frequency band position at the time of the idle mode.

A twenty-seventh technical means is the base station as defined in the twenty-second technical means, wherein the base station transmits cell search information and broadcast information during a transmission period of the cell search information and the broadcast information, at a frequency band position other than the operating frequency band position at the time of the idle mode.

A twenty-eighth technical means is the base station as defined in the twenty-first technical means, wherein the operating frequency band position at the time of the idle mode is also divided in the time direction depending on the identification information.

A twenty-ninth technical means is the base station as defined in the twentieth or the twenty-second technical means, wherein the identification information is used at the time of an initial location registration process of the mobile station, and wherein after the location registration to a higher-level network node, temporary identification information acquired from the higher-level network node is used.

A thirtieth technical means is the base station as defined in the twenty-fourth technical means, wherein the indicator is located as a downlink common control channel.

A thirty-first technical means is the base station as defined in the twenty-fourth technical means, wherein the indicator is located as a downlink shared control signaling channel.

A thirty-second technical means is a mobile-station operating frequency band mapping method for mapping an operating frequency band of a mobile station in a mobile communication system, wherein the operating frequency band position of the mobile station is calculated at least from identification information for identifying the mobile station.

A thirty-third technical means is a mobile-station operating frequency band mapping method for mapping an operating frequency band of a mobile station in a mobile communication system, wherein operating frequency band positions at the time of an idle mode of respective mobile stations are arranged to be distributed throughout a unique frequency bandwidth of a base station.

A thirty-fourth technical means is a mobile-station operating frequency band mapping method in a mobile communication system, wherein at the time of an idle mode that is a standby state of the mobile station, the operating frequency band position is calculated at least from identification information for identifying the mobile station.

A thirty-fifth technical means is the mobile-station operating frequency band mapping method as defined in the thirty-fourth technical means, wherein the operating frequency band position of the mobile station is identified from the operating frequency band position at the time of the idle mode.

A thirty-sixth technical means is the mobile-station operating frequency band mapping method as defined in the thirty-fourth technical means, wherein an indicator of an incoming call to a group including the mobile station or paging information to the mobile station is received at the operating frequency band position at the time of the idle mode.

A thirty-seventh technical means is the mobile-station operating frequency band mapping method as defined in the thirty-second technical means, wherein cell search information and broadcast information transmitted from the base station are received at the operating frequency band position.

A thirty-eighth technical means is the mobile-station operating frequency band mapping method as defined in the thirty-fourth technical means, wherein cell search information and broadcast information transmitted from a base station are received at the operating frequency band position at the time of the idle mode.

A thirty-ninth technical means is the mobile-station operating frequency band mapping method as defined in the thirty-fourth technical means, wherein during a reception period of cell search information and broadcast information transmitted from a base station, the reception is performed at a frequency band position other than the operating frequency band position at the time of the idle mode.

A fortieth technical means is the mobile-station operating frequency band mapping method as defined in the thirty-third technical means, wherein the operating frequency band position at the time of the idle mode is also divided in the time direction depending on identification information.

A forty-first technical means is the mobile-station operating frequency band mapping method as defined in the thirty-second technical means, wherein the identification information is used at the time of an initial location registration process of the mobile station, and wherein after the location registration to a higher-level network node, temporary identification information acquired from the higher-level network node is used.

A forty-second technical means is the mobile-station operating frequency band mapping method as defined in the thirty-fourth technical means, wherein the identification information is used at the time of an initial location registration process of the mobile station, and wherein after the location registration to a higher-level network node, temporary identification information acquired from the higher-level network node is used.

A forty-third technical means is the mobile-station operating frequency band mapping method as defined in the thirty-sixth technical means, wherein the indicator is located as a downlink common control channel.

A forty-fourth technical means is the mobile-station operating frequency band mapping method as defined in the thirty-sixth technical means, wherein the indicator is located as a downlink shared control signaling channel.

A forty-fifth technical means is the mobile-station operating frequency band mapping method as defined in the thirty-fourth technical means, wherein discontinuous reception is performed at the operating frequency band position at the time of the idle mode.

A forty-sixth technical means is the mobile-station operating frequency band mapping method as defined in the thirty-fourth technical means, wherein at the time of the idle mode, broadcast information transmitted from a base station is located at respective operating frequency band positions of the idle mode so as to be received at the operating frequency band position of the idle mode.

A forty-seventh technical means is a mobile station used in a mobile communication system, the mobile station including at least identification information of the mobile station and information indicating an available frequency bandwidth of the mobile station in a location registration request transmitted at the time of location registration of the mobile station.

A forty-eighth technical means is a location management device used in a mobile communication system, the location management device receiving a location registration request from a mobile station to manage a position of the mobile station, the location management device managing at least identification information of the mobile station and available frequency bandwidth information of the mobile station.

A forty-ninth technical means is a mobile station used in a mobile communication system, the mobile station including at least identification information of the mobile station and information indicating an operating frequency position of the mobile station in a location registration request transmitted at the time of location registration of the mobile station.

A fiftieth technical means is a location management device used in a mobile communication system, the location management device receiving a location registration request from a mobile station to manage a position of the mobile station, the location management device managing at least identification information of the mobile station and the operating frequency position information of the mobile station.

A fifty-first technical means is a location management device used in a mobile communication system, the location management device transmitting a paging request to a base station if an incoming call to a mobile station exists, the location management device including at least identification information of the mobile station and information indicating an available frequency bandwidth of the mobile station in the paging request.

A fifty-second technical means is a base station used in a mobile communication system, when receiving a paging request to a mobile station, the base station transmitting the paging request at an operating frequency position calculated at least from identification information of the mobile station and an available frequency bandwidth of the mobile station included in the paging request.

A fifty-third technical means is a mobile station used in a mobile communication system, the mobile station receiving a paging request at an operating frequency position calculated at least from identification information of the mobile station and an available frequency bandwidth of the mobile station.

A fifty-fourth technical means is a location management device used in a mobile communication system, the location management device transmitting a paging request to a base station if an incoming call to a mobile station exists, the location management device including at least identification information of the mobile station and information indicating an operating frequency band position of the mobile station in the paging request.

A fifty-fifth technical means is a base station used in a mobile communication system, when receiving a paging request to a mobile station, the base station transmitting the paging request at an operating frequency band position of the mobile station included in the paging request.

A fifty-sixth technical means is a location registration method of a mobile station in a mobile communication system, wherein a location registration request transmitted by the mobile station at the time of location registration of the mobile station includes at least identification information of the mobile station and information indicating an available frequency bandwidth of the mobile station.

A fifty-seventh technical means is a location registration method of a mobile station in a mobile communication system, wherein a location management device receiving a location registration request from the mobile station to manage a location of the mobile station manages at least identification information of the mobile station and available frequency bandwidth information of the mobile station.

A fifty-eighth technical means is a location registration method of a mobile station in a mobile communication system, wherein a location registration request transmitted by the mobile station at the time of location registration of the mobile station includes at least identification information of the mobile station and information indicating an operating frequency position of the mobile station.

A fifty-ninth technical means is a location registration method of a mobile station in a mobile communication system, wherein a location management device receiving a location registration request from a mobile station to manage a location of the mobile station manages at least identification information of the mobile station and the operating frequency position information of the mobile station.

A sixtieth technical means is a paging method in a mobile communication system, wherein a location management device transmitting a paging request to a base station in the case of an incoming call to a mobile station includes at least identification information of the mobile station and information indicating an available frequency bandwidth of the mobile station in the paging request.

A sixty-first technical means is a paging method in a mobile communication system, wherein when receiving a paging request to a mobile station, a base station transmits the paging request at an operating frequency position calculated at least from identification information of the mobile station and an available frequency bandwidth of the mobile station included in the paging request.

A sixty-second technical means is a paging method of a mobile station in a mobile communication system, wherein the mobile station receives a paging request at an operating frequency position calculated at least from identification information of the mobile station and an available frequency bandwidth of the mobile station.

A sixty-third technical means is a paging method in a mobile communication system, wherein a location management device transmitting a paging request to a base station in the case of an incoming call to a mobile station includes at least identification information of the mobile station and information indicating an operating frequency band position of the mobile station in the paging request.

A sixty-fourth technical means is a paging method in a mobile communication system, wherein when receiving a paging request to a mobile station, a base station transmits the paging request at an operating frequency band position of the mobile station included in the paging request.

A sixty-fifth technical means is a program for causing a computer to perform the mobile-station operating frequency band mapping method as defined in any one of the thirty-second to the forty-sixth technical means.

A sixty-sixth technical means is a program for causing a computer to perform the location registration method of a mobile station as defined in any one of the fifty-sixth to the fifty-ninth technical means or the paging method as defined in any one of the sixtieth to the sixty-fourth technical means.

A sixty-seventh technical means is a recording medium having recorded thereon the program as defined in the sixty-fifth technical means in a computer-readable manner.

A sixty-eighth technical means is a recording medium having recorded thereon the program as defined in the sixty-sixth technical means in a computer-readable manner.

Effect of the Invention

According to the present invention, a mobile station device, a base station device, a mobile station device operating frequency band mapping method, and a program for executing the method and a recording medium are provided which can efficiently use radio resources through the specification of the operating frequency band positions adapted to mobile stations in different mobile station classes to improve the frequency utilization efficiency of the overall communication system and which can efficiently execute the base station control of the operating frequency band position specification for a certain mobile station.

Particularly, an effective means is provided, which is related to the grouping of mobile stations for specifying the operating frequency band positions of the mobile stations adapted to different frequency bandwidths (e.g., 1.25 MHz, 2.5 MHz, 5 MHz, 10 MHz, 20 MHz) and especially to a grouping process for packet indicator PI (Packet Indicator) information indicating the presence or absence of a packet call corresponding to AIPN (ALL Internet Protocol Network) requiring the EUTRA/EUTRAN.

According to the present invention, a mobile station device, a base station device, a location management device, a mobile station device location registration method, a paging method, and a program for executing the methods and a recording medium are provided which are adapted to a mobile communication system containing mobile stations with different frequency bandwidth abilities (e.g., 1.25 MHz, 2.5 MHz, 5 MHz, 10 MHz, 20 MHz).

BRIEF DESCRIPTION OF THE DRAWINGS

FIG. 10 is a view for explaining location of a packet indicator for each TTI.

EXPLANATION OF REFERENCE NUMERALS

10 . . . Node B; 20 . . . mobile station; 30 . . . SGSN; 31 . . . VLR, 40 . . . location registration area, 50 . . . RNC; 100 . . . base station; 101 . . . antenna portion; 102 . . . radio portion; 103 . . . demodulating portion; 104 . . . link channel estimating portion; 105 . . . control data extracting portion; 106 . . . channel decoding portion; 107 . . . channel coding portion; 108 . . . control data inserting portion; 109 . . . OFDM modulating portion; 110 . . . scheduling portion; 111 . . . antenna portion; 112 . . . radio portion; 113 . . . control portion; 114 . . . communication IF; 200 . . . mobile station; 201 . . . antenna portion; 202 . . . radio portion; 203 . . . OFDM demodulating portion; 204 . . . link channel estimating portion; 205 . . . control data extracting portion; 206 . . . channel decoding portion; 207 . . . channel coding portion; 208 . . . control data inserting portion; 209 . . . modulating portion; 210 . . . control portion; 211 . . . antenna portion; 212 . . . radio portion; 213 . . . control portion; 300 . . . location management device; 301 . . . location management database; 302 . . . control portion; 303 . . . communication IF; and 400 . . . location registration area.

PREFERRED EMBODIMENTS OF THE INVENTION

Figure 1:
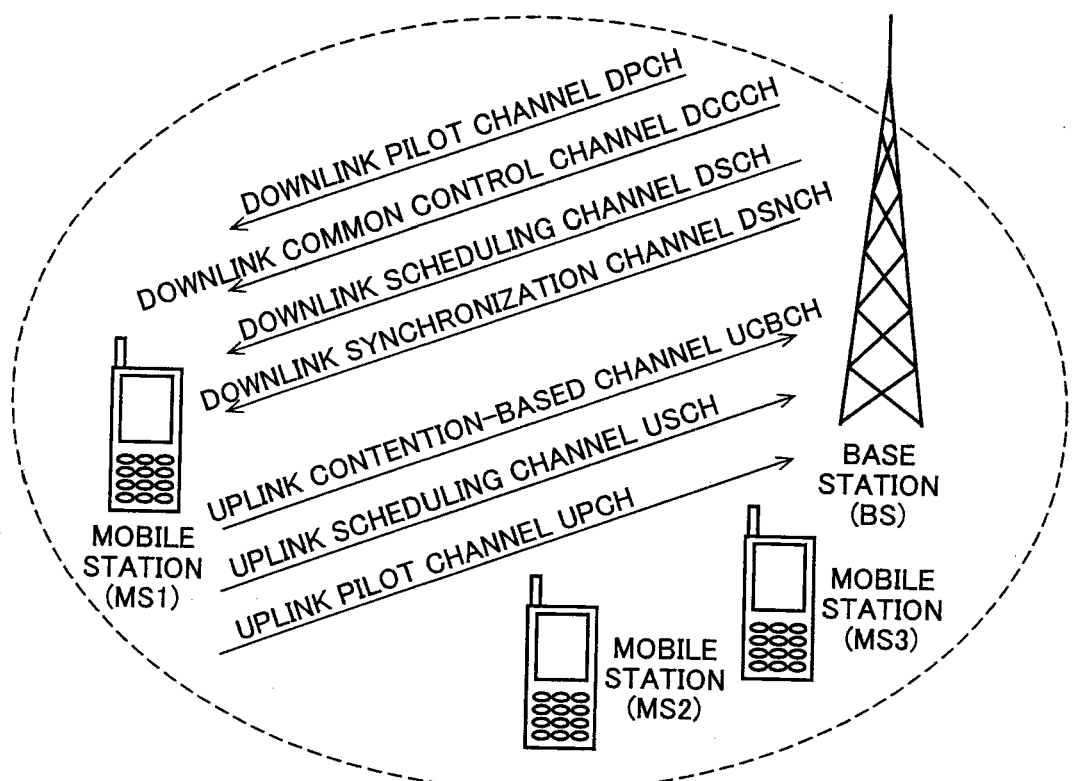
FIG. 1 is a view for explaining an exemplary channel structure of the EUTRA.

FIG. 1 is a view for explaining an exemplary channel structure of the EUTRA and shows an uplink/downlink exemplary channel structure assumed based on the proposition of 3GPP for the EUTRA. A downlink physical channel of the EUTRA is made up of a downlink pilot channel DPCH (Downlink Pilot Channel), a downlink synchronization channel DSNCH (Downlink Synchronization Channel), a downlink common control channel DCCCH (Downlink Common Control Channel), and a downlink scheduling channel DSCH (Downlink Scheduling Channel). The downlink scheduling channel DSCH includes a downlink shared control signaling channel DSCSCH (Downlink Shared Control Signaling Channel) and a downlink shared data channel DSDCH (Downlink Shared Data Channel).

An uplink physical channel of the EUTRA is made up of an uplink contention-based channel UCBCH (Uplink Contention-based Channel) and an uplink scheduling channel USCH (Uplink Scheduling Channel).

Figure 2:
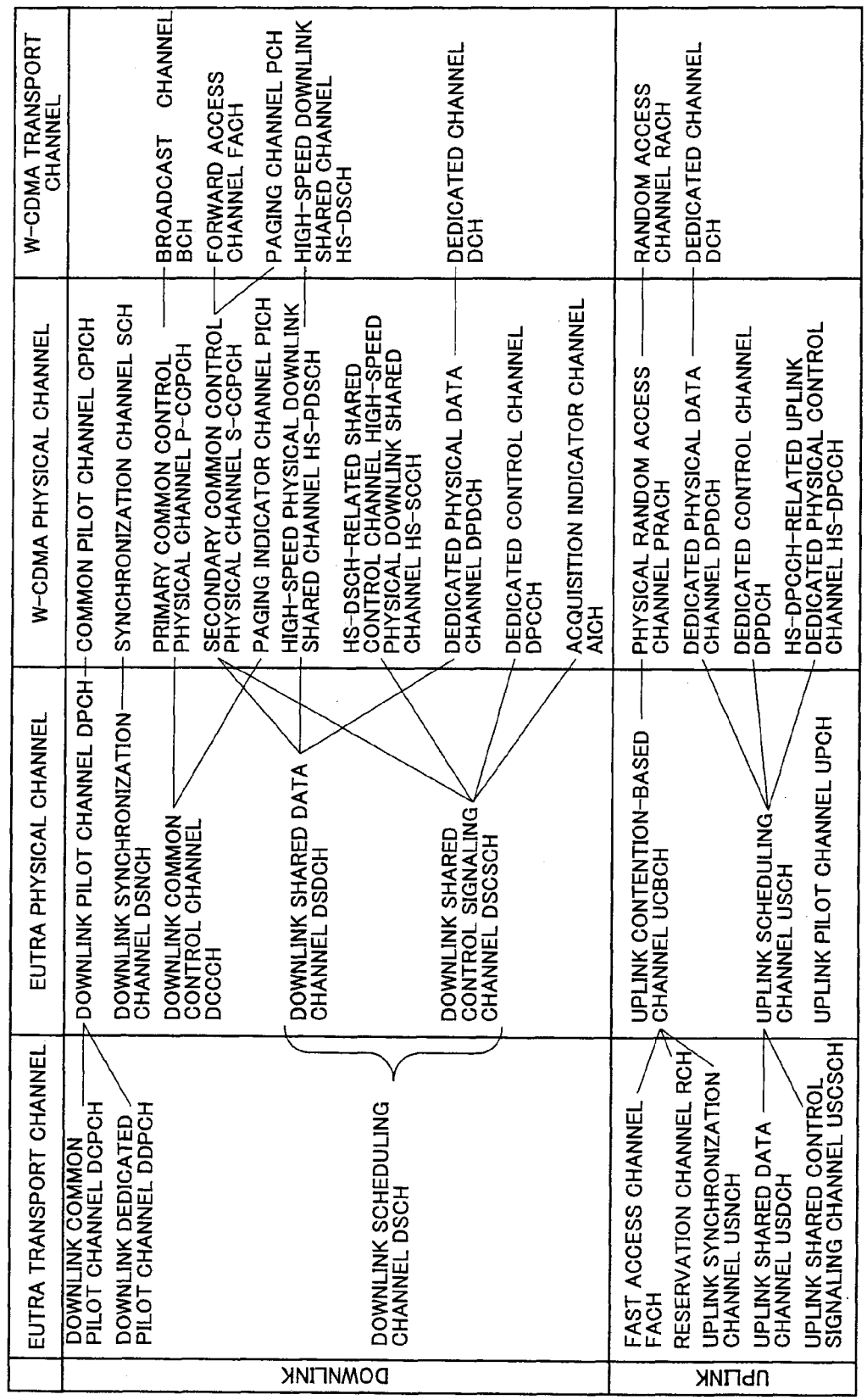
FIG. 2 is a view of correlations between uplink/downlink channels of the EUTRA and the W-CDMA/HSDPA mode assumed based on the proposition of 3GPP.

The outline of the downlink channels and the uplink channels of the EUTRA will then briefly be described. FIG. 2 is a view of correlations between the uplink/downlink channels of the EUTRA and the W-CDMA/HSDPA mode assumed based on the proposition of 3GPP.

In the downlink of the EUTRA, the downlink pilot channel DPCH includes a downlink common pilot channel DCPCH (Downlink Common Pilot Channel) and a downlink dedicated pilot channel DDPCH (Downlink Dedicated Pilot Channel).

The downlink common pilot channel DCPCH corresponds to the pilot channel CPICH of the W-CDMA mode and is used for estimation of a downlink propagation path status in the AMCS mode, cell search, and propagation path loss measurement in the uplink transmission power control. The downlink dedicated pilot channel DDPCH is transmitted to individual mobile stations from an antenna having a propagation path (directivity) different from a cell shared antenna, such as an adaptive array antenna or can be used for the purpose of reinforcing the downlink common pilot channel DCPCH for a mobile station with lower reception quality.

The downlink synchronization channel DSNCH corresponds to the synchronization channel SCH of the W-CDMA mode and is used for cell search of mobile stations, a radio frame of the OFDM signal, a time slot, a transmission timing interval TTI (Transmission Timing Interval), and OFDM symbol timing synchronization.

The downlink common control channel DCCCH includes common control information, such as broadcast information (corresponding to the broadcast channel BCH) corresponding to the primary common control physical channel P-CCPCH and the paging indicator channel PICH of the W-CDMA mode and packet indicator PI information indicating the presence or absence of a packet call (corresponding to the paging indicator channel PICH).

The downlink scheduling channel DSCH is made up of a downlink shared control signaling channel DSCSCH (Downlink Shared Control Signaling Channel) and a downlink shared data channel DSDCH (Downlink Shared Data Channel).

The downlink shared control signaling channel DSCSCH corresponds to the HS-DSCH-related shared control channel HS-SCCH included in the high-speed physical downlink shared channel HS-PDSCH of the HSDPA mode, the downlink dedicated control channel DPCCH, and the acquisition indicator channel AICH, is shared by a plurality of mobile stations, and is used for transmitting to the mobile stations the information necessary for demodulation of the high-speed downlink shared channel HS-DSCH (such as a modulation mode and a spread code), the information necessary for the error correction decoding process and the HARQ process, the scheduling information of radio resources (frequency and time), etc. A portion of packet paging information and downlink access information corresponding to the paging channel PCH included in the secondary common control physical channel of the W-CDMA mode is also transmitted as the downlink shared control signaling channel DSCSCH.

The downlink shared data channel DSDCH corresponds to the high-speed downlink shared channel HS-DSCH included in the high-speed physical downlink shared channel HS-PDSCH of the HSDPA mode and the downlink dedicated data channel DPDCH and is used for transmitting packet data addressed to a mobile station from a higher-level layer. A portion of packet paging information and downlink access information corresponding to the paging channel PCH included in the secondary common control physical channel of the W-CDMA mode is also transmitted as data of the downlink shared data channel DSDCH.

In the uplink, the uplink contention-based channel UCBCH includes a fast access channel FACH (Fast Access Channel), a reservation channel RCH (Reservation Channel), and an uplink synchronization channel USNCH (Uplink Synchronization Channel). The uplink contention-based channel UCBCH corresponds to the random access channel RACH (Random Access Channel) of the W-CDMA mode.

The uplink scheduling channel USCH is made up of an uplink shared data channel USDCH (Uplink Shared Data Channel) and an uplink shared control signaling channel USCSCH (Uplink Shared Control Signaling Channel). The uplink shared data channel USDCH corresponds to the uplink dedicated control channel DPDCH of the W-CDMA mode, is shared by the mobile stations, and is used for the packet data transmission of the mobile stations. The uplink shared control signaling channel USCSCH corresponds to the HS-DSCH-related uplink dedicated physical control channel HS-DPCCH and the dedicated control channel DPDCH of the HSDPA mode, is shared by the mobile stations, and is used for transferring downlink channel propagation path quality information CQI (Channel Quality Indicator), feedback information such as HARQ, uplink pilot and uplink channel control information, etc., of the mobile stations.

The EUTRA will be described with regard to a flow of transmission/reception of a packet call of the mobile station assumed based on the proposition of 3GPP.

Figure 3:
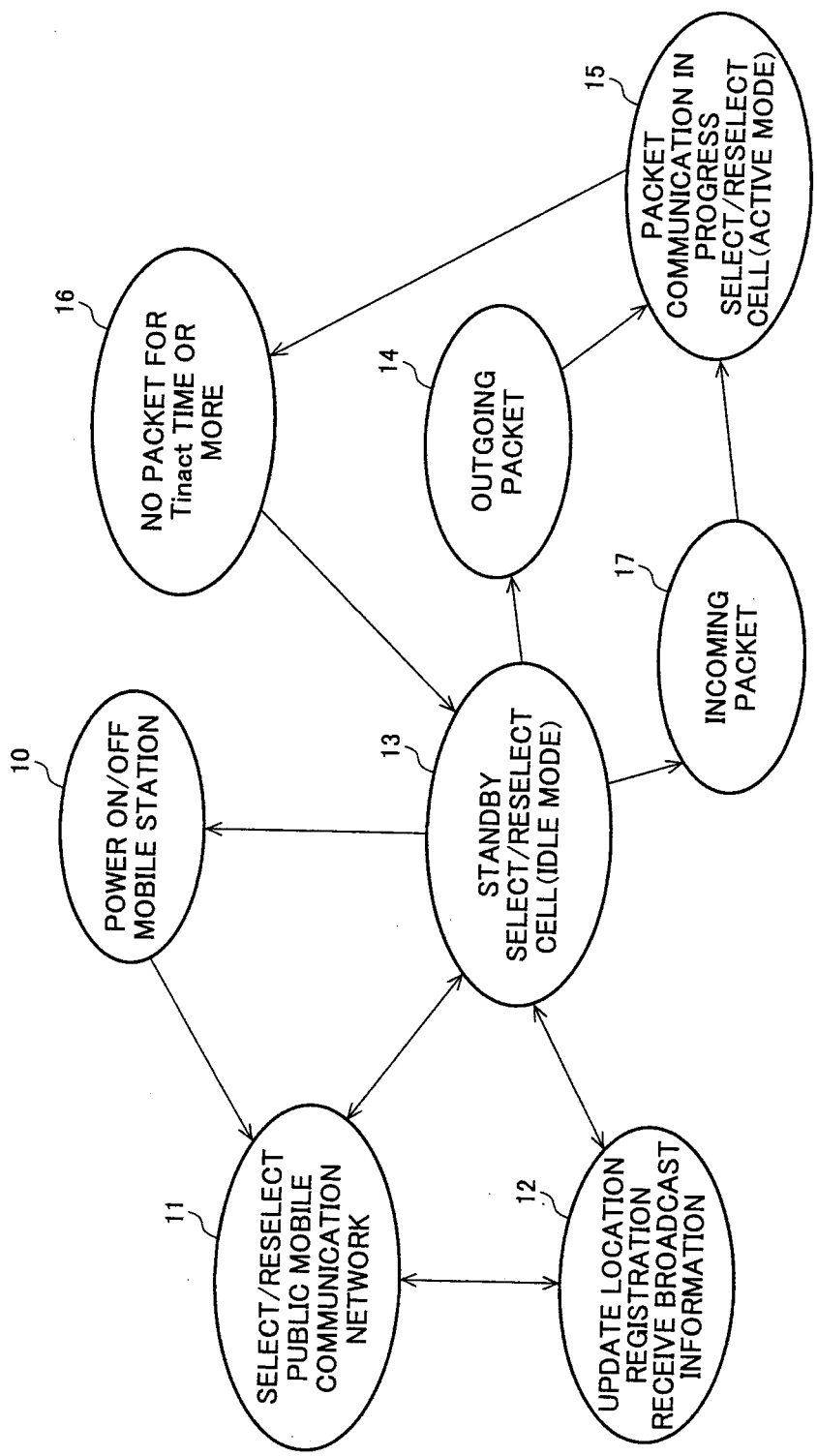
FIG. 3 is a view of state transition of a mobile station assumed based on the proposition of 3GPP.

First, FIG. 3 shows state transitions of the mobile station assumed based on the proposition of 3GPP. After power-on (10), the mobile station performs the selection/reselection of public mobile communication PLMN (Public Land Mobile Network) and the cell selection (11). The mobile station also receives location registration update and broadcast information (12) and transits to an idle mode, which is the standby state (13). In the idle mode, the cell selection/reselection is performed.

If an incoming packet (17) exists from the base station to the mobile station, the mobile station receives the packet paging indicator PI information indicating the presence or absence of the packet call and the packet paging information corresponding to the packet call, transits through a packet communication process procedure to an active mode (15)

during which the packet communication is in progress, and transmits/receives the packet data. If no packet data are transmitted/received for a period longer than a timer (e.g., time interval of Tinact) provided on the mobile station or the base station, the mobile station returns to the idle mode (or also referred to as inactive mode) (13). The cell selection/reselection is also performed in the active mode (15).

If an outgoing packet (14) from a user exists, the mobile station transits to the packet communication in progress (15) through reception of the downlink access information (corresponding to the downlink access channel FACH), transmission of the uplink access information (corresponding to the random access channel RACH), and the packet communication process procedure.

Figure 4:
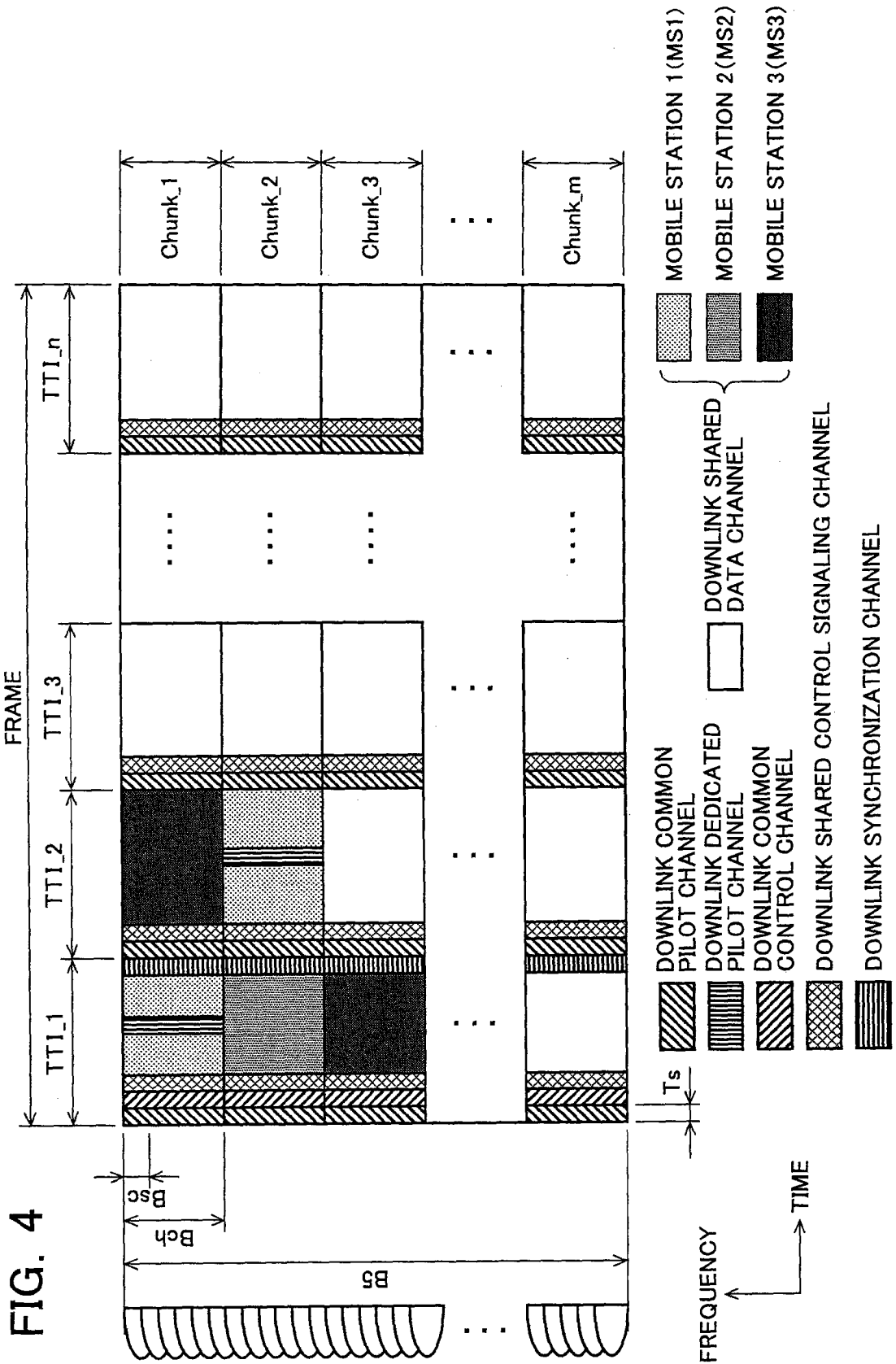
FIG. 4 is a view of an exemplary structure of a downlink radio frame assumed based on the proposition of 3GPP for the EUTRA.

FIG. 4 is a view of an exemplary structure of a downlink radio frame assumed based on the proposition of 3GPP for the EUTRA. The downlink radio frame is two-dimensionally made up of Chunks, which are clusters of a plurality of sub-carriers on the frequency axis and the transmission timing interval TTI on the time axis. The Chunk is made up of a cluster of several sub-carriers. For example, on the frequency axis, if the entire spectrum (downlink frequency bandwidth) B5 of the downlink is 20 MHz; the frequency bandwidth Bch of the chunk is 1.25 MHz; and the sub-carrier frequency bandwidth Bsc is 12.5 kHz, the frame includes 16 Chunks and 100 sub-carriers for each Chunk, i.e., a total of 1600 sub-carriers for the downlink. On the time axis, if one radio frame is 10 ms and TTI is 0.5 ms, 20 TTIs are included.

That is, in the above example, one radio frame includes 16 Chunks and 20 TTIs, and one TTI includes a plurality of OFDM symbol lengths (Ts). Therefore, in this example, a minimum radio resource available for the mobile station is made up of one Chunk (100 sub-carriers) and one TTI (0.5 ms). The radio resource of one Chunk may further finely be divided. The TTI may be 0.67 ms, 0.625 ms, etc.

As shown in FIG. 4, the downlink common pilot channel DCPCH is mapped at the beginning of each TTI and the downlink dedicated pilot channel DDPCH is mapped at a suitable position of one TTI (e.g., mapped at the center portion of TTI) depending on the usage status of the antenna of the base station or the propagation path status of the mobile station.

The downlink common control channel DCCCH and the downlink synchronization channel DSNCH are mapped in the TTI at the beginning of the radio frame. Since these channels are mapped in the TTI at the beginning of the radio frame, when the mobile station is in the idle mode, the mobile station can receive common control information such as cell search, timing synchronization and broadcast information and packet paging information by receiving only the TTI at the beginning of the radio frame or several OFDM symbol lengths (Ts) of the TTI at the beginning of the radio frame.

In the case of the idle mode, the mobile station performs the discontinuous reception operation.

Figure 5:
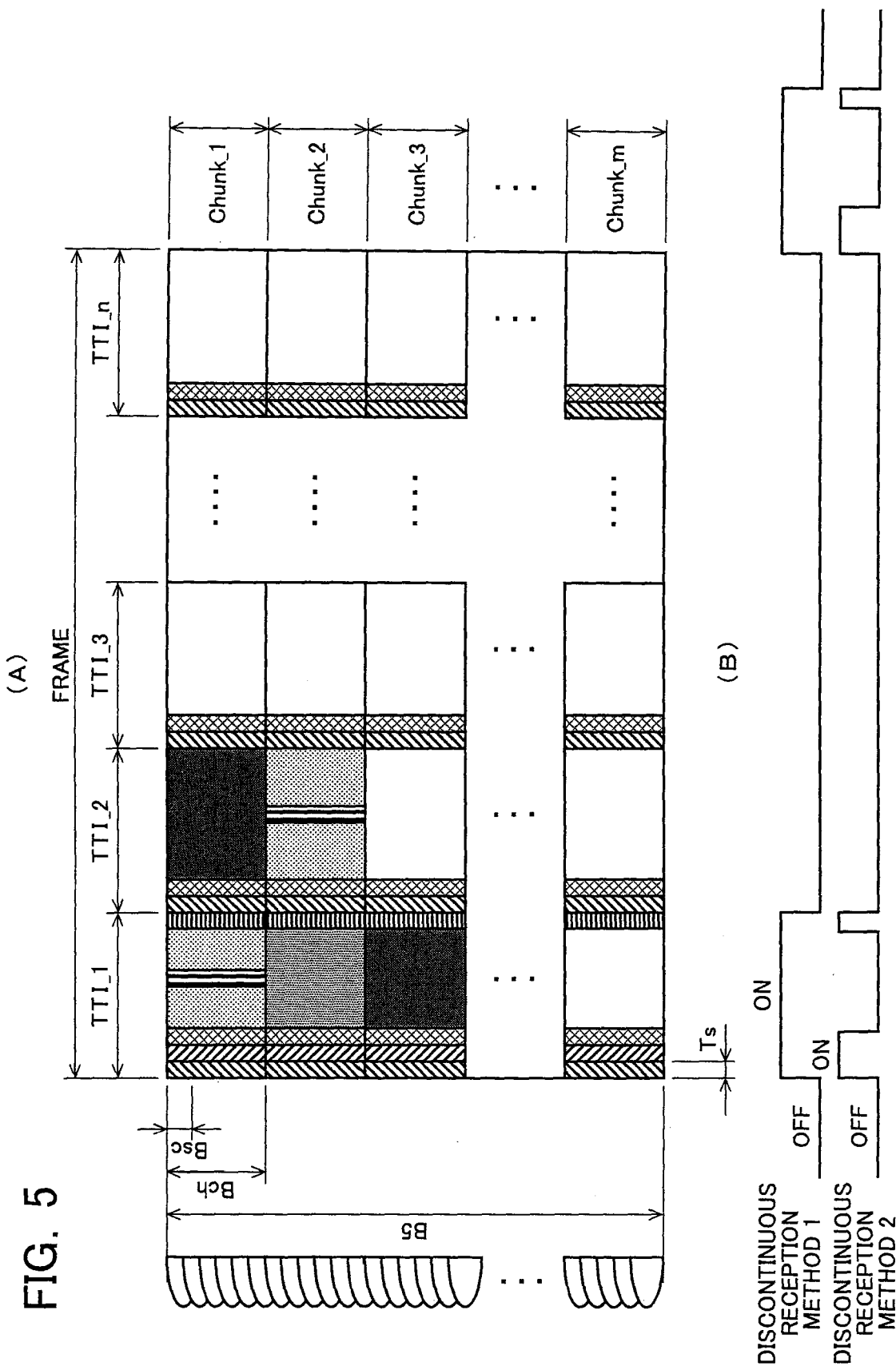
FIG. 5 is a conceptual view of discontinuous reception operation when the mobile station is in the idle mode.

FIG. 5 is a conceptual view of the discontinuous reception operation when the mobile station is in the idle mode. FIG. 5(A) shows the same figure as the structure of the downlink radio frame assumed based on the proposition of 3GPP of FIG. 4, and FIG. 5(B) shows an image of the discontinuous reception operation in accordance with FIG. 5(A).

As shown in FIG. 5, when the mobile station is in the idle mode, the discontinuous operations include a discontinuous operation 1 and a discontinuous operation 2, for example.

The discontinuous operation 1 is a discontinuous reception method of turning on a receiving portion for the TTI1 period at the beginning of the frame and turning off the receiving portion for other periods. The discontinuous operation 2 is a discontinuous reception method of turning on the receiving portion for the periods of the downlink common pilot channel DCPCH, the downlink common control channel DCCCH, the downlink shared control signaling channel DSCSCH, and the downlink synchronization channel DSNCH of the TTI1 at the beginning of the frame (several OFDM symbols Ts) and turning off the receiving portion for other periods. Although FIG. 5 shows an example of turning on the receiving portion for the TTI1 period of each beginning of the frame, the receiving portion may be turned on for every plurality of frame intervals.

The downlink shared control signaling channel DSCSCH is mapped at the beginning portion of each TTI as is the case with the downlink common pilot CPICH. Even while the mobile station performs the packet communication, if no packet data addressed to the own station exist in the TTI, the discontinuous reception can be performed to receive only the downlink shared control signaling channel DSCSCH.

Although FIG. 4 shows that the downlink pilot channel DPCH (the downlink common pilot channel DCPCH and the downlink dedicated pilot channel DDPCH), the downlink common control channel DCCCH, the downlink shared control signaling channel DSCSCH, and the downlink synchronization channel DSNCH are serially mapped between the sub-carriers on the frequency axis, the channels may discontinuously be mapped by thinning out between the sub-carriers.

Figure 6:
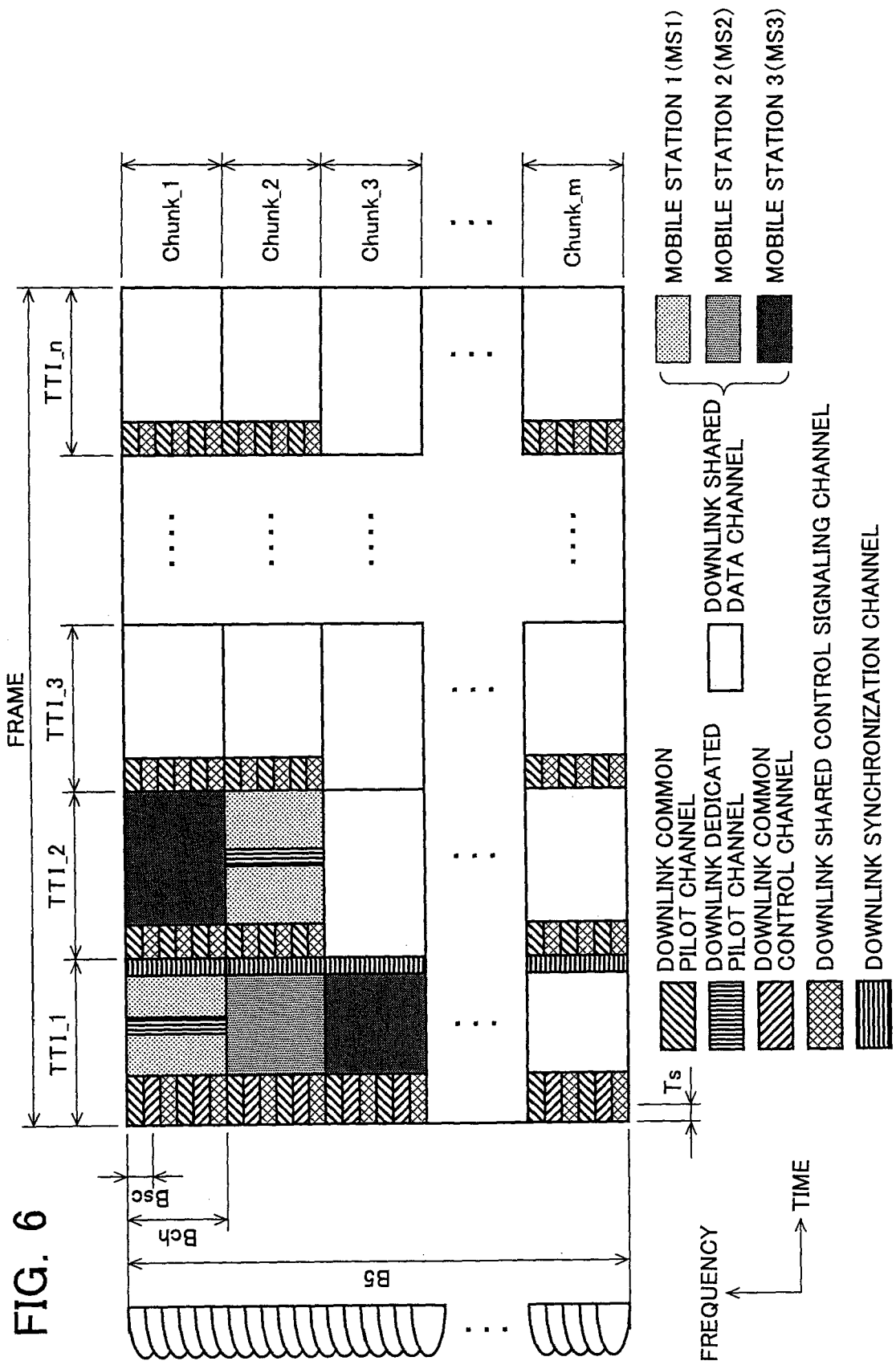
FIG. 6 is a view of another exemplary structure of the downlink radio frame assumed based on the proposition of 3GPP for the EUTRA.

FIG. 6 is a view of another exemplary structure of the downlink radio frame assumed based on the proposition of 3GPP for the EUTRA. For example, as shown in FIG. 6, the downlink common pilot channel DCPCH, the downlink common control channel DCCCH, and the downlink shared control signaling channel DSCSCH may be arranged in staggered sub-carriers instead of the structure of FIG. 4.

Although each of the above downlink channels is shown as an example of using TDM for the entire downlink frequency band, CDM (Code Division Multiplexing), FDM, or a combination of TDM and FDM may be used.

Although each of the downlink channels indicates one OFDM symbol length (Ts), a plurality of OFDM symbol lengths (Ts) may be used depending on an information amount.

The downlink shared data channel DSDCH transmits packet data addressed to the mobile stations based on the AMCS mode. By way of example, as shown in FIG. 1, the channel is allocated to mobile stations MS1, MS2, and MS3 depending on the propagation path statuses of the mobile stations.

Figure 7:
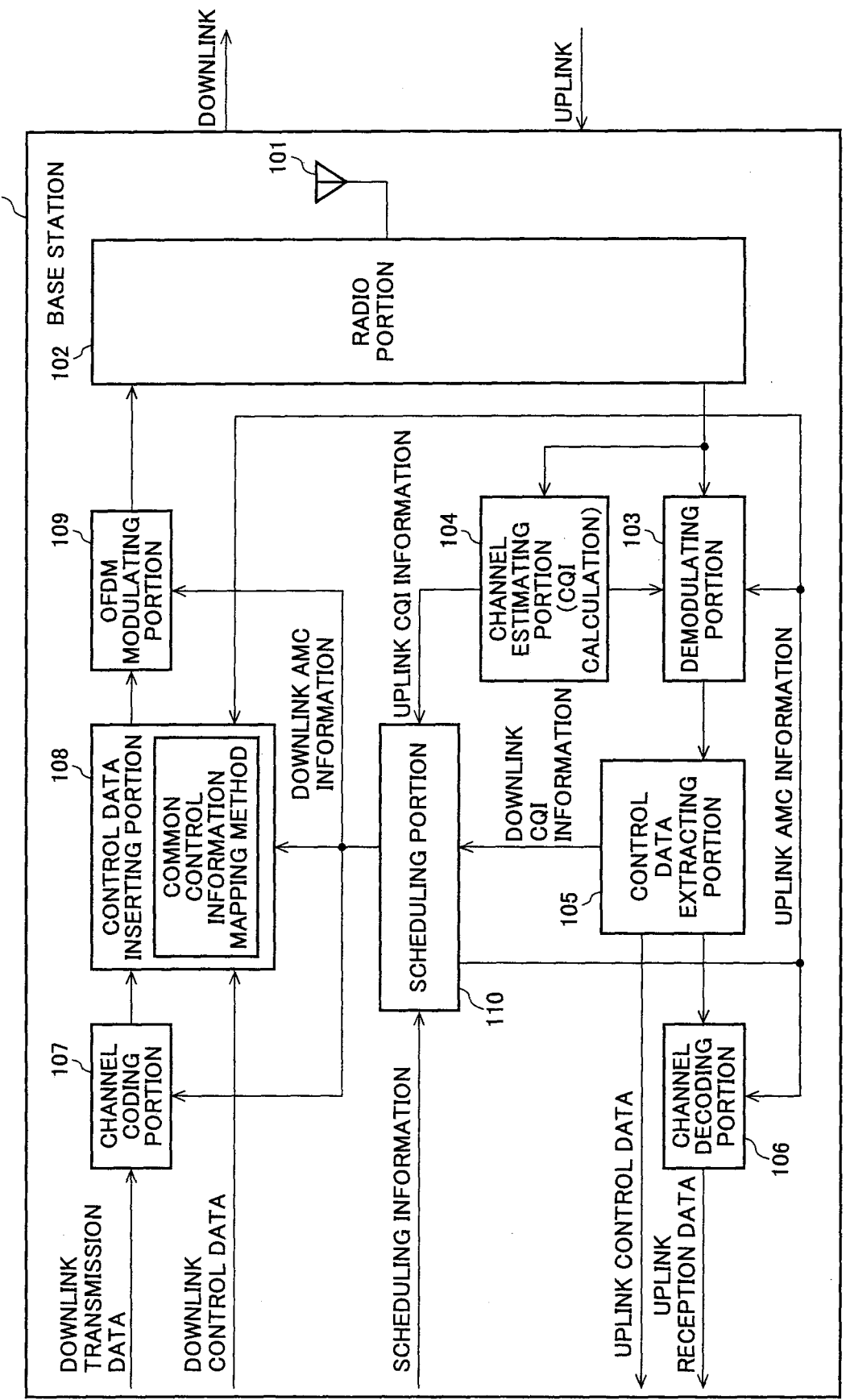
FIG. 7 is a view of an exemplary structure of a base station related to the present invention.
Figure 8:
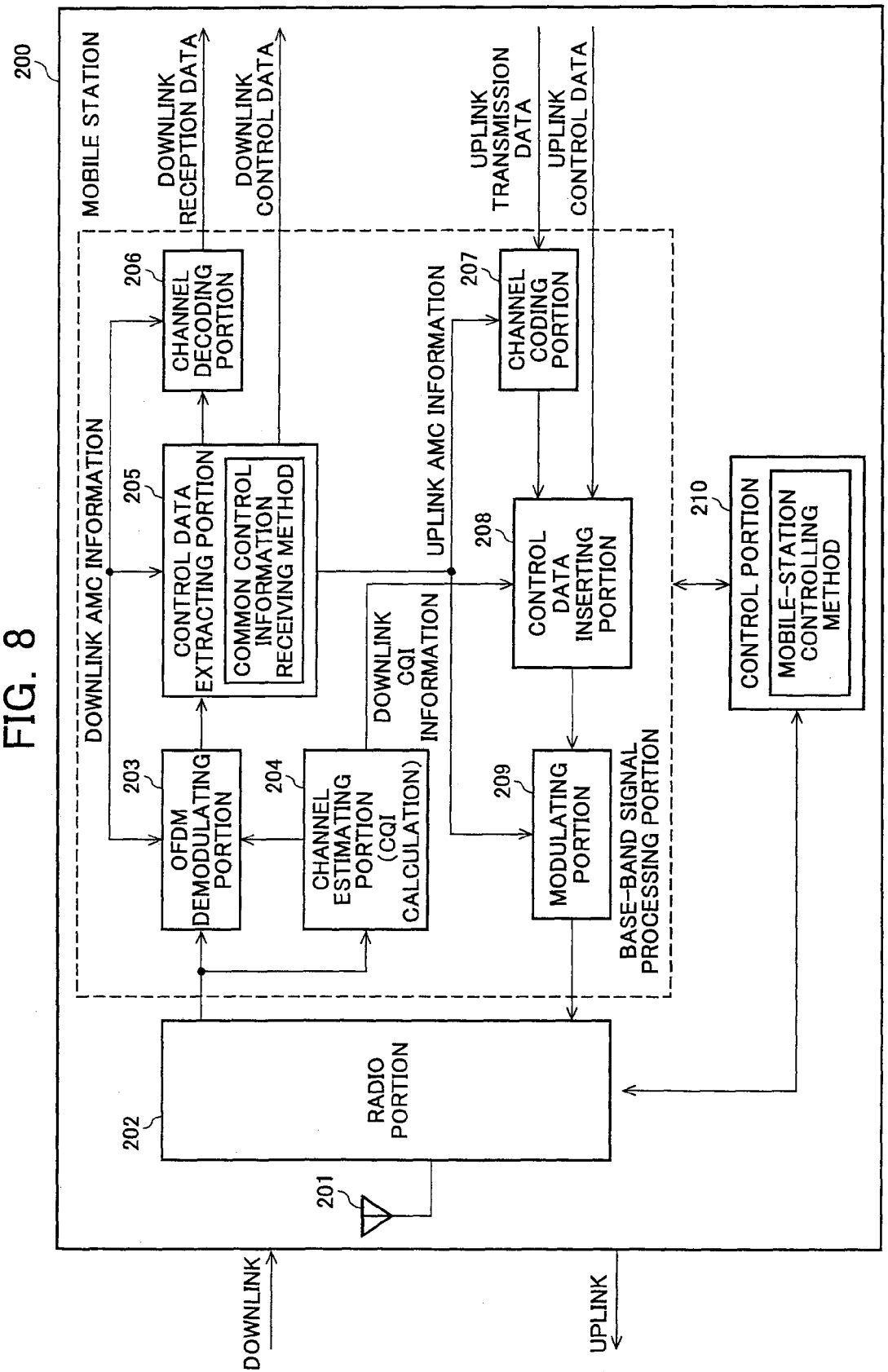
FIG. 8 is a view of an exemplary structure of a mobile station related to the present invention.

FIGS. 7 and 8 are views of respective exemplary structures of a base station and a mobile station related to the present invention. In FIG. 7, a base station 100 is made up of an antenna portion 101, a radio portion 102, a demodulating portion 103, an uplink channel estimating portion 104, a control data extracting portion 105, a channel decoding portion 106, a channel coding portion 107, a control data inserting portion 108, an OFDM modulating portion 109, and a scheduling portion 110.

In FIG. 8, a mobile station 200 is made up of an antenna portion 201, a radio portion 202, an OFDM demodulating portion 203, a downlink channel estimating portion 204, a control data extracting portion 205, a channel decoding portion 206, a channel coding portion 207, a control data inserting portion 208, a modulating portion 209, and a control portion 210.

A principle of operation of the base station 100 and the mobile station 200 assumed based on the proposition of 3GPP will briefly be described with reference to FIGS. 7 and 8.

In the base station 100, if the base station 100 receives packet data (including the subscriber identification information, for example, IMSI (International Mobile Subscriber Identity), IMEI (International Mobile Equipment Identity), TMSI (Temporary Mobile Subscriber Identity), TMEI (Temporary Mobile Equipment Identity), and IP address) addressed to the mobile station 200 from a higher-level network node (e.g., SGSN (Serving GPRS Support Node) or RNC (Radio Network Control) of the W-CDMA mode, not shown), the packet data are stored in a base-station transmission data buffer (not shown). The downlink transmission data from the transmission data buffer are input to the channel coding portion 107; the channel coding portion 107 inputs the output signals from the scheduling portion 110, i.e., downlink AMC information such as a downlink AMC mode and downlink mobile station allocation information (downlink scheduling information), uses the AMC mode defined by the downlink AMC information (e.g., turbo code, encoding rate ⅔) to execute the encoding process for the downlink transmission data; and the output thereof is input to the control data inserting portion 108.

The downlink control data include control data for the downlink pilot channel DPCH, the downlink common control channel DCCCH, and the downlink synchronization channel DSNCH. The downlink control data are input to the control data inserting portion 108 and the control data mapping is performed for the downlink common control channel DCCCH shown in FIG. 1. The packet indicator PI information is mapped on the downlink common control channel DCCCH in a specified or calculated frequency bandwidth (or mapped on the downlink shared control signaling channel DSCSCH in some cases).

On the other hand, the downlink AMC information (such as AMC mode and downlink scheduling information) determined by the scheduling portion 110 is input to the control data inserting portion 108 and the control data mapping is performed for the downlink shared control signaling channel DSCSCH.

The output of the control data inserting portion 108 is sent to the OFDM modulating portion 109 along with the downlink common control channel DCCCH, the downlink shared control signaling channel DSCSCH, and the downlink shared data channel DSDCH mapped thereon. The OFDM modulating portion 109 performs the data modulation, the serial/parallel conversion of the input signal, and the multiplication of the spread code and the scrambling code and executes the OFDM signal process such as IFFT (Inverse Discrete Fourier Transform), CP (Cyclic Prefix) insertion, and filtering to generate the OFDM signal. The OFDM modulating portion 109 inputs the downlink AMC information from the scheduling portion 110 to control the data modulation (e.g., 16QAM) of the sub-carriers. The radio frame shown in FIG. 4 is generated and converted to the RF (Radio Frequency) frequency band by a transmission circuit of the radio portion, and the downlink signal is transmitted from the antenna portion.

On the other hand, the uplink signal sent from the mobile station 200 is received by the antenna portion 101, converted from the RF frequency to IF or directly to the base band by a reception circuit of the radio portion, and input to the demodulating portion 103. The uplink signal may be an OFDM signal, an MC-CDMA (Multi-Carrier-CDMA) signal, or a single carrier SC signal and a VSCRF-CDMA (Variable Spreading and Chip Repetition Factors-CDMA) signal for reducing PAPR (see, e.g., patent document 2 (Japanese Laid-Open Patent Publication No. 2004-197756, "Mobile Station, Base Station, and Wireless Transmission Program and Method")).

The uplink channel estimating portion 104 uses the uplink pilot channel UPCH to estimate the propagation path quality of the individual uplink channels of the mobile stations and calculates the uplink propagation path quality information CQI. The calculated uplink CQI information is input to the scheduling portion 110. The uplink AMC information such as uplink AMC mode and uplink scheduling information is input to the control data inserting portion 108, mapped on the downlink shared control signaling channel DSCSCH, and transmitted to the corresponding mobile station 200.

The corresponding mobile station 200 transmits packet data with the determined uplink AMC mode and uplink scheduling information in accordance with the uplink AMC information that is output from the scheduling portion 110. The uplink signal of the packet data is input to the demodulating portion 103 and the channel decoding portion 106. On the other hand, the uplink AMC information output from the scheduling portion 110 is input to the demodulating portion and the channel decoding portion 106, and the demodulation (e.g., QPSK) and decoding process (e.g., convolution coding, encoding rate ⅔) is executed for the uplink signal in accordance with this information.

The control data extracting portion 105 extracts control information of the uplink contention-based channel UCBCH and the uplink shared control signaling channel USCSCH. The control data extracting portion 105 extracts the downlink channel propagation path quality information CQI of the mobile station 200 sent through the uplink shared control signaling channel USCSCH and inputs the information to the scheduling portion 110 to generate the downlink AMC information.

The scheduling portion 110 receives input of the uplink CQI information from the uplink channel estimating portion 104, input of the downlink CQI information feedback by the mobile station 200 from the control data extracting portion 105, and input of the downlink/uplink transmission data buffer information, the uplink/downlink QoS (Quality of Service) information, various pieces of service class information, the mobile station class information, and the subscriber identification information of the mobile stations from a base station control portion (not shown).

The scheduling portion 110 integrates these pieces of input information, generates the uplink/downlink AMC information in accordance with the selected scheduling algorithm at the specified or calculated center frequency, and outputs the information to the portions shown in FIG. 7 to implement the transmission scheduling of the packet data.

The mobile station 200 receives the downlink OFDM signal with the antenna portion 201, converts the downlink reception signal from the RF frequency to IF or directly to the base band with a local RF frequency oscillation circuit (synthesizer), a down converter, a filter, an amplifier, etc., of the radio portion 202, and inputs the signal to the OFDM demodulating portion 203. The downlink channel estimating portion 204 uses the downlink pilot channel DPCH (uses the downlink common pilot channel DCPCH, the downlink dedicated pilot channel DDPCH, or a combination of both) to estimate the propagation path quality of the individual downlink channels of the mobile stations and calculates the downlink propagation path quality information CQI. The calculated downlink CQI information is input to the control data inserting portion 208, mapped on the uplink shared control signaling channel USCSCH, and transmitted to the base station 100.

The OFDM demodulating portion 203 performs CP (Cyclic Prefix) removal of input signal, FFT (Discrete Fourier Transform), and the multiplication of the spread code and the scrambling code, executes the OFDM signal demodulation process such as the parallel/serial conversion, data demodulation, and filtering to generate the demodulation data, which are input to the control data extracting portion 205.

The control data extracting portion 205 extracts the downlink channel control information (such as packet indicator PI information, packet paging information, downlink access information, and broadcast information) other than the downlink shared data channel DSDCH (the information is mapped on the downlink shared control signaling channel DSCSCH in some cases). The downlink AMC information is extracted such as the downlink AMC mode and the downlink scheduling information mapped on the downlink shared control signaling channel DSCSCH and is output to the OFDM demodulating portion 203 and the channel decoding portion 206. The uplink AMC information is extracted such as the uplink AMC mode and the uplink scheduling information mapped on the downlink shared control signaling channel DSCSCH and is output to the modulating portion 209 and the channel coding portion 207.

The OFDM demodulating portion 203 uses the AMC mode (e.g., 16QAM) defined by the downlink AMC information to demodulate the sub-carriers. The channel decoding portion uses the AMC mode (e.g., turbo code, encoding rate ⅔) defined by the downlink AMC information to decode the packet data addressed to the own station, which are mapped on the downlink shared data channel DSDCH.

The channel coding portion 207 inputs the uplink transmission data that are individual packet data of the mobile station 200, uses the downlink AMC information (e.g., convolution coding, encoding rate ⅔) output from the control data extracting portion 205 to encode the data, which are output to the control data inserting portion 208.

The control data inserting portion 208 maps the downlink CQI information from the downlink channel estimating portion 204 onto the uplink shared control signaling channel USCSCH included in the uplink scheduling channel USCH and maps the uplink contention-based channel UCBCH and the uplink scheduling channel USCH onto the uplink transmission signal.

The modulating portion 209 uses the downlink AMC information (e.g., QPSK) output from the control data extracting portion 205 to perform data modulation and outputs the signal to a transmission circuit of the radio portion 202. The uplink signal may be modulated with the use of the OFDM signal, the MC-CDMA signal, or the single carrier SC signal and the VSCRF-CDMA signal for reducing PAPR.

The control portion 210 has the mobile station class information, the unique frequency bandwidth information, and the subscriber identification information. The control portion 210 sends a control signal causing a shift to the specified or calculated center frequency to the radio portion 202 and performs the shift to the center frequency with the local RF frequency oscillation circuit (synthesizer) of the radio portion 202.

A base band signal is converted to the RF frequency band by the local RF frequency oscillation circuit (synthesizer), an upconverter, a filter, and an amplifier of the radio portion 202 and the uplink signal is transmitted from the antenna portion 201. The radio portion 202 includes IF and RF filters corresponding to the above different frequency bandwidths (e.g., 1.25 MHz, 2.5 MHz, 5 MHz, 10 MHz, 20 MHz).

Figure 9:
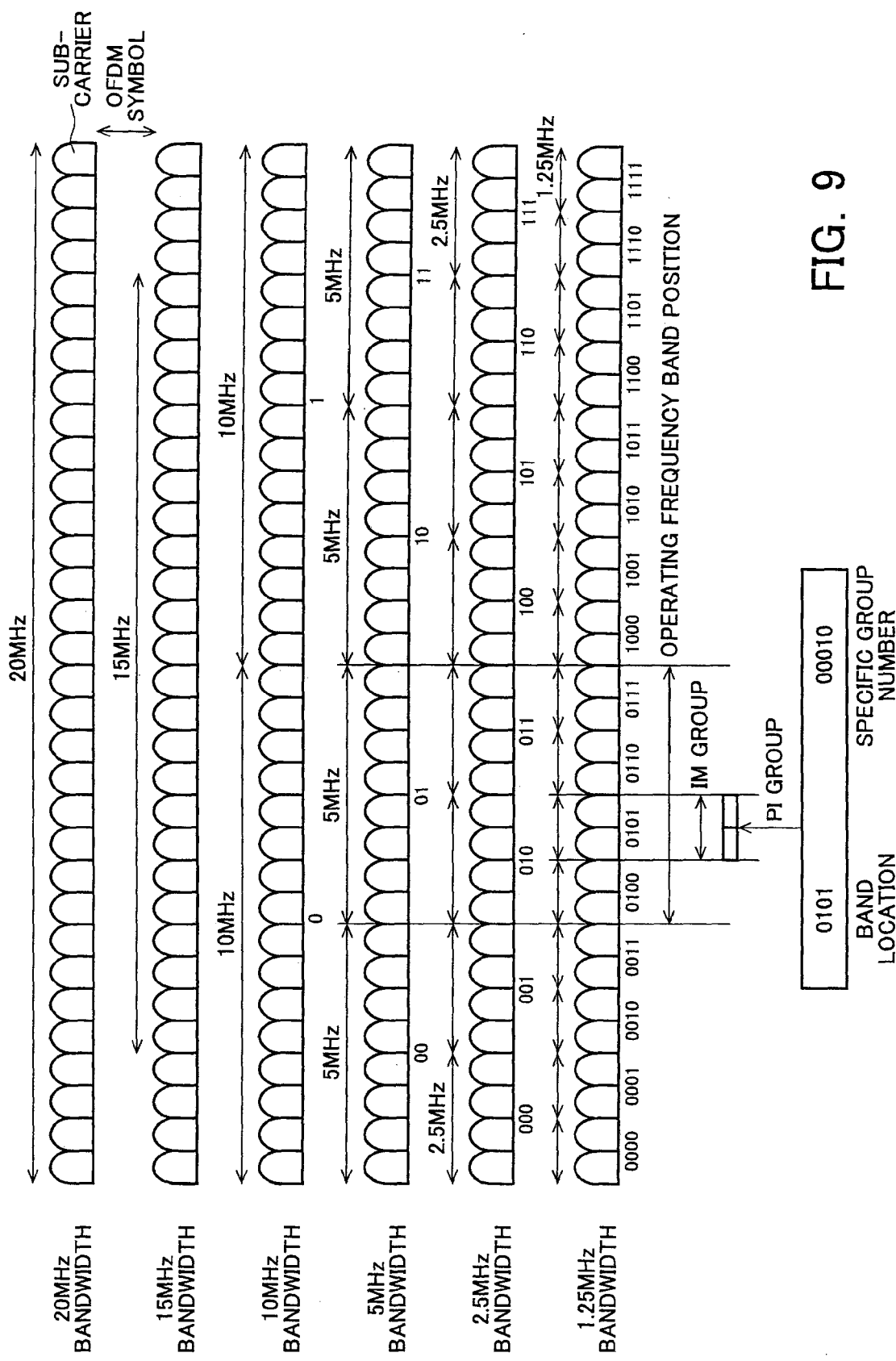
FIG. 9 is a view for explaining a first embodiment of the present invention.

FIG. 9 is a view for explaining a first embodiment of the present invention. The first embodiment proposes a method of specifying an operating frequency band position of a mobile station for containing within the unique frequency bandwidth of the base station device the mobile stations in the different mobile station classes assumed based on the proposition of 3GPP for the EUTRA. The operating frequency band of the mobile station is a frequency band used by at least the mobile station in the active mode for transmitting/receiving packets.

In FIG. 9, when the unique frequency bandwidth of the base station is 20 MHz, numbers are applied to the downlink frequency bands used by the respective mobile stations in the different mobile station classes. A structure will hereinafter be described for the numbers allocated to the operating frequency bands of the mobile stations. In the structure shown in FIG. 9, it is assumed that the operating frequency bands of the mobile stations do not overlap.

The operating frequency band position of the mobile station in the 20-MHz or 15-MHz mobile station class is inevitably determined since only one option exists as shown in FIG. 9. The operating frequency band position of the mobile station in the 10-MHz mobile station class has two candidates (Nos. 0 and 1 (binary number representation)), and the operating frequency band position of the mobile station in the 5-MHz mobile station class has four candidates (Nos. 00, 01, 10, and 11). The operating frequency band position of the mobile station in the 2.5-MHz mobile station class has eight candidates (Nos. 000 to 111), and the operating frequency band position of the mobile station in the 1.25-MHz mobile station class has 16 candidates (Nos. 0000 to 1111).

The mobile stations in the respective mobile station classes are shifted to suitable frequency positions selected from the above candidates of the operating frequency band. The frequency band positions of the mobile stations should fairly be selected without a bias in consideration of the frequency utilization efficiency.

Since individual information is not exchanged between the base station and the mobile station at the time of the idle mode, the base station cannot comprehend the operating frequency band position of the idle-mode mobile station contained in the own station. Therefore, when notifying the mobile station of an incoming packet at the start of the downlink communication, the base station does not know what frequency band should be used for transmitting the paging information. Although this can be solved if all the mobile stations in the idle mode receive the paging information in the same predetermined frequency band, since the mobile stations in all the mobile station classes transmit/receive the paging information and the specification information of the operating frequency band position in a certain frequency band, traffics are increased in the certain frequency band, resulting in reduction in the frequency utilization efficiency.

Even if the operating frequency bands are arranged such that certain frequency bands are used by respective mobile station classes, traffics in a certain frequency band are not improved when all the mobile stations within the base station are in the 1.25-MHz mobile station class, for example. Therefore, the operating frequency band positions should be selected in such a method of reducing a communication traffic amount of the paging information and the shift position specification information at the start of the downlink communication.

Similarly, the mobile station does not know what frequency band should be used for transmitting the contention-based access at the start of the uplink communication. Although this can be solved if all the mobile stations in the idle mode perform the contention-based access in the same predetermined frequency band, since all the mobile stations perform the contention-based access in a certain frequency band, a collision frequency is increased in the certain frequency band. Therefore, the operating frequency band positions should be selected in such a method of reducing the collision frequency of the contention-based access at the start of the uplink communication.

If the mobile stations always receive the downlink signals in the frequency bandwidths determined in the mobile station classes in the idle mode, this is inefficient in power consumption for the mobile station in the mobile station class having a greater frequency band. Since the reception signal should be received by the mobile station in the 1.25-MHz mobile station class at the time of the idle mode, the mobile stations in the mobile station classes equal to or greater than 1.25 MHz should also receive only the 1.25-MHz bandwidth signals to narrow down the reception bandwidth and reduce the power consumption.

Therefore, a plurality of mobile stations is grouped that have the same frequency band position of receiving the downlink signals at the time of the idle mode and is referred to as an IM group (idle mode group). It is assumed here that each IM group receives a frequency bandwidth of 1.25 MHz. The frequency band received by the IM group is defined as an operating frequency band at the time of the idle mode. The frequency band position of the IM group is included in the operating frequency band. The IM group includes different mobile station classes. Since the bandwidth received by the IM group is 1.25 MHz, the numbers for the operating frequency band candidates of the 1.25-MHz mobile station class can also be used as the number indicating the IM groups.

A plurality of mobile stations belonging to the same IM group is grouped into an incoming packet group and is referred to as a PI group (packet indicator group). If a mobile station belonging to a PI group #n is notified of the presence of an incoming call to the PI group #n through the packet indicator PI, the mobile station receives the downlink shared control signaling channel DSCSCH and the downlink shared data channel DSDCH to check whether an incoming packet addressed to the own station exists.

For example, a number 010100010 shown in FIG. 9 indicates that a mobile station in the 5-MHz mobile station class belongs to an operating frequency band position of 01, an IM group of 0101, and a PI group of 00010.

Due to the grouping in the reception frequency area of the downlink signals at the time of the idle mode, the mobile stations in the idle mode receive signals in a narrower frequency bandwidth and the power consumption can be reduced.

By combining and more finely dividing the grouping in the frequency domain and the grouping in the time domain (FDM/TDM), the reception frequency/time positions of the mobile stations in the idle mode can be distributed. As a result, the mobile stations in the idle mode receive signals in narrow ranges in both frequency and time and the power consumption can considerably be reduced. This can be implemented by further dividing the IM group and arranging the packet indicator PI for each TTI, for example. Specifically, a bit indicating a TTI position in a frame may be added to the IM group number as shown in FIG. 10.

Figure 11:
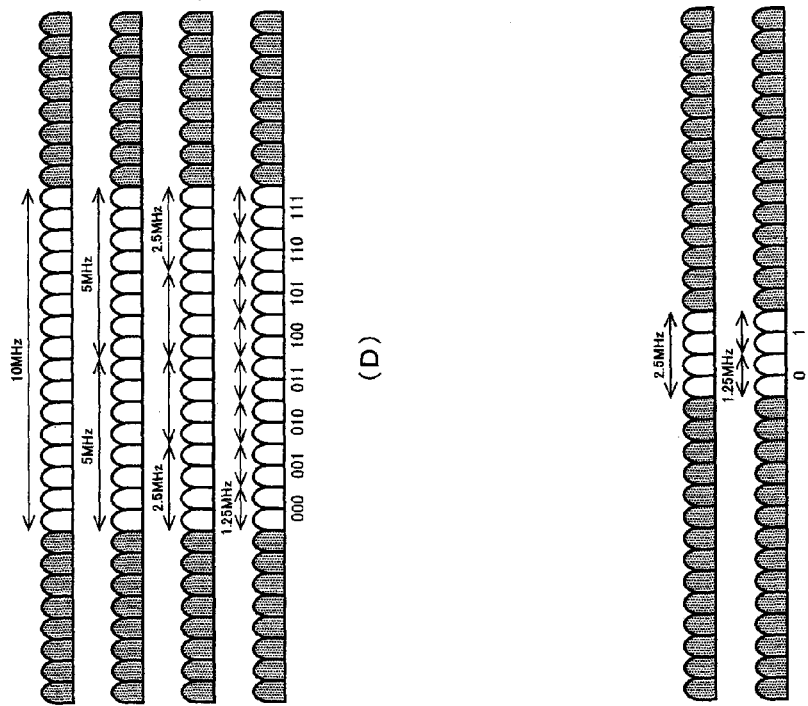
FIG. 11 is a view of how the numbers are applied to candidates for the operating frequency bands of mobile stations in different mobile station classes when the unique frequency bandwidths of the base station are 15 MHz, 10 MHz, 5 MHz, and 2.5 MHz.

FIG. 11 is a view of how the numbers are applied to candidates for the operating frequency bands of mobile stations in different mobile station classes when the unique frequency bandwidths of the base station are 15 MHz, 10 MHz, 5 MHz, and 2.5 MHz; FIG. 11(A) shows the case that the unique frequency bandwidth of the base station is 15 MHz; FIG. 11(B) shows the case that the unique frequency bandwidth of the base station is 10 MHz; FIG. 11(C) shows the case that the unique frequency bandwidth of the base station is 5 MHz; and FIG. 11(D) shows the case that the unique frequency bandwidth of the base station is 2.5 MHz. By applying the numbers corresponding to the unique frequency bandwidths of the base station as above, the unique frequency bandwidths of the base station can flexibly be accommodated.

To perform the above specification without communication between the base station and the mobile station, the subscriber identification information identifying the mobile station is utilized which is retained by both the base station and the mobile station at the time of an incoming packet. The subscriber identification information is IMSI, TMSI, IMEI, TMEI used in the W-CDMA mode or information for identifying a subscriber or terminal such as an IP address allocated to a mobile station. By way of example, description will be made here based on IMSI.

The operating frequency band position, the IM group, and the PI group are calculated from the subscriber identification information IMSI (IMSI=1, 2, 3, ..., n), the unique frequency bandwidth MBnb (Node B Maximum Band, MBnb=1.25, 2.5, 5, 10, 20 MHz) of the base station, and the unique frequency bandwidths Bn of the mobile stations.

Figure 12:
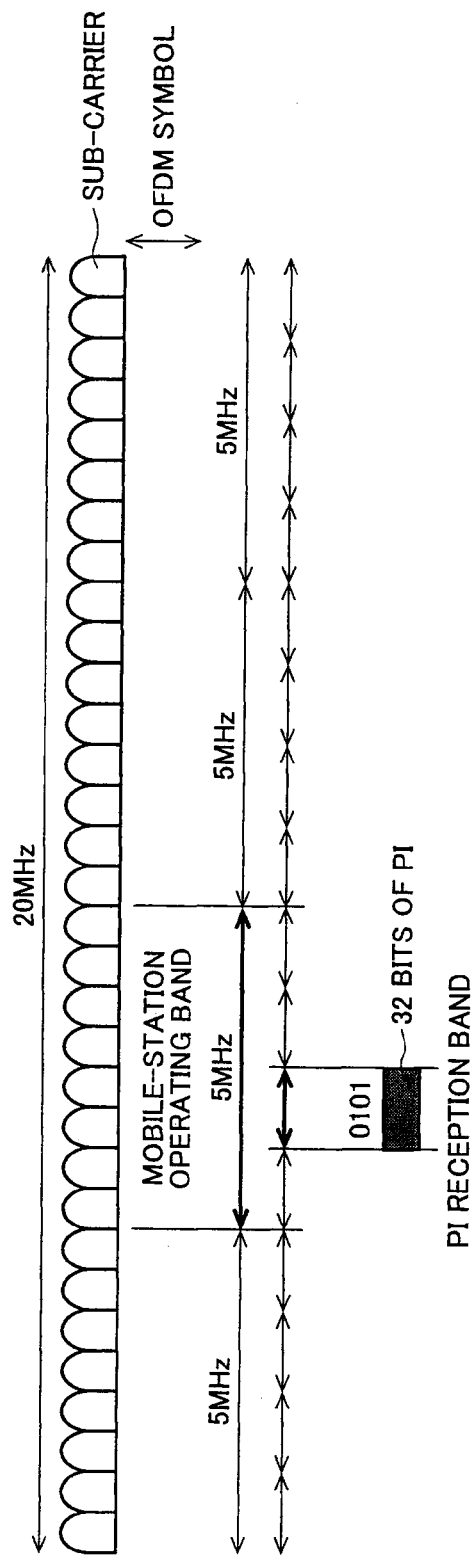
FIG. 12 is a view for explaining a calculating method of an operating frequency band position, an IM group, and a PI group.

FIG. 12 is a view for explaining a calculating method of the operating frequency band position, the IM group, and the PI group.

It is assumed here that the subscriber identification information is IMSI=101010010100010 (binary number representation), that the unique frequency bandwidth of the mobile station is Bn=5 MHz, that the unique frequency bandwidth of the base station is MBnb=20 MHz, and that the bandwidth received by the IM group is Bim=1.25 MHz. Calculations are then made for an operating frequency band position number Ps identifying the operating frequency band position, an IM group number Pim identifying the IM group, and a PI group number Ppi identifying the PI group. The number of PI groups Npi included in the bandwidth Bim received by the IM group is 32. The total number of the PI groups included in the 20-MHz bandwidth is 512.

The highest two bits of 010100010 calculated through the calculation of the subscriber identification information IMSI mod 512 indicate that the operating frequency band position number Ps is 01 of the 5-MHz band; the highest four bits indicate that the IM group number Pim is 0101; and the lowest five bits indicate that the PI group number Ppi is 00010.

The calculating equations generalizing the above processes are as follows.

number of IM groups $(Nim) = MBnb$ (MHz)$/Bim$ (MHz)  (Eq. 1)

number of IM groups in operating frequency band position $(Nim\_s) = Bn$ (MHz)$/Bim$ (MHz)  (Eq. 2)

PI group number $(Ppi) = $ IMSI mod $Npi$  (Eq. 3)

IM group number $(Pim) = $ IMSI$/Npi$ mod $Nim$  (Eq. 4)

number of candidates for operating frequency band position $(Ns) = MBnb/Bn$  (Eq. 5)

operating frequency band position number $(Ps) = $ IMSI$/(Npi \times Nim\_s)$ mod $Ns$  (Eq. 6)

However, if the IM groups at the time of the idle mode are arranged in the FDM/TDM arrangement, when the number of TTI in the frame is Ntti=20, the equations are as follows.

time-direction IM group number $(Pim\_t) = $ IMSI$/Npi/Nim$ mod $Ntti$,

FDM/TDM IM group number $(Pim\_ft) = Pim \times Pim\_t$.

Figure 13:
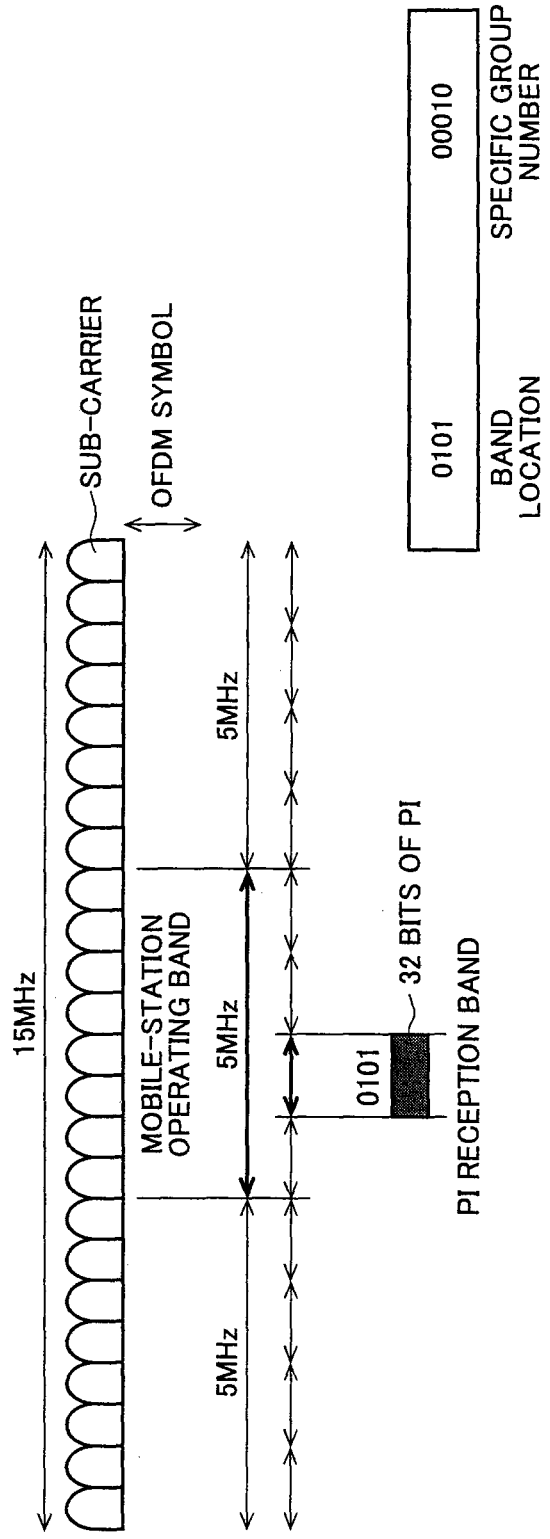
FIG. 13 is another view for explaining the calculating method of the operating frequency band position, the IM group, and the PI group.

FIG. 13 is another view for explaining the calculating method of the operating frequency band position, the IM group, and the PI group and shows the calculating method when the subscriber identification information is IMSI=101010010100010 (binary number representation); the unique frequency bandwidth of the mobile station is Bn=5 MHz; the unique frequency bandwidth of the base station is MBnb=15 MHz; and the number of PI groups is Npi=32. In this case, when using the above equations, the operating frequency band position number, the IM group number, and the PI group number are as follows.

$$\text{number of IM groups } (Nim)=15/1.25=12 \tag{Eq. 7}$$

$$\text{number of IM groups in operating frequency band position } (Nim\_s)=5/1.25=4 \tag{Eq. 8}$$

$$\text{PI group number } (Ppi)=21666 \text{ mod } 32=00010 \tag{Eq. 9}$$

$$\text{IM group number } (Pim)=21666/32 \text{ mod } 12=0101 \tag{Eq. 10}$$

$$\text{number of candidates for operating frequency band position } (Ns)=15/5=3 \tag{Eq. 11}$$

$$\text{operating frequency band position number } (Ps)=21666/(32\times 4) \text{mod } 3=01 \tag{Eq. 12}$$

Figure 14:
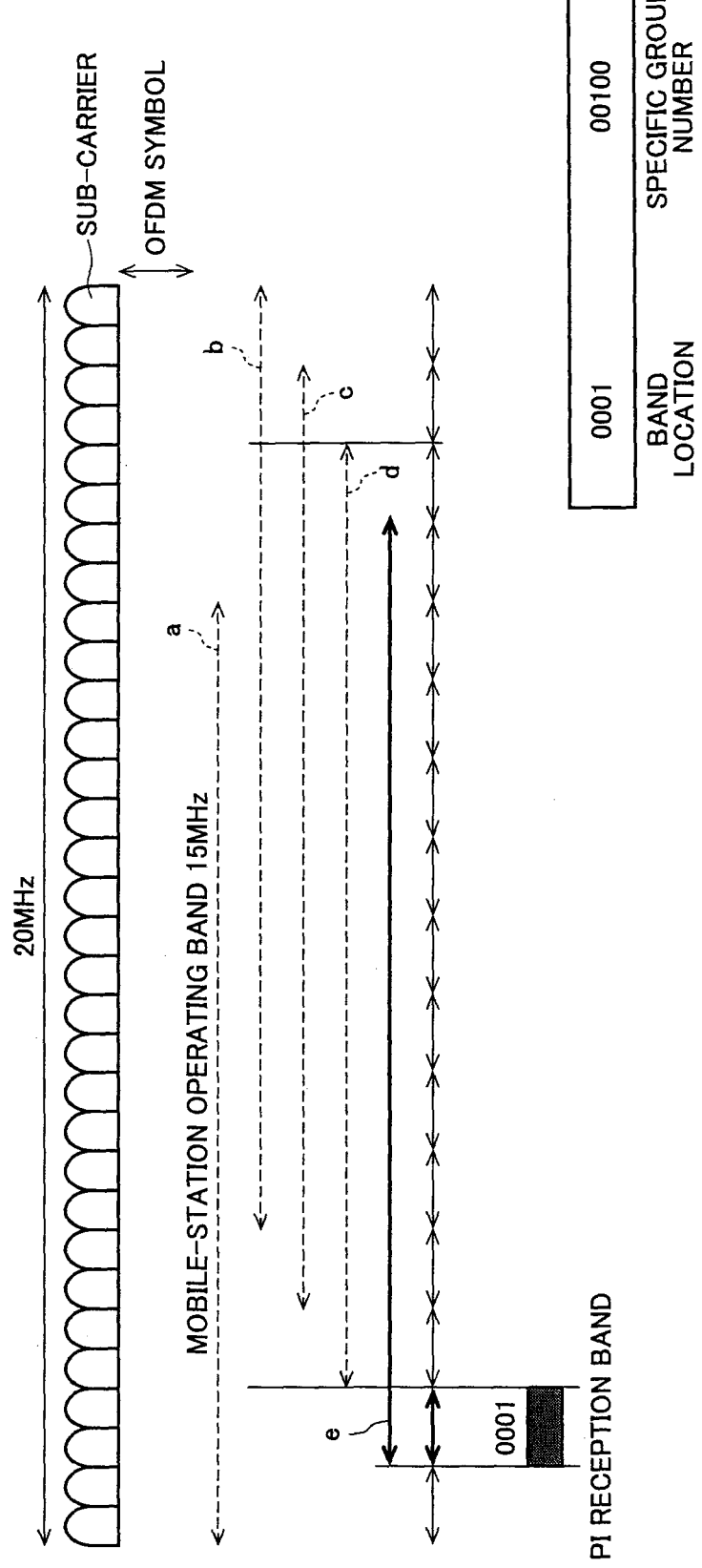
FIG. 14 is yet another view for explaining the calculating method of the operating frequency band position, the IM group, and the PI group.

FIG. 14 is yet another view for explaining the calculating method of the operating frequency band position, the IM group, and the PI group and shows the calculating method when the subscriber identification information is IMSI=101010010100100 (binary number representation); the unique frequency bandwidth of the mobile station is Bn=15 MHz; the unique frequency bandwidth of the base station is MBnb=20 MHz; and the number of PI groups is Npi=32. In this case, when using the above equations, the operating frequency band position number, the IM group number, and the PI group number are as follows.

$$\text{number of IM groups } (Nim)=20/1.25=16 \tag{Eq. 13}$$

$$\text{number of IM groups in operating frequency band position } (Nim\_s)=15/1.25=12 \tag{Eq. 14}$$

$$\text{PI group number } (Ppi)=21540 \text{ mod } 32=00100 \tag{Eq. 15}$$

$$\text{IM group number } (Pim)=21540/32 \text{ mod } 16=0001 \tag{Eq. 16}$$

$$\text{number of candidates for operating frequency band position } (Ns)=20/15=1 \tag{Eq. 17}$$

$$\text{operating frequency band position number } (Ps)=21540/(32\times 4) \text{mod } 1=0 \tag{Eq. 18}$$

If the base-station unique frequency bandwidth MBnb is 20 MHz and the mobile-station unique frequency bandwidth Bn is 15 MHz, the frequency band corresponding to the remaining 5 MHz cannot be used by the mobile station. For example, if the operating frequency band position of the mobile station in the 15-MHz mobile station class is fixed to the center of the base-station unique frequency bandwidth of 20 MHz as shown in FIG. 9, the IM group position may correspond to right and left 2.5-MHz bands unusable for the mobile stations in the case of the above calculating method. A means of avoiding this situation may be a method of performing calculations with the base-station unique frequency bandwidth MBnb set to 15 MHz and using a number sequence for the base-station unique frequency bandwidth of 15 MHz shown in FIG. 11(A) to specify the IM group position.

In another method, the operating frequency band position of the mobile station in the 15-MHz mobile station class is made variable such that the position can be shifted from the center frequency of 15 MHz to the right or left by 2.5 MHz. As shown in FIG. 14, five candidates a to e for the mobile-station operating frequency band position are available and the operating frequency band position is selected in accordance with the IM group number. As a result, the base station having the unique frequency bandwidth of 20 MHz can efficiently arrange the mobile stations in the 15-MHz mobile station class.

Figure 15:
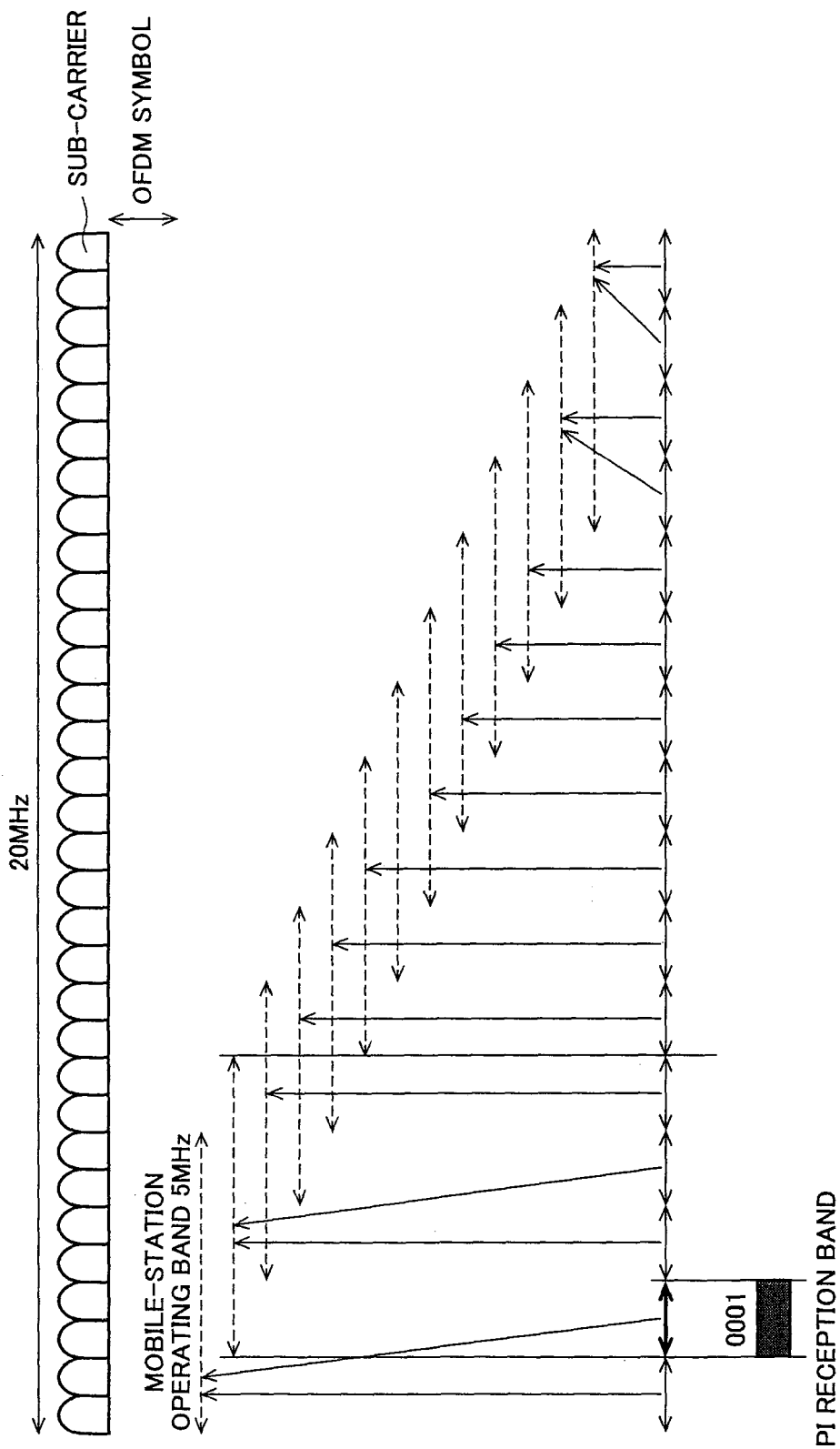
FIG. 15 is a view of an example of structuring the operating frequency bands in an overlapped manner.

The above method is applicable to the mobile stations in the classes other than the 15-MHz mobile station class. The operating frequency bands can flexibly be configured by correlating and prescribing the IM group numbers and the operating frequency bands without fixing the structures of the 15-MHz, 10-MHz, 5-MHz, and 2.5-MHz operating frequency bands. For example, in the case of the mobile stations in the 5-MHz mobile station class, the operating frequency bands may be structured in an overlapping manner as shown in FIG. 15.

The calculated operating frequency band position number (Ps) can be used for calculating an uplink/downlink RF center frequency and channel number UARFCN (UTRA Absolute Radio Frequency Channel Number, (non-patent document 6); 3GPP TS 25.101, V6.8.0 (2005-06), User Equipment (UE) radio transmission and reception (FDD), http://www.3gpp.org/ftp/Specs/html-info/25-series.htm) of the radio portion 102 of the base station device and the radio portion 202 of the mobile station.

First, the minimum frequency DL_NBfmin of the downlink bandwidth of the mobile station is calculated with the unique frequency bandwidth MBnb of the base station and the downlink center frequency NBfc of the base station.

$$DL\_NBf\text{min}=NBfc-MBnb/2 \tag{Eq. 19}$$

The center frequency DL_Fs of the downlink operating frequency band of the mobile station and the IM group center frequency DL_Fim are then calculated.

$$DL\_Fs=NBf\text{min}+Bn\cdot(2Ps+1)/2 \text{ (MHz)} \tag{Eq. 20}$$

$$DL\_Fim=NBf\text{min}+Bim\cdot(2Pim+1)/2 \text{ (MHz)} \tag{Eq. 21}$$

For example, in the case of the base-station unique frequency bandwidth MBnb=20 MHz and the base-station downlink center frequency NBfc=2144.9 MHz, the minimum frequency DL_NBfmin of the downlink operating frequency band of the mobile station is as follows.

$$DL\_NBf\text{min}=NBfc-MBnb/2=2144.9-20/2=2134.9 \text{ MHz} \tag{Eq. 26}$$

In the case of FIG. 12, the center frequency DL_Fs of the downlink operating frequency band of the mobile station and the IM group center frequency DL_Fim are as follows (Bn=5 MHz, MBnb=20 MHz, Bim=1.25 MHz, Npi=32, Ps=1, Pim=5, Ppi=2, Nim=16, Nim_s=4, Ns=4), $$DL\_Fs=NBf\text{min}+Bn\cdot(2Ps+1)/2=2134.9+5\times(2+1)/2=2142.4 \text{ (MHz)} \tag{Eq. 22}$$

$$DL\_Fim=NBf\text{min}+1.25\cdot(2Pim+1)/2=2134.9+1.25\times(2\times 5+1)/2=2142.05 \text{ (MHz)} \tag{Eq. 23}$$

TABLE 1

| | UTRA FDD frequency bands | |
| --- | --- | --- |
| Operating Band | UL Frequencies UE transmit, Node B receive | DL Frequencies UE receive, Node B transmit |
| 1 | 1920-1980 MHz | 2110-2170 MHz |
| 2 | 1850-1910 MHz | 1930-1990 MHz |

TABLE 1-continued

UTRA FDD frequency bands

| Operating Band | UL Frequencies UE transmit, Node B receive | DL Frequencies UE receive, Node B transmit |
|---|---|---|
| 3 | 1710-1785 MHz | 1805-1880 MHz |
| 4 | 1710-1755 MHz | 2110-2155 MHZ |
| 5 | 824-849 MHz | 869-894 MHz |
| 6 | 830-840 MHz | 875-885 MHz |

With the operating band shown in Table. 1, the center frequency of the uplink operating frequency band of the mobile station and the IM group center frequency can be calculated.

$$UL\_Fs = DL\_Fs - 190 = 1952.4 \text{ (MHz)} \quad \text{(Eq. 24)}$$

$$UL\_Fim = DL\_Fim - 190 = 1952.05 \text{ (MHz)} \quad \text{(Eq. 25)}$$

Figure 16:
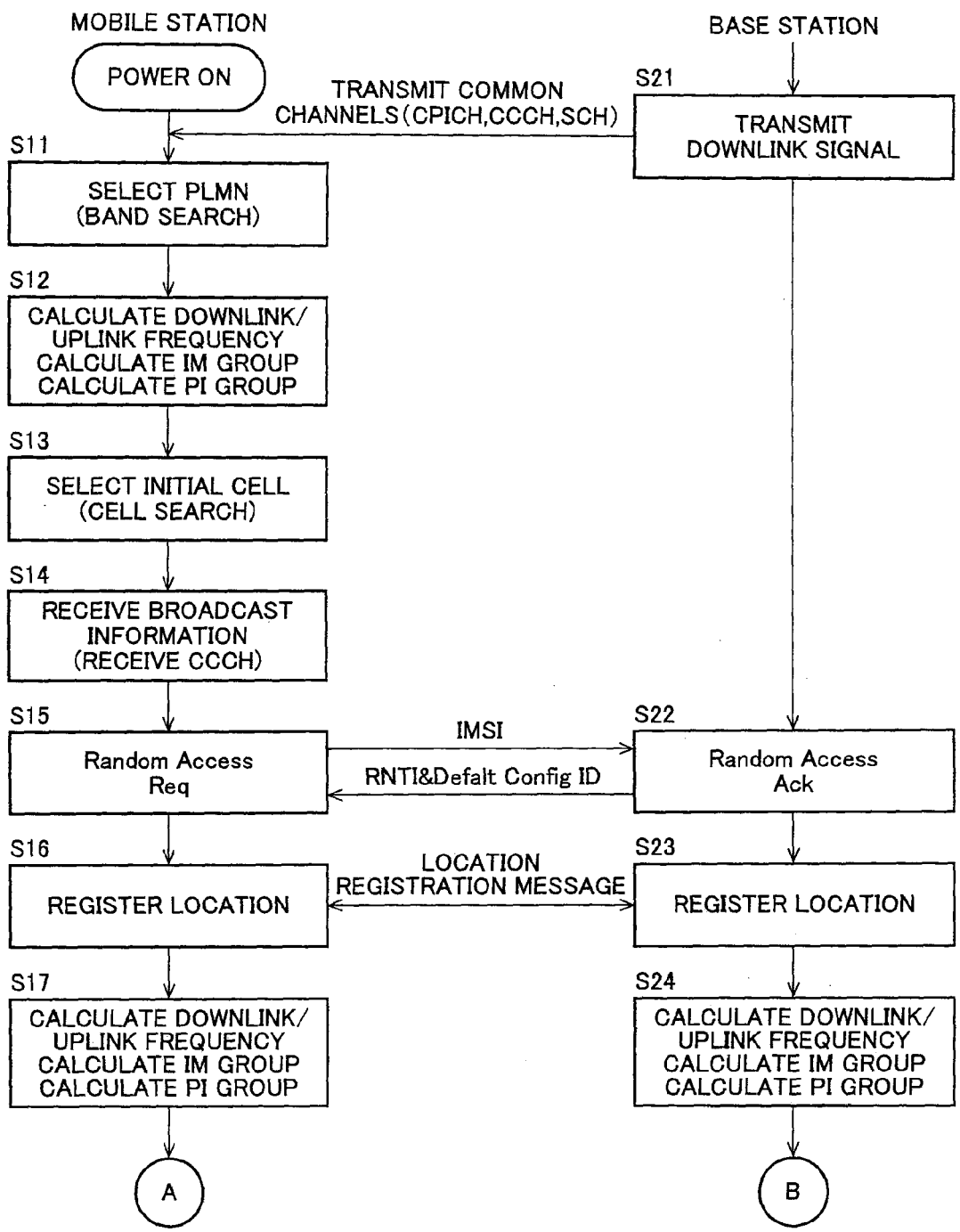
FIG. 16 is a flowchart for explaining a process when the mobile station is powered on and transits to the idle mode.
Figure 17:
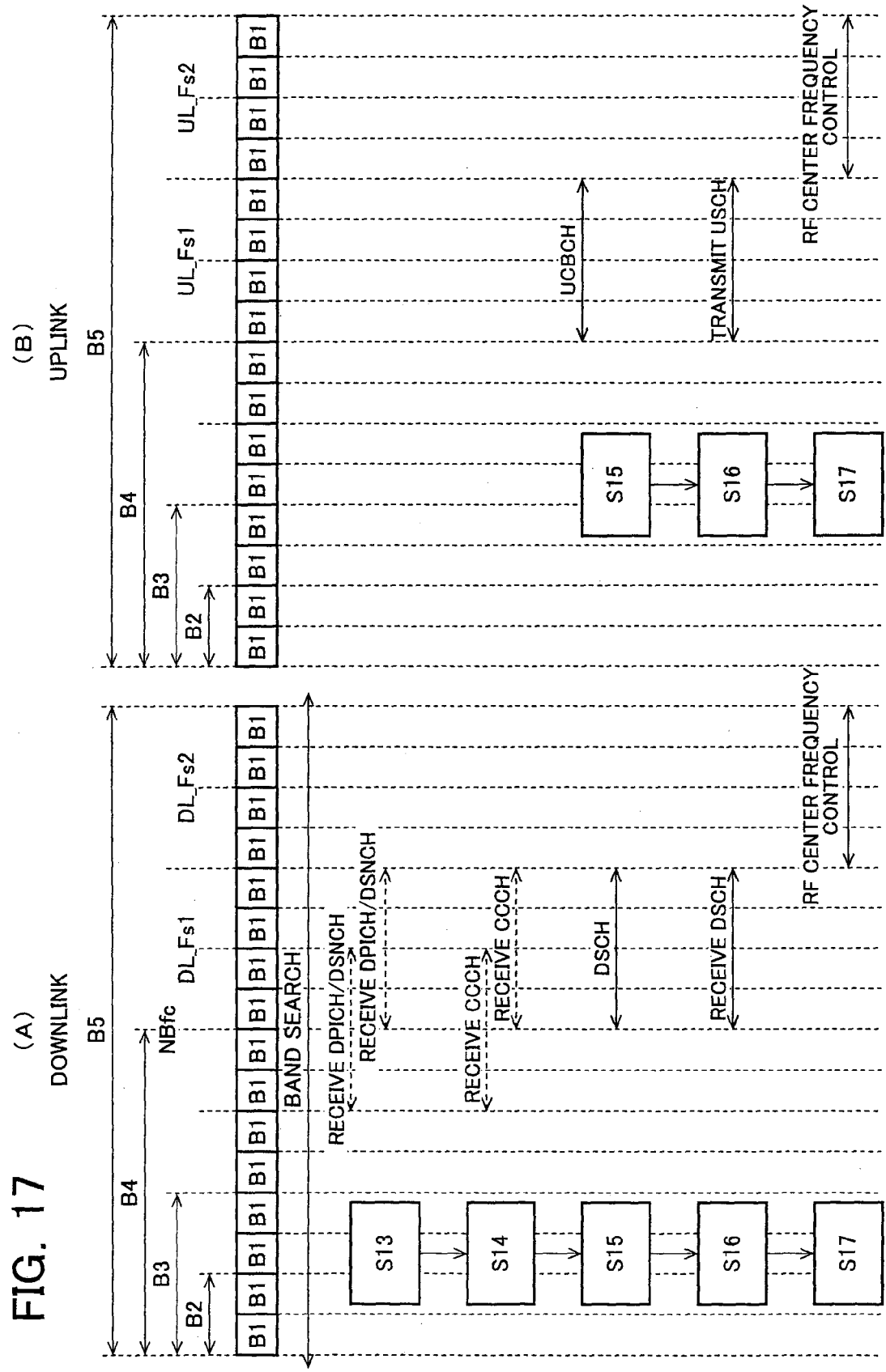
FIG. 17 is a view for explaining a process when the mobile station is powered on and transits to the idle mode.

FIGS. 16 and 17 are views for explaining a process when the mobile station is powered on and transits to the idle mode; FIG. 16 is a flowchart for explaining the process in this case; and FIGS. 17(A) and 17(B) show the bands used by the mobile station and main channels used in the procedures for the uplink and the downlink, respectively. In FIG. 17, reference numerals (reference numerals of steps of the mobile station) are added for correlation with the flow of FIG. 16.

In FIG. 17, B1, B2, B3, B4, and B5 denote frequency bandwidths of 1.25 MHz, 2.5 MHz, 5 MHz, 10 MHz, and 20 MHz, respectively. By way of example, a control flow of the mobile station in the B3 mobile station class will be described.

After power-on, the mobile station performs the selection (band search) of the public mobile communication network PLMN (Public Land Mobile Network) (step S11). The base station transmits information through the downlink common pilot channel DPCH, the downlink synchronization channel DSNCH, and the downlink common control channel DCCCH (step S21).

The mobile station uses the own IMSI, the base-station unique frequency bandwidth MBnb, and the base-station downlink center frequency NBfc acquired through the band search to calculate the operating frequency band position number Ps, the IM group number Pim, the PI group number Ppi, the center frequency DL_Fs of the mobile-station downlink operating frequency band, the downlink IM group center frequency DL_Fim, the center frequency UP_Fs of the mobile-station uplink operating frequency band, and the uplink IM group center frequency UP_Fim (step S12).

In accordance with the center frequencies DL_Fs1, UL_Fs1 of the operating frequency band calculated from the above known parameters, the mobile station sets the local RF frequency oscillation circuit (synthesizer) of the radio portion 202 and performs the frequency shift to the operating frequency band position. The mobile station then performs initial cell selection (cell search) (step S13), receives the broadcast information (step S14), and starts an initial location registration process.

The downlink common pilot channel DPCH and the downlink synchronization channel DSNCH used at the time of the initial cell selection are received in the operating frequency band with the center frequency of DL_Fs1 calculated above. Similarly, the downlink common control channel DCCCH used at the time of receiving the broadcast information is also received in the operating frequency band with the center frequency of DL_Fs1 calculated above. The load of control in the mobile station is alleviated by using the same band as the band for receiving the downlink common pilot channel DPCH, the downlink synchronization channel DSNCH, and the downlink common control channel DCCCH and the operating frequency band at the time of the idle mode.

Figure 18:
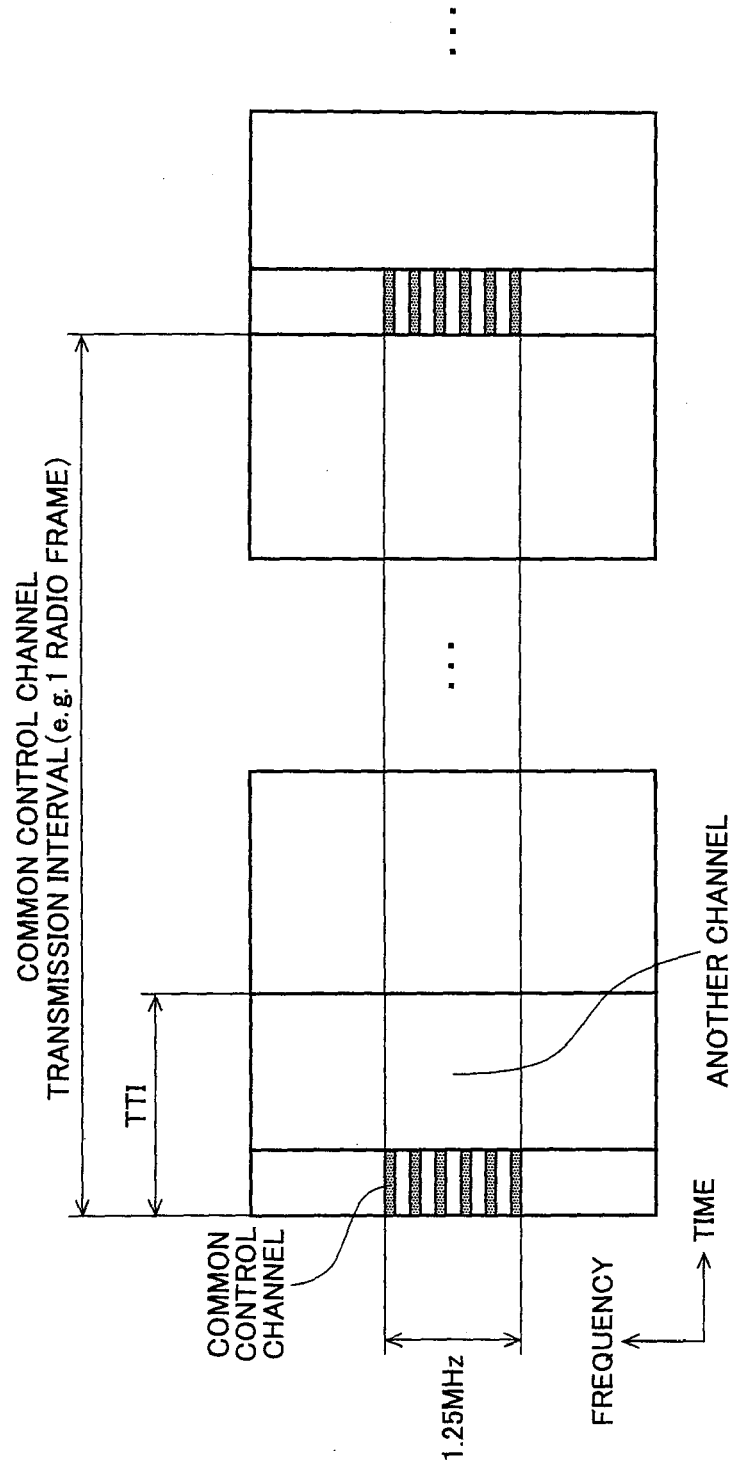
FIG. 18 is a view for explaining an exemplary structure of a downlink radio frame.
Figure 19:
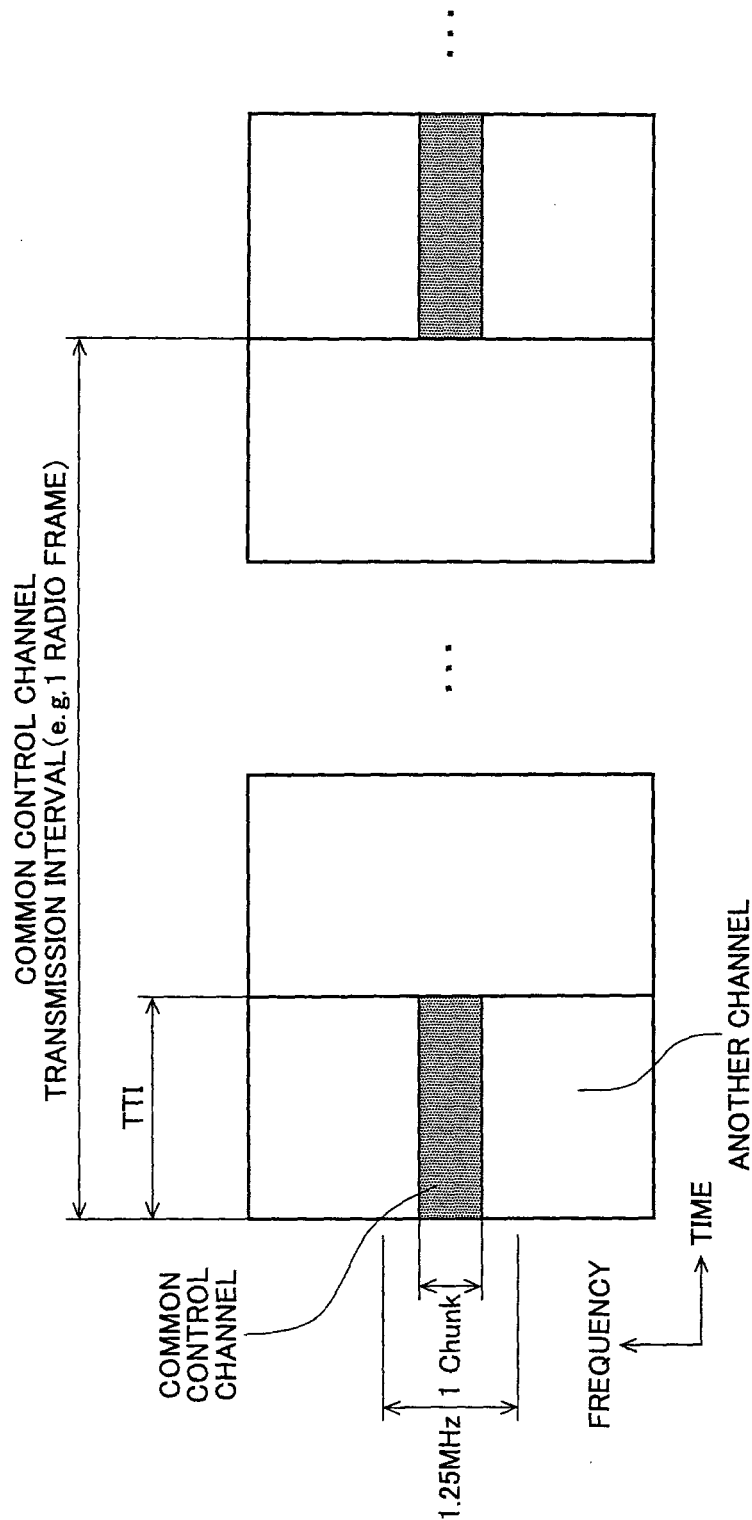
FIG. 19 is a view for explaining another exemplary structure of the downlink radio frame.

As shown in FIGS. 18 and 19, in the downlink radio frame structure with the downlink common control channel DCCCH mapped on the center frequency NBfc of the base-station unique frequency bandwidth MBnb, the initial cell selection step and the broadcast information reception step are executed at the center frequency NBfc of the base-station unique frequency bandwidth MBnb (see step 13 and step 14 of FIG. 17). After the broadcast information is received, the operating frequency band position number Ps, the IM group number Pim, and the PI group number Ppi may be calculated in some structures.

Figure 20:
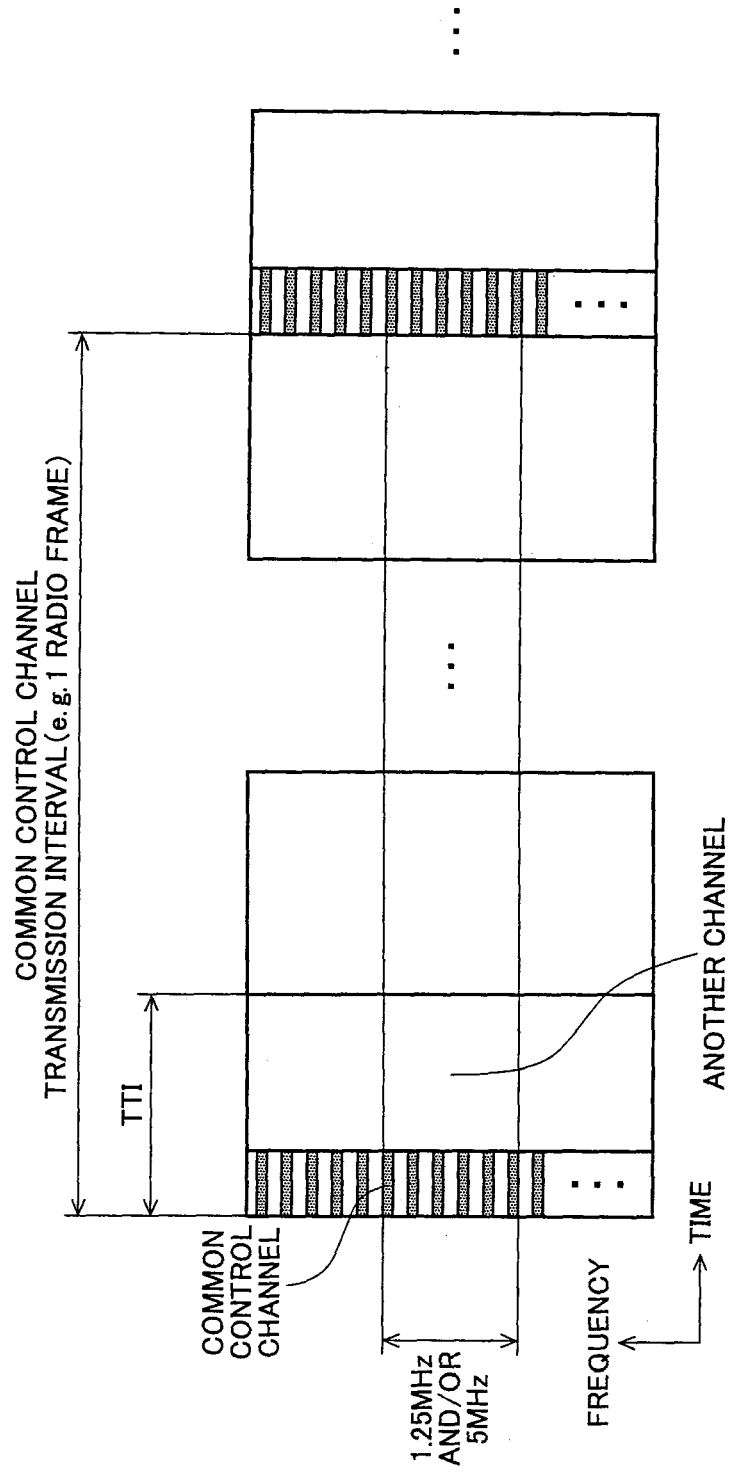
FIG. 20 is a view for explaining yet another exemplary structure of the downlink radio frame.
Figure 21:
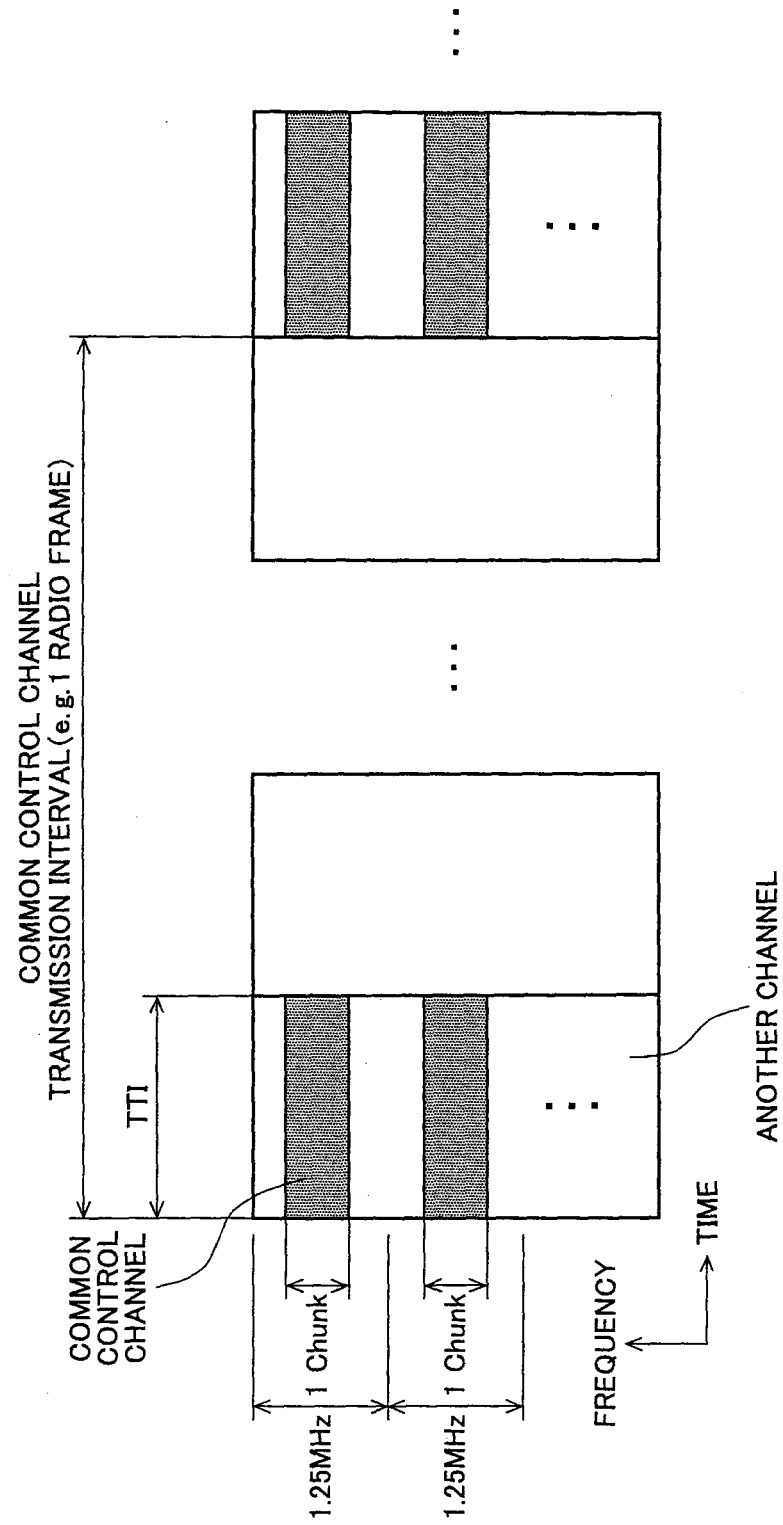
FIG. 21 is a view for explaining yet another exemplary structure of the downlink radio frame.

To receive the downlink common control channel DCCCH in the operating frequency band with the center frequency of DL_Fs1 calculated above, as shown in FIGS. 20 and 21, the downlink common control channel DCCCH must be mapped onto the downlink radio frame structure shown in FIGS. 18 and 19 for every 1.25-MHz bandwidth or every Chunk. We propose as a countermeasure method to arrange the downlink common control channel DCCCH throughout the downlink unique frequency bandwidth MBnb for every 1.25-MHz bandwidth or every chunk, to copy what is common to all the mobile stations, and to add and arrange pieces of information specific to respective bands or Chunks as needed.

The initial location registration process will then be described. The mobile station uses the uplink contention-based channel UCBCH to transmit a request signal for the uplink packet access at the start of the initial location registration process (step S15). This uplink packet access request signal includes the subscriber identification information IMSI. When receiving the uplink packet access request signal, the base station transmits an uplink packet access permission signal including the default scheduling setup information and RNTI (Radio Network Temporary ID), which is a number for identifying the mobile station in the base station. As a result, a radio bearer is established.

The uplink contention-based channel UCBCH and the downlink scheduling channel DSCH used in this case are transmitted/received at the operating frequency band positions calculated above. Therefore, the collision frequency is reduced at the time of the uplink request, and the procedures are reduced in the initial scheduling of the downlink.

Once the radio bearer is established, a location registration message is transmitted to a higher-level node of the network. When receiving the location registration message, the higher-level node transmits temporary subscriber identification information, for example, TMSI (Temporary Mobile Subscriber Identity), TMEI (Temporary Mobile Equipment Identity), a temporary IP address, etc., along with approval of the location registration. A key exchange protocol and an authentication process are executed at the same time (step S16, step S23). The uplink scheduling channel USCH and the downlink scheduling channel DSCH used in this case are transmitted/received in the operating frequency bands with the center frequencies of UL_Fs1, DL_Fs1 calculated above.

The mobile station and the base station recalculate the operating frequency band position number Ps, the IM group number Pim, and the PI group number Ppi with the above calculating equations from the temporary subscriber identification information (steps S17 and S24). In accordance with the center frequencies DL_Fs2, UL_Fs2 of the calculated operating frequency band, the mobile station performs the frequency shift to the operating frequency band position. When the location registration is completed, the radio bearer is released and the mobile station shifts to the idle mode.

Figure 22:
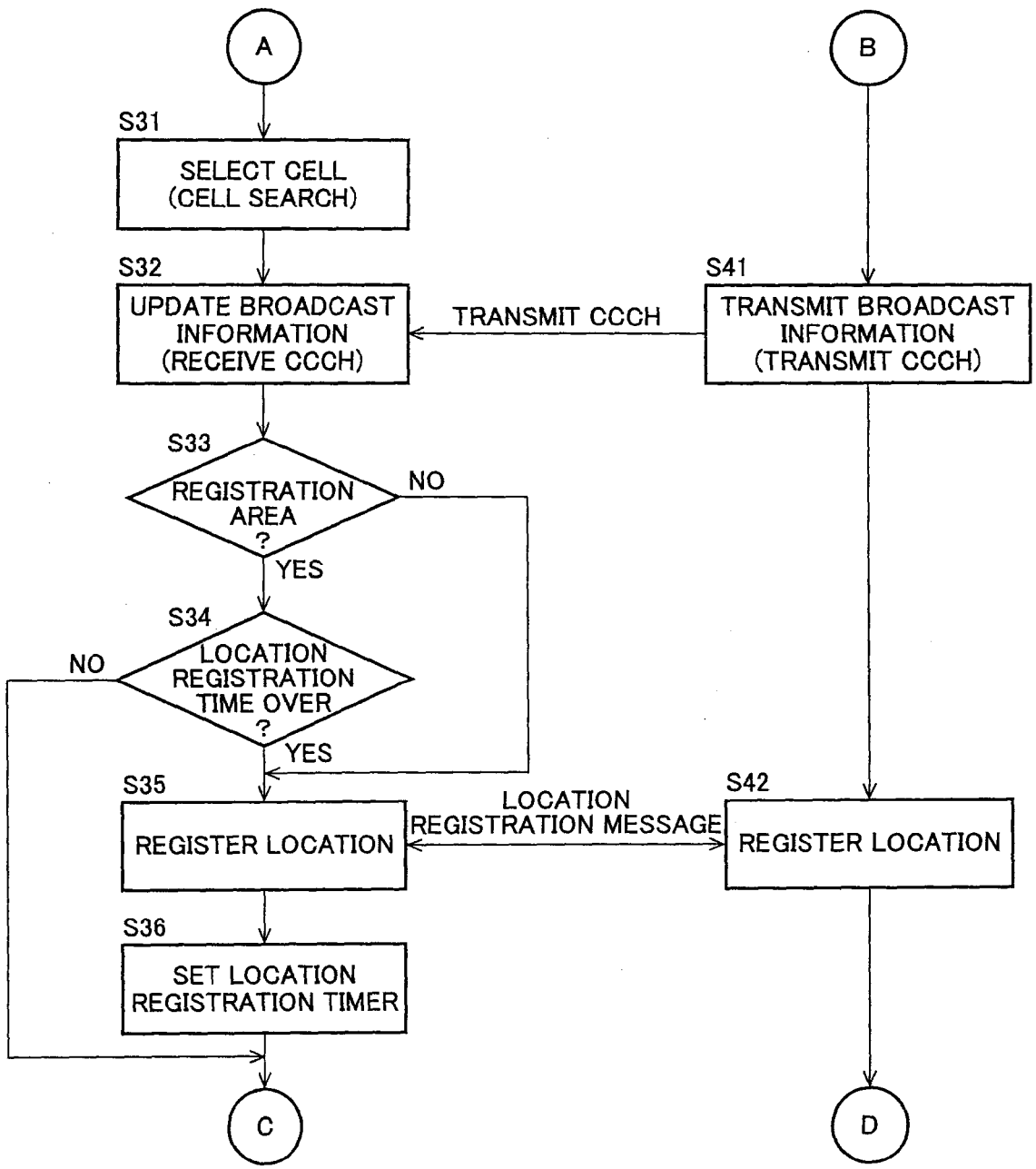
FIG. 22 is a flowchart for explaining a process at the time of the idle mode.
Figure 23:
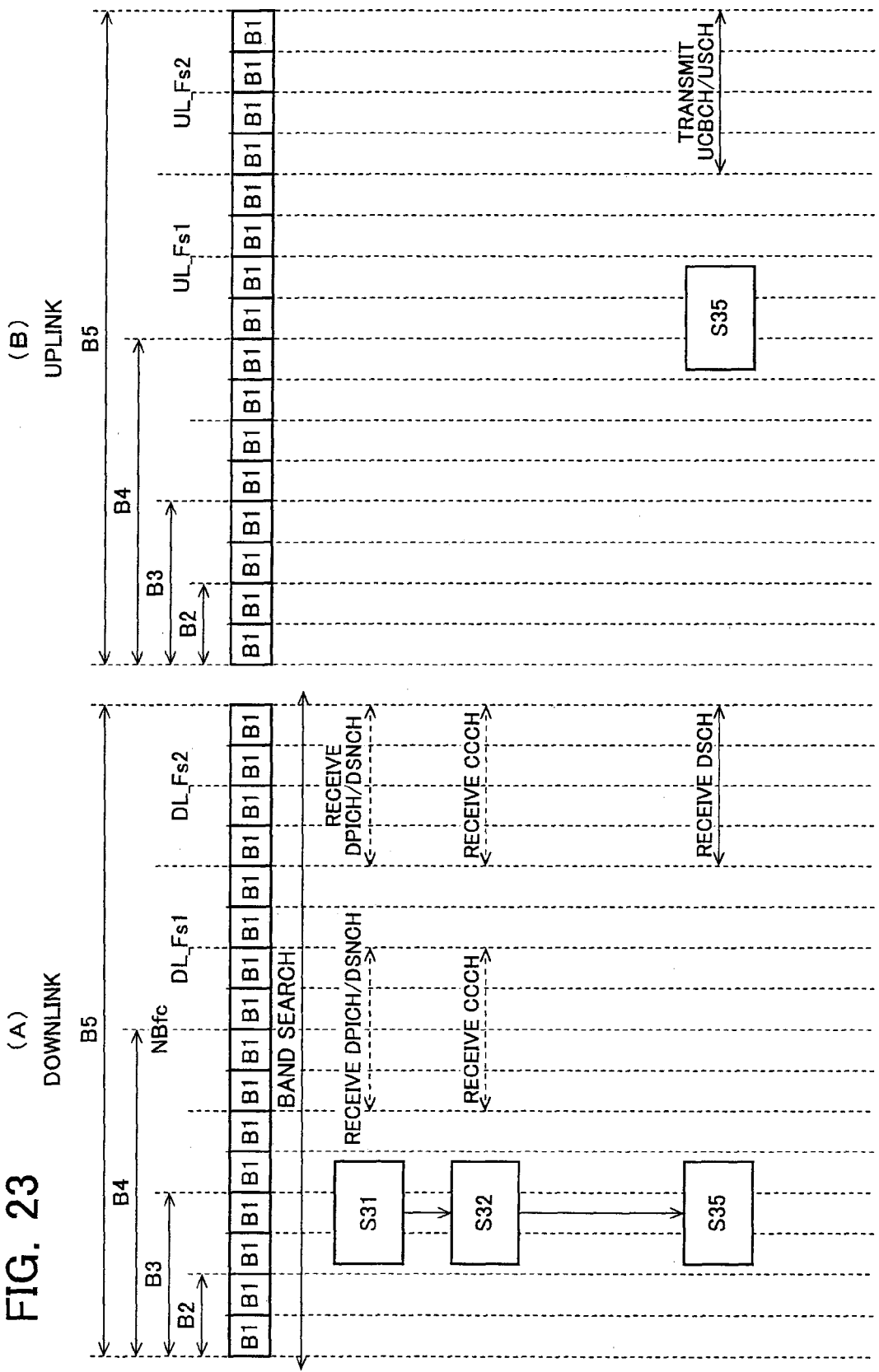
FIG. 23 is a view for explaining a process at the time of the idle mode.

FIGS. 22 and 23 are views for explaining a process at the time of the idle mode; FIG. 22 is a flowchart for explaining the process flow in this case; and FIGS. 23(A) and 23(B) show the bands used by the mobile station and main channels used in the procedures for the uplink and the downlink, respectively. In FIG. 23, reference numerals (reference numerals of steps of the mobile station) are added for correlation with the flow of FIG. 22.

The mobile station shifted to the idle mode receives the downlink common pilot channel DPCH, the downlink synchronization channel DSNCH, and the downlink common control channel DCCCH transmitted from the base station to periodically perform the cell selection and update the broadcast information (steps S31, S32, and S41).

In this case, the downlink common pilot channel DPCH, the downlink synchronization channel DSNCH, and the downlink common control channel DCCCH are received at the center frequency NBfc of the base-station unique frequency bandwidth MBnb for the downlink radio frame structure shown in FIGS. 18 and 19. The operating frequency band with the calculated center frequency of DL_Fs2 may also be used as the operating frequency band position at the time of the idle mode for the downlink radio frame structure shown in FIGS. 20 and 21 in some structures.

The mobile station checks whether the registration area indicated by the broadcast information is changed (step S33). If the registration area is not changed, it is checked whether a location registration timer has expired (step S34). If the location registration timer has not expired, a reception procedure for the packet indicator PI is started. If the registration area is changed or the location registration timer has expired, a location registration process is executed (steps S35 and S42).

The location registration process includes steps of the uplink packet access request through the uplink contention-based channel UCBCH, the establishment of the radio bearer, the transmission and reception of the location registration information thorough the uplink scheduling channel USCH and the downlink scheduling channel DSCH, and the release of the radio bearer as is the case with the initial location registration process described in FIGS. 16 and 17 (the operation frequency band is different).

After the location registration process is completed, the location registration timer is set (step S36), and the reception procedure for the packet indicator PI is started. Although only the timer for location registration has been described here, the timer for cell search or the timer for PI may be prepared.

Figure 24:
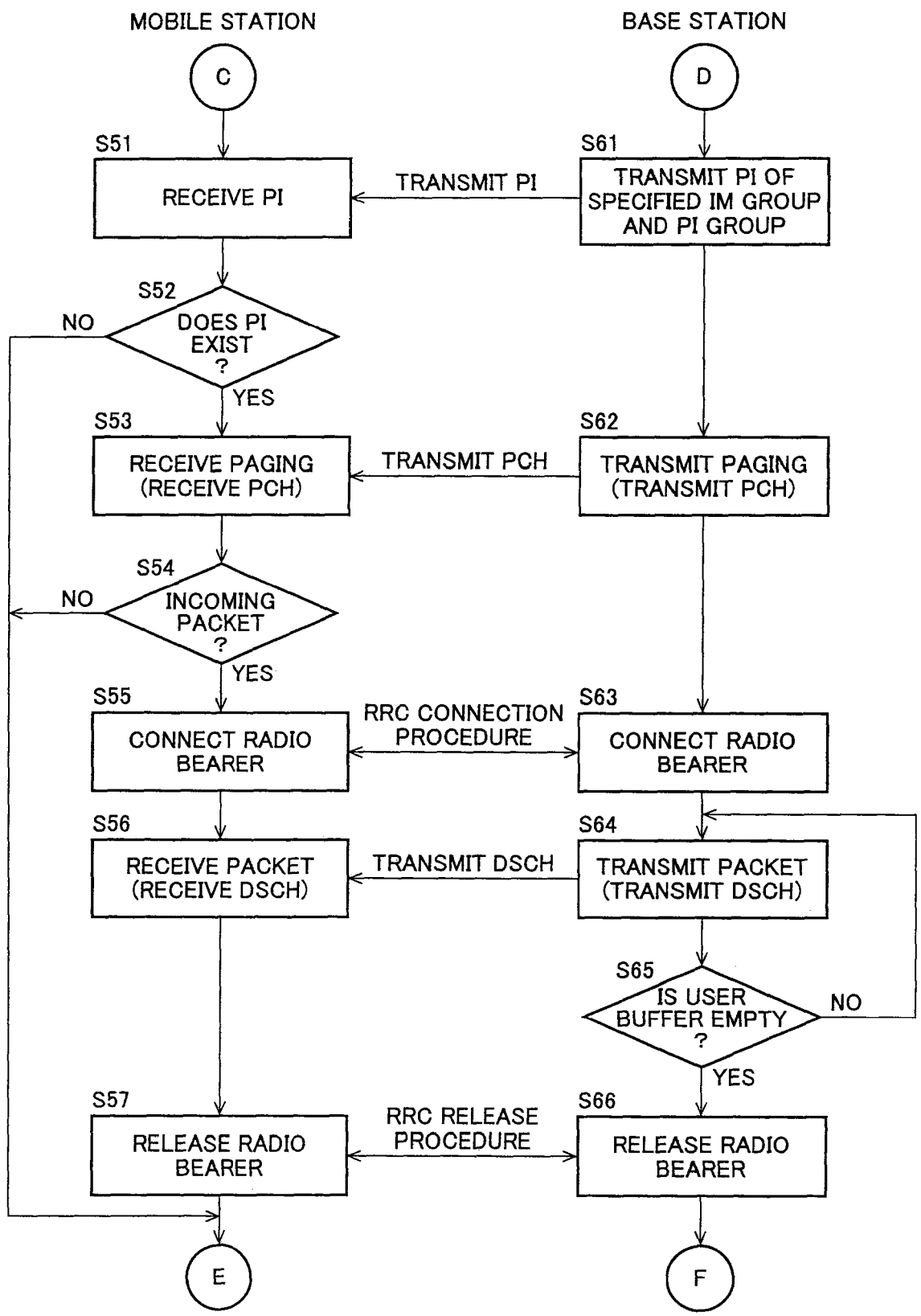
FIG. 24 is a flowchart for explaining a control process for an incoming packet.
Figure 25:
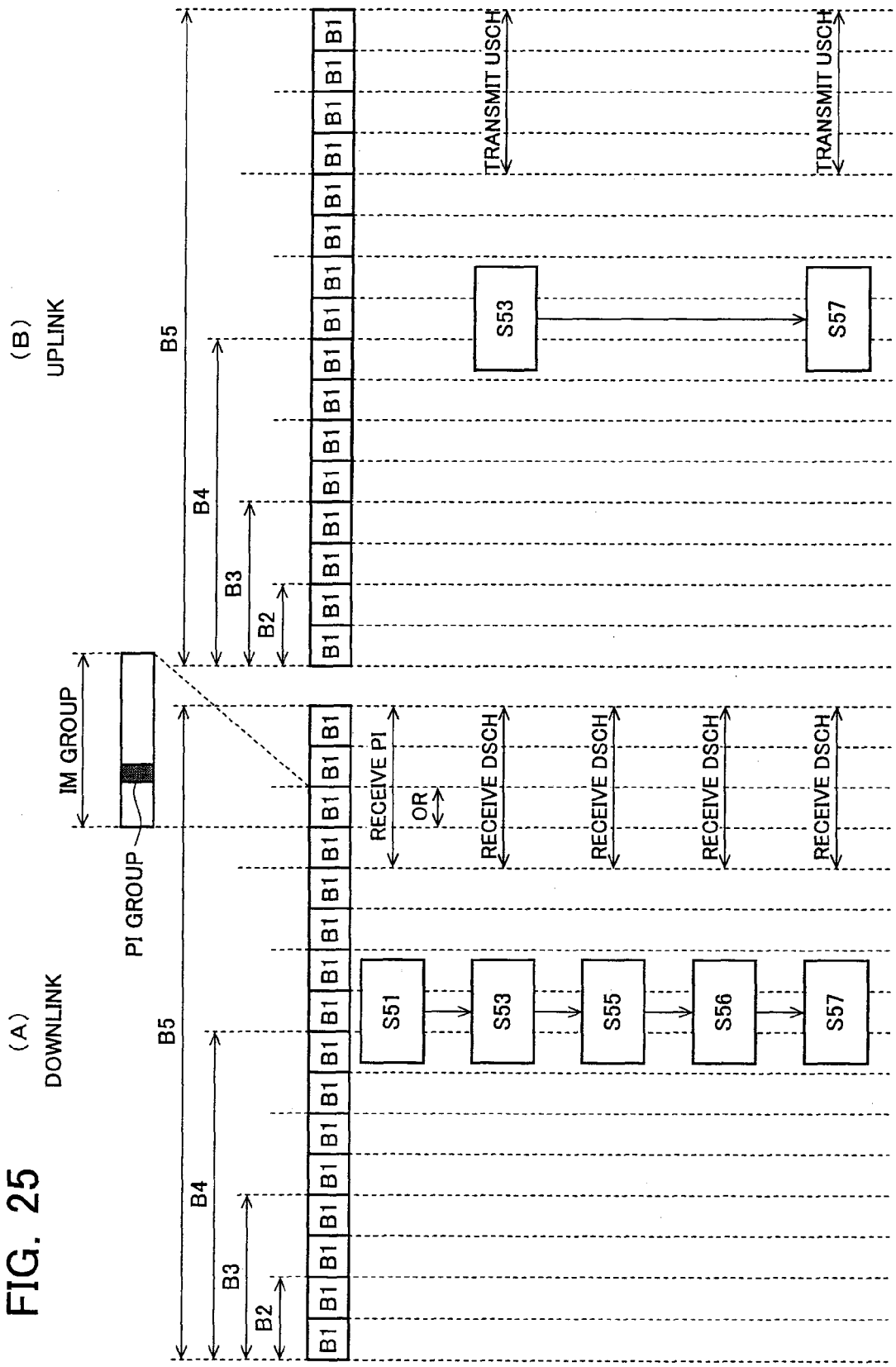
FIG. 25 is a view for explaining a control process for an incoming packet.

FIGS. 24 and 25 are views for explaining a control process for an incoming packet; FIG. 24 is a flowchart for explaining the process flow in this case; and FIGS. 25(A) and 25(B) show the bands used by the mobile station and main channels used in the procedures for the uplink and the downlink, respectively. In FIG. 25, reference numerals (reference numerals of steps of the mobile station) are added for correlation with the flow of FIG. 24.

When transmitting a packet to the mobile station shifted to the idle mode, the base station calculates the IM group Pim and the PI group Ppi from the IMSI of the packet destination and sets the packet indicator PI (step S61). The mobile station shifted to the idle mode receives the packet indicator PI at the position indicated by the IM group Pim and the PI group Ppi obtained from the above calculating equations through the discontinuous reception (step S51).

If the packet indicator PI indicates an incoming packet (step S52), the downlink scheduling channel DSCH is received to acquire detail information related to paging (corresponding to the paging information of the W-CDMA mode) included in the paging channel PCH (logical channel) (steps S53 and S62). If the packet indicator PI indicates no incoming packet at step S52, the packet indicator PI is received that is included in the next radio frame or in the radio frame after a plurality of radio frame intervals (discontinuous reception).

The position of the paging channel PCH to be received by the mobile station is preliminarily determined in association with the position of the packet indicator PI. If the mobile station acquires information identifying itself (such as IMSI, IMEI, IP address, and RNTI) from the detail information related to paging, the mobile station executes the radio bearer establishing procedure (steps S54, S55, and S63). The mobile station receives packet indicator PI included in the next radio frame or in the radio frame after a plurality of radio frame intervals (discontinuous reception) if the incoming packet is not addressed to itself.

After the radio bearer is established, the mobile station starts receiving the packet through the downlink scheduling channel DSCH (step S56). The base station transmits the packet through the downlink scheduling channel DSCH until the buffer of user data becomes empty (step S64). When the buffer of the base station becomes empty, the radio bearer is released (steps S65 and S66). The packet transmission procedure is then started. Although only the packet reception has been described here, the packet transmission may concurrently be performed.

Figure 26:
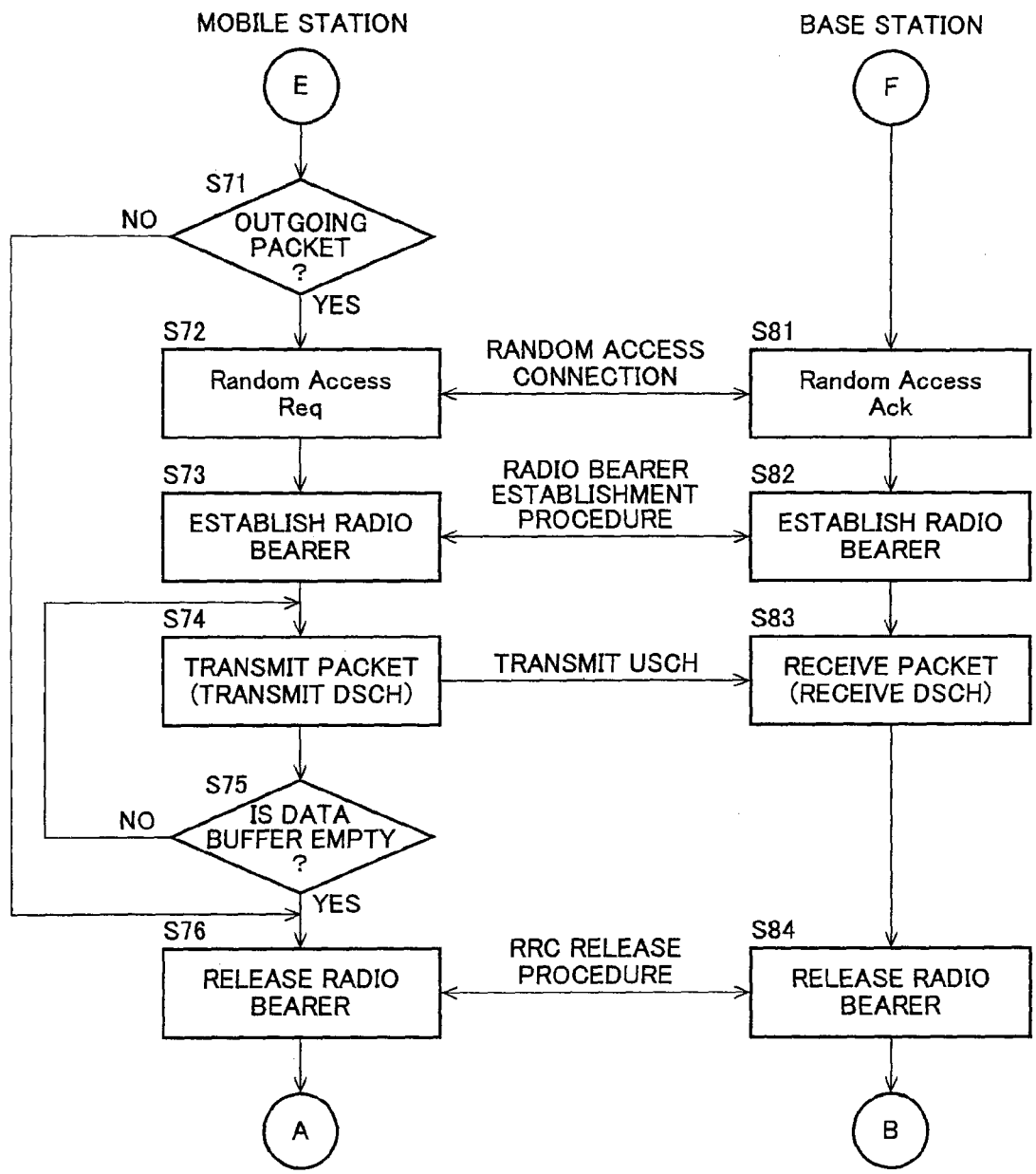
FIG. 26 is a flowchart for explaining a control process at the time of packet transmission.
Figure 27:
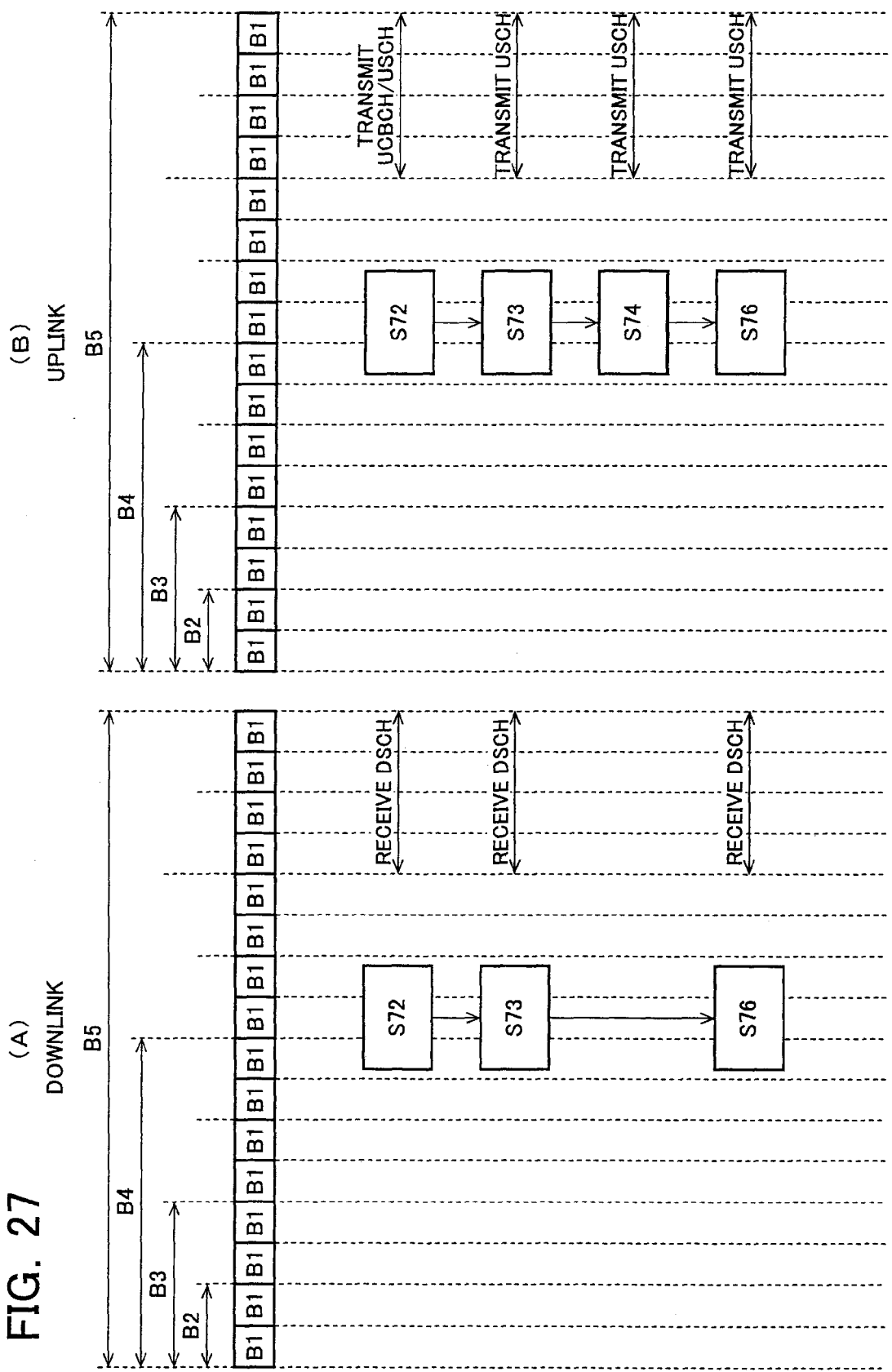
FIG. 27 is a view for explaining a control process at the time of packet transmission.

FIGS. 26 and 27 are views for explaining a control process at the time of packet transmission; FIG. 26 is a flowchart for explaining the process flow in this case; and FIGS. 27(A) and 27(B) show the bands used by the mobile station and main channels used in the procedures for the uplink and the downlink, respectively. In FIG. 27, reference numerals (reference numerals of steps of the mobile station) are added for correlation with the flow of FIG. 26.

If a packet to be transmitted exists (step S71), the mobile station uses the uplink contention-based channel UCBCH to transmit a request signal for the uplink packet access (step S72). When receiving the request signal for the uplink packet access (step S81), the base station transmits an uplink packet access permission signal including the default scheduling setup information and RNTI (Radio Network Temporary ID), which is a number for identifying the mobile station in the base station. As a result, a radio bearer is established (steps S73 and S82).

When the radio bearer is established, the mobile station transmits the packet through the uplink scheduling channel USCH (steps S74 and S83). When the data buffer of the mobile station becomes empty (step S75), the radio bearer is released (steps S76 and S84). The mobile station goes back to the control procedure at the time of the idle mode.

Although the mobile station in the idle mode transmits/receives the channels in the own unique frequency bandwidth in the above description, the transmission/reception may be designed to be performed in the bandwidth Bim (=B1) used by the IM group to reduce the power consumption at the time of the idle mode. During communication, the mobile station uses a bandwidth ranging from Bim to the unique frequency bandwidth Bn depending on a data amount.

With the method described above, the operating frequency bands of the channels used by the mobile station can be specified with the communication between the base station and the mobile station reduced to the minimum.

Figure 28:
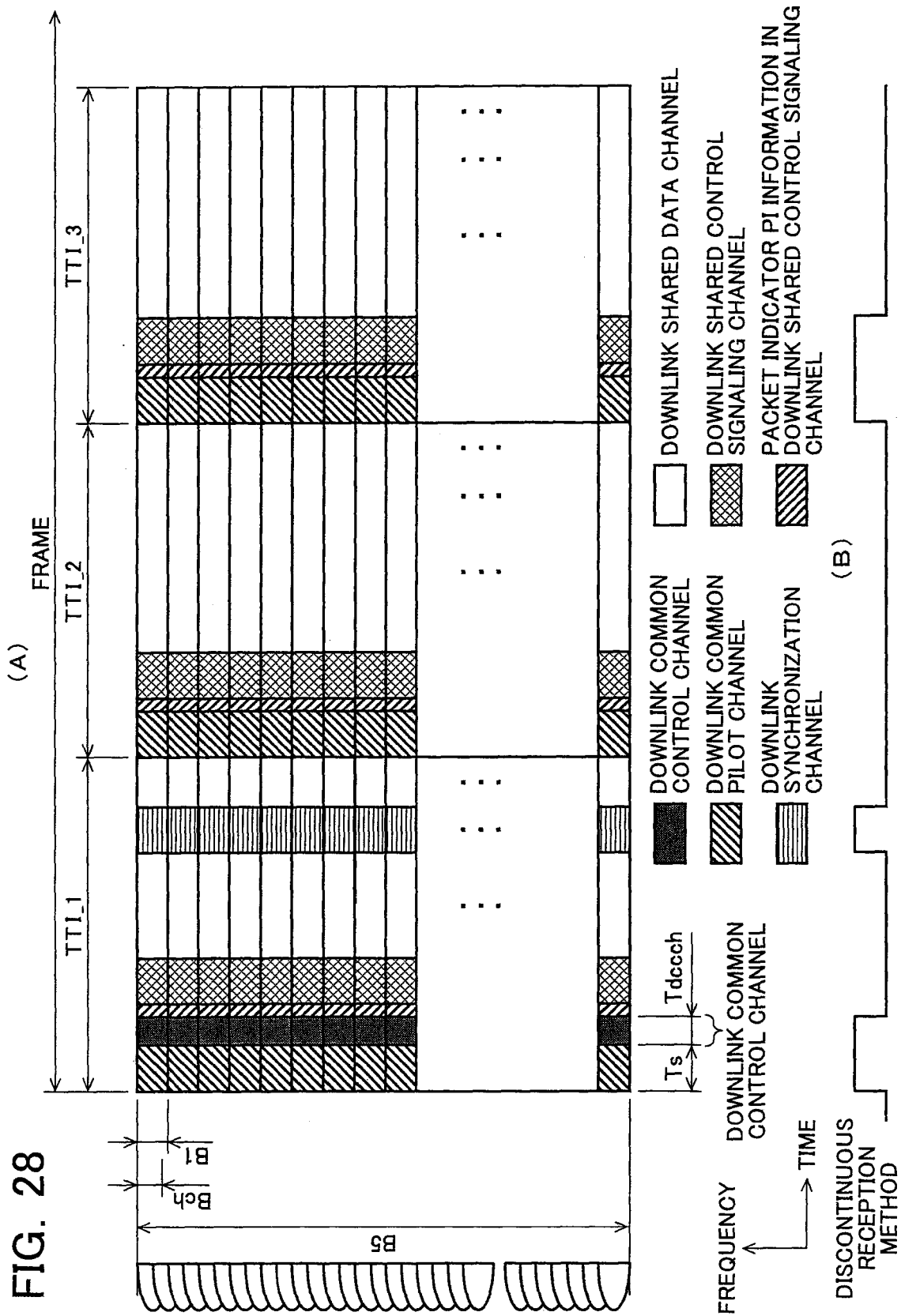
FIG. 28 is a view of yet another exemplary structure of the downlink radio frame of the present invention.
Figure 29:
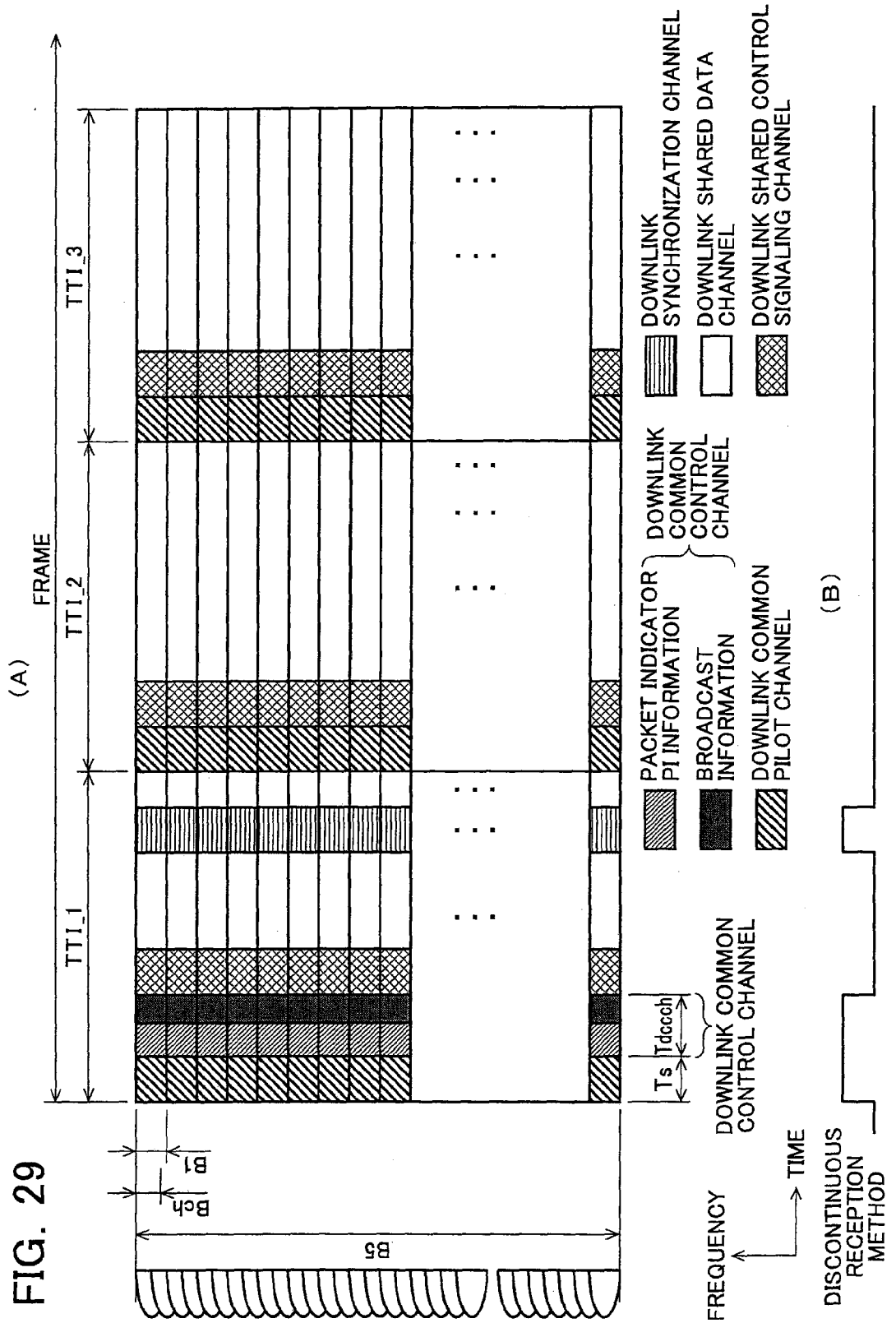
FIG. 29 is a view of yet another exemplary structure of the downlink radio frame of the present invention.
Figure 30:
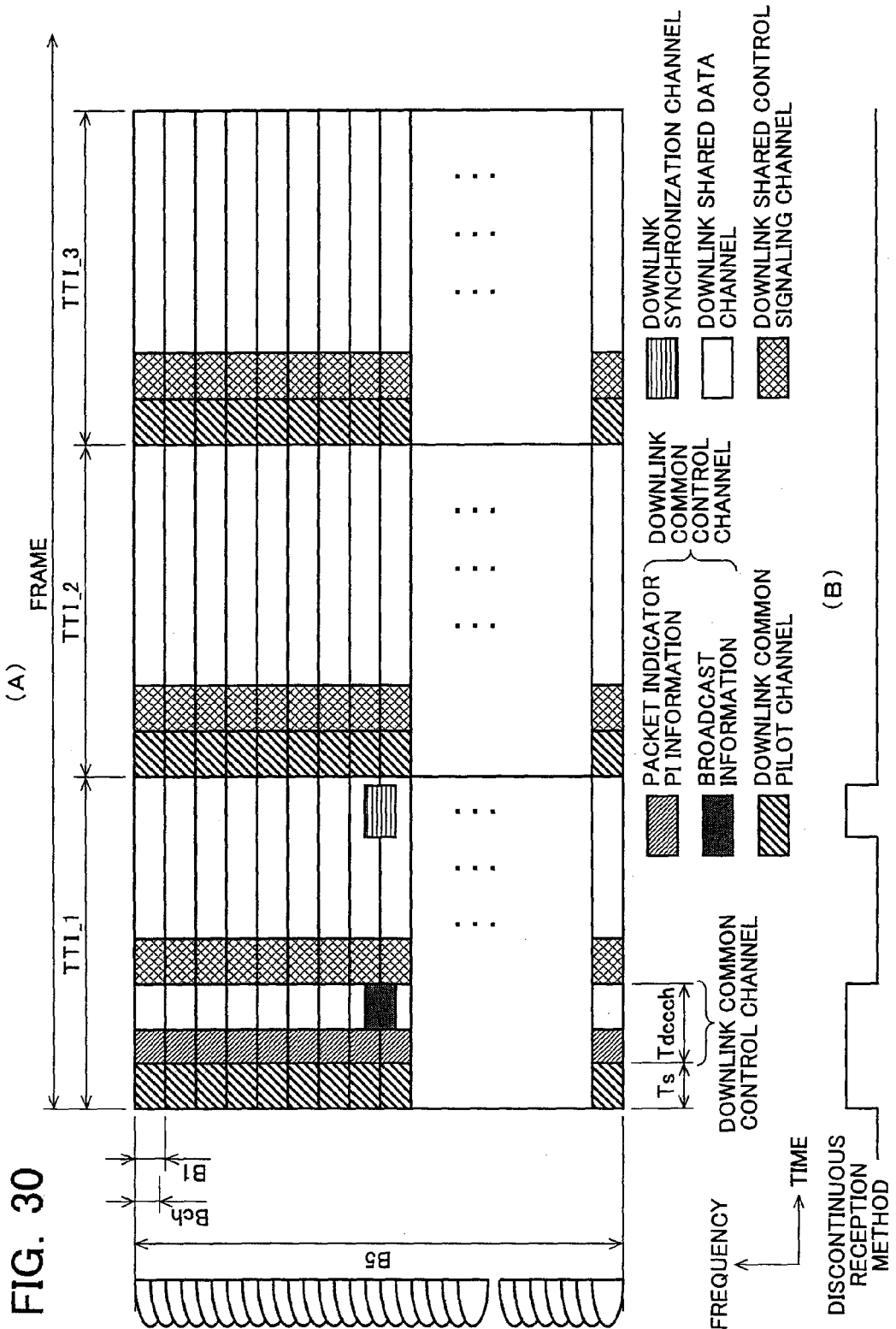
FIG. 30 is a view of yet another exemplary structure of the downlink radio frame of the present invention.

FIGS. 28, 29, and 30 are views of respective exemplary structures of the downlink radio frame of the present invention, showing the optimum arrangements of the broadcast information, the downlink synchronization channel DSNCH, the packet indicator PI, and the downlink shared control signaling channel DSCSCH based on FIG. 4. In each of FIGS. 28 to 30, (A) shows a structure of the downlink radio frame, and (B) shows an image of the discontinuous reception operation in conformity to (A).

In FIG. 28, the downlink common control channel DCCCH is located in the TTI at the beginning of the radio frame for every IM group bandwidth Bim and can be received in the bandwidth specified by the IM group at the time of the idle mode. The packet indicator PI is located in each TTI by further dividing the IM group. In this case, the packet indicator PI is mapped as a portion of the downlink shared control signaling channel DSCSCH.

With the above structure, at the time of the idle mode, the mobile station can perform the cell search, the timing synchronization, and the reception of the broadcast information and the packet indicator PI in the band specified by the IM group and the process of the frequency shift can be omitted. Since the packet indicator PI is mapped on the downlink shared control signaling channel DSCSCH, the packet reception process in the case of the active mode can be made common to the incoming packet process in the idle mode in the mobile station.

The discontinuous reception operation in this structure is a discontinuous reception method of turning on the receiving portion for the periods of the downlink common pilot channel DCPCH, the downlink common control channel DCCCH, the downlink synchronization channel DSNCH of the TTI at the beginning of the frame, and the downlink shared signaling channel DSCSCH having the paging indicator PI mapped thereon, and turning off the receiving portion for other periods.

In FIG. 29, the downlink common control channel DCCCH is located in the TTI at the beginning of the radio frame for every IM group bandwidth Bim as is the case with FIG. 28 and can be received in the bandwidth specified by the IM group at the time of the idle mode. However, the packet indicator is mapped as a portion of the downlink common control channel DCCCH. With this structure, at the time of the idle mode, the mobile station can perform the cell search, the timing synchronization, and the reception of the broadcast information and the packet indicator PI in the band specified by the IM group of the TTI at the beginning and the process of the frequency shift can be omitted.

The discontinuous reception operation in this structure is a discontinuous reception method of turning on the receiving portion for the periods of the downlink common pilot channel DCPCH, the downlink common control channel DCCCH, and the downlink synchronization channel DSNCH of the TTI at the beginning of the frame and turning off the receiving portion for other periods.

In FIG. 30, the downlink common control channel DCCCH is located in a certain B1 bandwidth in the TTI at the beginning of the radio frame. The mobile station shifts to the certain B1 bandwidth at the time of the cell search, the timing synchronization, and the reception of the broadcast information. The packet indicator PI is mapped as a portion of the downlink common control channel DCCCH.

The discontinuous reception operation in this structure is a discontinuous reception method of turning on the receiving portion for the periods of the downlink common pilot channel DCPCH, the downlink common control channel DCCCH, and the downlink synchronization channel DSNCH of the TTI at the beginning of the frame and turning off the receiving portion for other periods.

Although not shown, the downlink common control channel DCCCH may be located in a certain B1 bandwidth in the TTI at the beginning of the radio frame and the packet indicator PI may be mapped onto the downlink shared control signaling channel.

As shown in FIG. 5, the downlink common pilot channel DCPCH, the downlink common control channel DCCCH, and the downlink shared control signaling channel DSCSCH may alternately be arranged in sub-carriers.

Although the candidates for the operating frequency band of the mobile station in the idle mode are arranged to be distributed over the entire unique frequency bandwidth of the base station in the above description, the candidates may be arranged to be distributed over a certain limited range of the frequency bandwidth within the unique frequency bandwidth of the base station. For the calculating equations in such a case, the unique frequency band of the base station of the equations 1 to 6 may be replaced with the limited range of the frequency bandwidth.

Although it is desirable that the operating frequency band position of the mobile station at the time of the idle mode is included in the operating frequency band of the mobile station, the subscriber identification information may be utilized to separately calculate the operating frequency band of the mobile station at the time of the idle mode and the operating frequency band of the mobile station. For example, the downlink common control channel DCCCH and the packet indicator PI may be located in a certain range of the frequency bandwidth and the remaining bandwidth may be used as the frequency band for transmitting/receiving packets. For the calculating equations in such a case, the unique frequency band of the base station of the equations 1 to 6 may be replaced with the limited range of the frequency bandwidth.

Figure 31:
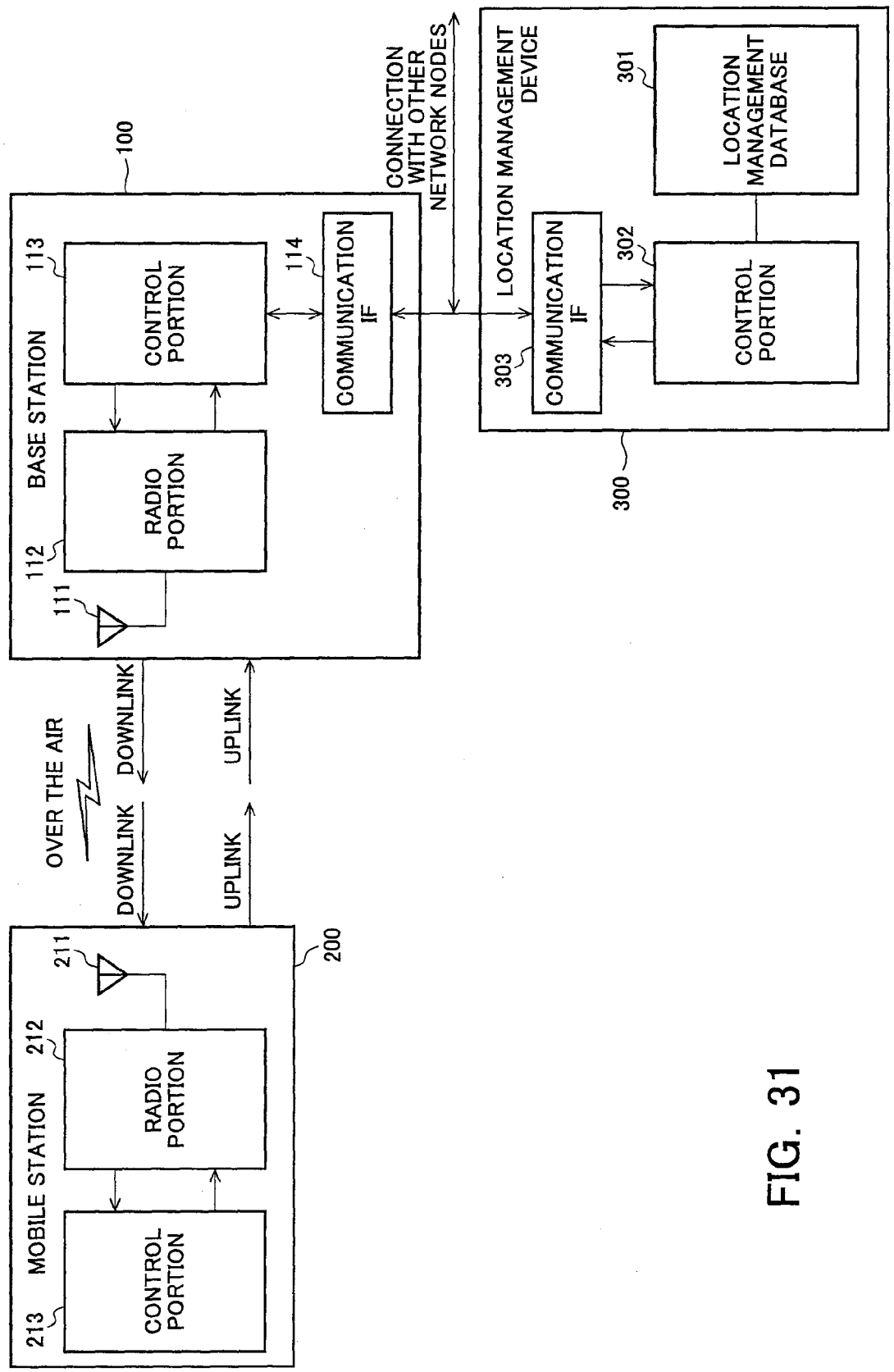
FIG. 31 is a view of respective exemplary structures of a base station, a mobile station, and a location management device.

FIG. 31 is a view of respective exemplary structures of the base station, the mobile station, and a location management device related to another embodiment of the present invention. In FIG. 31, the base station 100 is made up of an antenna portion 111, a radio portion 112, a control portion 113, and a communication IF 114; the mobile station 200 is made up of an antenna portion 211, a radio portion 212, and a control portion 213, and a location management device 300 is made up of a location management database 301, a control portion 302, and a communication IF 303. The base station 100 corresponds to a base station device of the present invention and the mobile station 200 corresponds to a mobile station device of the present invention.

A principle of operation of the base station 100, the mobile station 200, and the location management device 300 assumed based on the proposition of 3GPP will briefly be described with reference to FIG. 31.

In the base station 100, if the base station 100 receives packet data (including the subscriber identification information, for example, IMSI) addressed to the mobile station 200 through the communication IF 114 from a higher-level network node, the packet data are stored in a base-station transmission data buffer (not shown). For the downlink transmission data from the transmission data buffer, the control portion 113 performs the channel mapping and the scheduling. The downlink transmission data are subjected to the encoding process and the OFDM signal process by the radio portion 112 and converted into the RF (Radio Frequency) frequency band by a transmission circuit of the radio portion 112, and the downlink signal is transmitted from the antenna portion 111.

On the other hand, the uplink signal sent from the mobile station 200 is received by the antenna portion 111 of the base station 100 and converted from the RF frequency to IF or directly to the base band by a reception circuit of the radio portion 112 for demodulation. The uplink signal may be an OFDM signal, an MC-CDMA (Multi-Carrier-CDMA) signal, or a single carrier SC signal and a VSCRF-CDMA (Variable Spreading and Chip Repetition Factors-CDMA) signal for reducing PAPR (see, e.g., Japanese Laid-Open Patent Publication No. 2004-197756, "Mobile Station, Base Station, and Wireless Transmission Program and Method"). When receiving the packet to the higher-level network node from the mobile station 200, the control portion 113 of the base station 100 transfers the packet through the communication IF 114 to the higher-level network node.

The scheduling in the control portion 113 of the base station 100 is performed based on the uplink CQI information, the downlink CQI information feedback from the mobile station 200, the downlink/uplink transmission data buffer information of the mobile stations, the uplink/downlink QoS (Quality of Service) information, various pieces of service class information, the mobile station class information, the subscriber identification information, etc. These pieces of the input information are put together and the uplink/downlink AMC information is generated in accordance with a selected scheduling algorithm to implement the transmission/reception scheduling of the packet data.

When receiving a paging request to the mobile station 200 through the communication IF 114 from the location management device 300, the control portion 113 of the base station 100 instructs the radio portion 112 to map the packet indicator (corresponding to the paging indicator channel PICH of the W-CDMA mode) and the paging information (corresponding to the paging channel PCH of the W-CDMA mode) to the mobile station 200. The mapping position instruction information is generated based on the paging request (including IMSI and the available frequency bandwidth of the mobile station). When an attach/location registration request to the location management device 300 is received from the mobile station 200, the request is transferred through the communication IF 114 to the location management device 300.

The mobile station 200 then receives the downlink OFDM signal with the antenna portion 211, converts the downlink reception signal from the RF frequency to IF or directly to the base band with a local RF frequency oscillation circuit (synthesizer), a down converter, a filter, an amplifier, etc., of the radio portion 212, and performs the OFDM demodulation and the channel decoding to decode the packet data. In the radio portion 212 of the mobile station 200, the uplink transmission data, i.e., individual packet data of the mobile station 200 are encoded with the use of the information extracted by the control portion 213 and is subjected to the data modulation and transmitted along with the downlink CQI information with the use of the downlink AMC information.

The control portion 213 of the mobile station 200 extracts the downlink channel control information (such as the packet indicator PI information, the packet paging information, the downlink access information, and the broadcast information). The control portion 213 extracts and outputs the downlink AMC mode and the downlink AMC information such as the downlink scheduling information, and the uplink AMC mode and the uplink AMC information such as the uplink scheduling information to the radio portion 212. The control portion 213 performs the scheduling based on the downlink channel control information and the downlink scheduling information sent out from the base station 100, and the uplink scheduling information.

The control portion 213 of the mobile station sends to the radio portion 212 a control signal causing a shift to the specified or calculated center frequency retained by the mobile station class information, the unique frequency bandwidth information, and the subscriber identification information. The local RF frequency oscillation circuit (synthesizer) of the radio portion 212 performs the shift to the center frequency The control portion 213 detects the need for the attach and the location registration process from the broadcast information and controls the location registration procedure as needed. The control portion 213 also acquires the packet indicator PI information to control the incoming packet process.

In the mobile station 200, the base band signal is converted to the RF frequency band by the local RF frequency oscillation circuit (synthesizer), an upconverter, a filter, and an amplifier of the radio portion 212 and the uplink signal is transmitted from the antenna portion 211. The radio portion 212 includes IF and RF filters corresponding to the above different frequency bandwidths (e.g., 1.25 MHz, 2.5 MHz, 5 MHz, 10 MHz, 20 MHz).

The location management device 300 corresponds to the VLR and HLR of the W-CDMA mode and receives and registers a location registration request from the mobile station 200 into the location management database 301. If an incoming call to the mobile station 200 exists, the registration information of the mobile station 200 is acquired from the location management database and a paging request is transmitted through the communication IF 303 to the base station in the location registration area. The location registration and paging procedures are controlled by the control portion 302.

Figure 32:
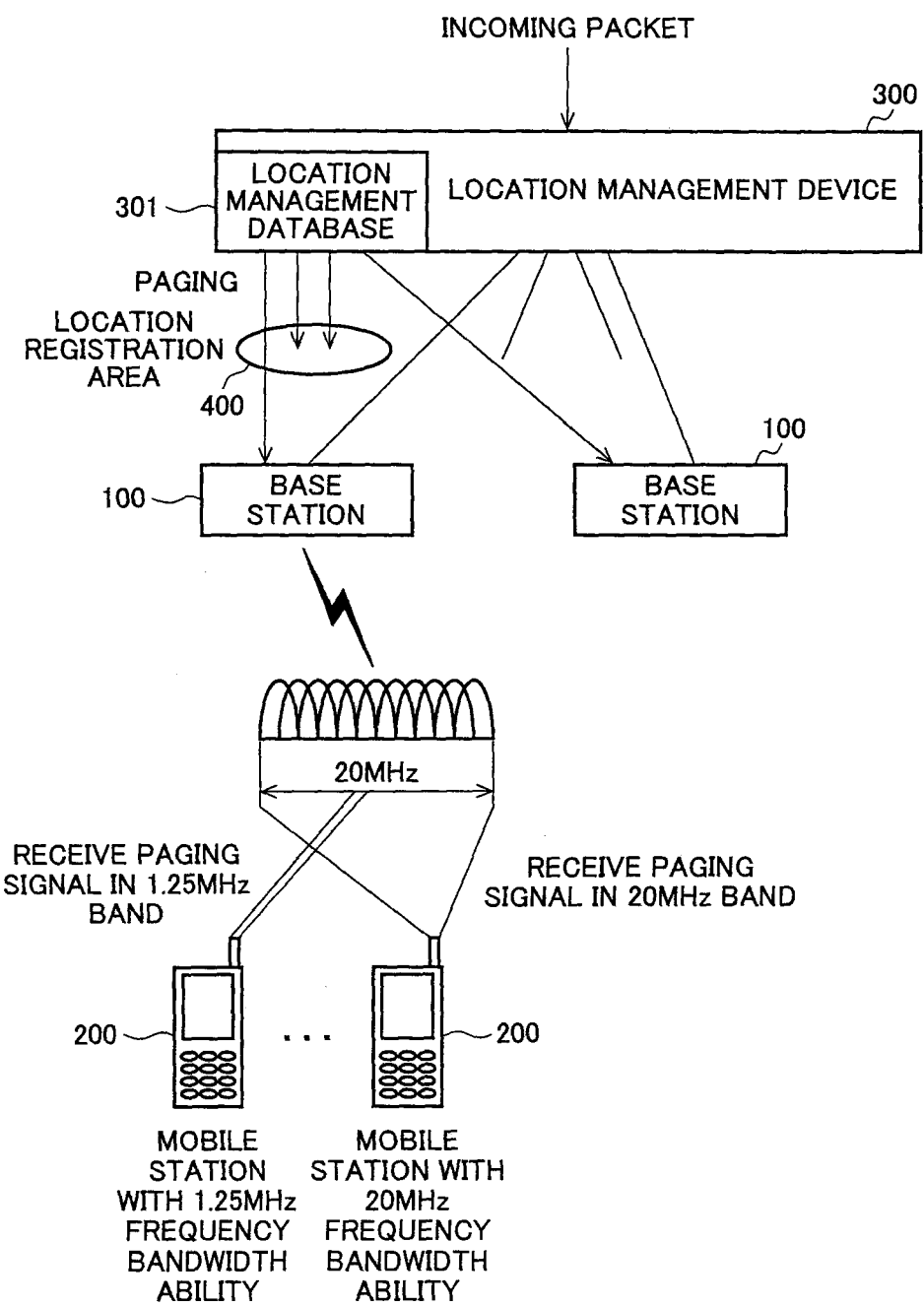
FIG. 32 is a view for explaining one embodiment of the present invention.
Figure 33:
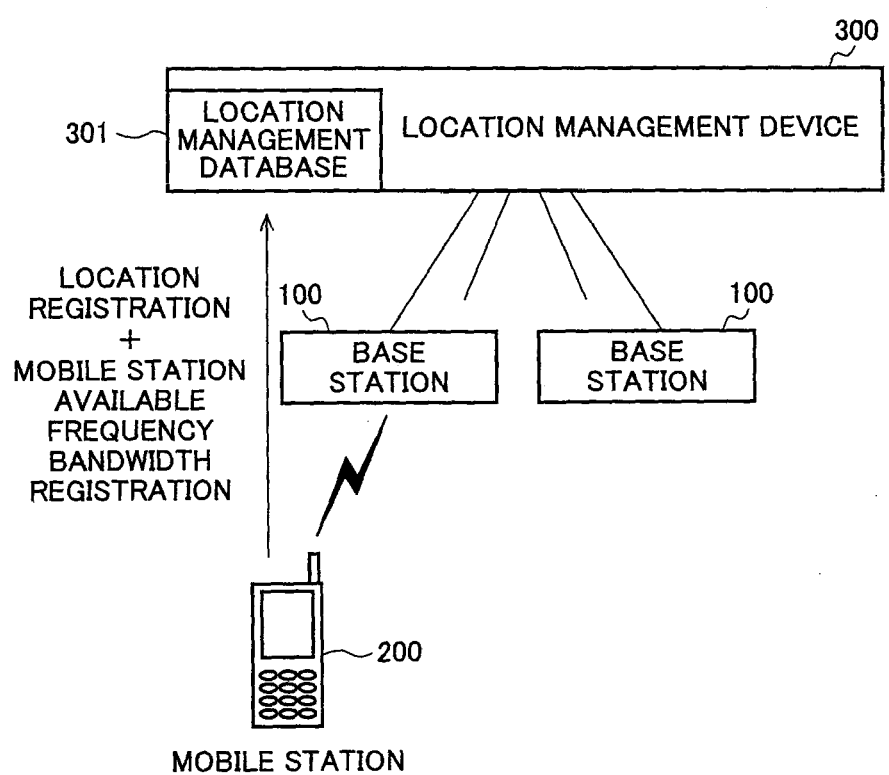
FIG. 33 is another view for explaining one embodiment of the present invention.

FIGS. 32 and 33 are views for explaining one embodiment of the present invention. This embodiment proposes a paging and location registration method in a system containing mobile stations with different frequency bandwidths (e.g., 1.25 MHz, 2.5 MHz, 5 MHz, 10 MHz, 20 MHz) assumed based on the proposition of 3GPP for the EUTRA.

In FIG. 32, if an incoming packet to the mobile station 200 exists for the location management device 300, the location management device 300 acquires the registration information of the mobile station 200 from the location management database 301 and transmits a paging request to the base station 100 in a location registration area 400.

If the unique frequency bandwidth of the base station is 20 MHz, the respective mobile stations 200 with different frequency bandwidths (in this case, the mobile stations with frequency bandwidth abilities of 1.25 MHz and 20 MHz) receive a paging signal in the downlink frequency bands used respectively.

The paging signal refers to the packet indicator PI or the paging information. The paging is performed by acquiring the location registration area 400 of the mobile station 200 having an incoming packet from the location management database 301 and by sending out a paging request from the location management device 300 to the base station 100 of the location registration area 400. Since the base station 100 does not know what frequency band position is used by the mobile station 200 at this time, information identifying the operating frequency band position of the mobile station 200 having the incoming packet must be included in the information of the paging request.

FIG. 33 is a view for explaining the location registration process example of the mobile station.

The mobile station 200 performs the attach/location registration process at the time of power-on, at the time of location registration area update, and when a location registration period has been expired. The mobile station 200 sends out a location registration request through the base station 100 to the location management device 300. This location registration request includes the subscriber identification information (IMSI or IP address) and information indicating the available frequency bandwidth of the mobile station 200 or the operating frequency band position of the mobile station 200. If the available frequency bandwidth of the mobile station 200 is registered, the base station 100 needs an algorithm for identifying the operating frequency band position of the mobile station 200 based on the subscriber identification information and the available frequency bandwidth of the mobile station at the time of paging.

Figure 34:
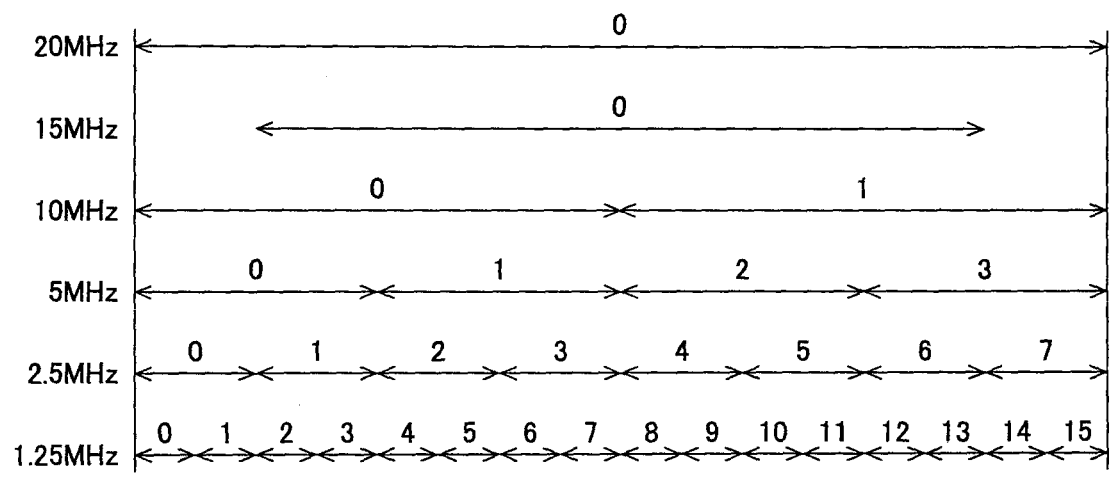
FIG. 34 is a view of explaining a numbering method of identifying the operating frequency band position of the mobile station used at the time of location registration and the time of paging.

FIG. 34 is a view for explaining a numbering method of identifying the operating frequency band position of the mobile station used at the time of location registration and the time of paging.

FIG. 34(A) shows candidates of frequency band positions used by the mobile stations with different available frequency bandwidths when it is assumed that the unique frequency bandwidth of the base station is 20 MHz. The operating band of the mobile station having the 20-MHz bandwidth or 15-MHz bandwidth ability is inevitably determined since only one option exists as shown in FIG. 34(A). The operating band of the mobile station having the 10-MHz bandwidth ability has two candidates (Nos. 0 and 1); the operating band of the mobile station having the 5-MHz bandwidth ability has four candidates (Nos. 0 to 3); the operating band of the mobile station having the 2.5-MHz bandwidth ability has eight candidates (Nos. 0 to 7); and the operating band of the mobile station having the 1.25-MHz bandwidth ability has 16 candidates (Nos. 0 to 15).

FIG. 34(B) shows classification of the mobile stations having respective available bandwidths. In this case, ID Nos. 0 to 5 are assigned in the order from 1.25 MHz to 20 MHz.

The operating frequency band position of the mobile station is identified by including the candidate numbers of FIG. 34(A) and IDs of FIG. 34(B) in the location registration request and the paging request.

An algorithm is then proposed that identifies the operating frequency band position from the subscriber identification information IMSI and the above mobile station classes. The operating frequency band position is calculated from the subscriber identification information IMSI, the available frequency bandwidth Bn of the mobile station, the unique frequency bandwidth MBnb of the base station, the operating frequency band position number Ps identifying the operating frequency band position, and the number of incoming groups Npi of the packet indicator as follows.

$$\text{number of candidates for shifted frequency position} \\ (Ns) = MBnb/Bn \quad \text{(Eq. 27)}$$

$$\text{shifted frequency position number } (Ps) = IMSI/Npi \\ \mod Ns \quad \text{(Eq. 28)}$$

If the subscriber identification information IMSI and the ID indicating the available frequency bandwidth of the mobile station are included in the location registration request and the paging request, the operating frequency band position of the mobile station can be identified with the above calculating equations in the base station and the mobile station.

Figure 35:
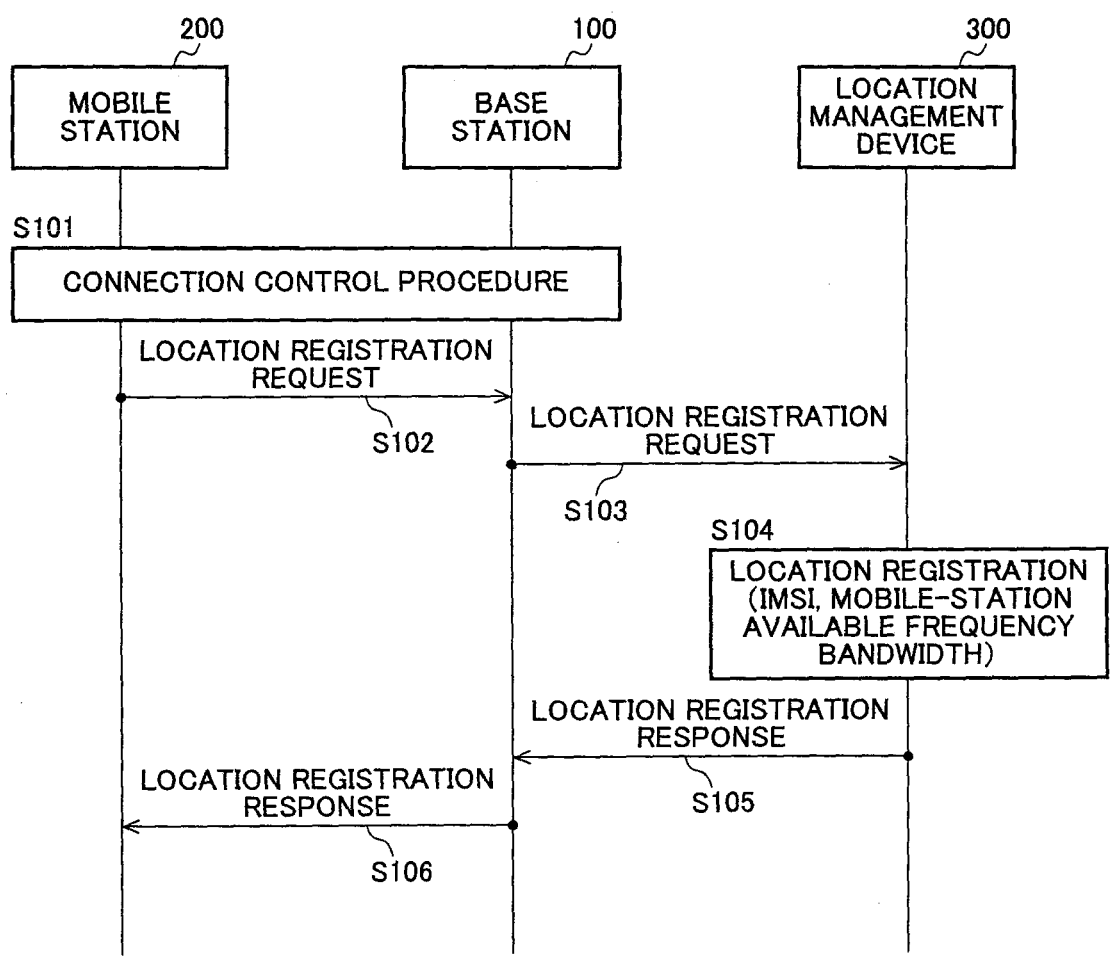
FIG. 35 is a view for explaining an example of a procedure of location registration according to the present invention.

FIG. 35 is a view for explaining a procedure of location registration according to the present invention.

The mobile station 200 performs the attach/location registration process at the time of power-on, at the time of location registration area update, and when a location registration period has been expired.

First, a radio bearer is set between the base station 100 and the mobile station 200 in accordance with a connection control procedure (S101). After the connection control procedure is completed, the mobile station 200 sends out a location registration request through the base station 100 to the location management device 300 (S102, S103). This location registration request includes the subscriber identification information and the available frequency bandwidth of the mobile station 200.

When receiving the location registration request, the location management device 300 registers the subscriber identification information (IMSI) and the available frequency bandwidth and the location registration area of the mobile station 200 into the location management database (S104). The location management device 300 returns a location registration response to the mobile station 200 (S105, S106). Temporary subscriber identification information TMSI may be allocated through this location registration response. The authentication, the exchange of the private key, etc., are concurrently performed in this location registration procedure.

Figure 36:
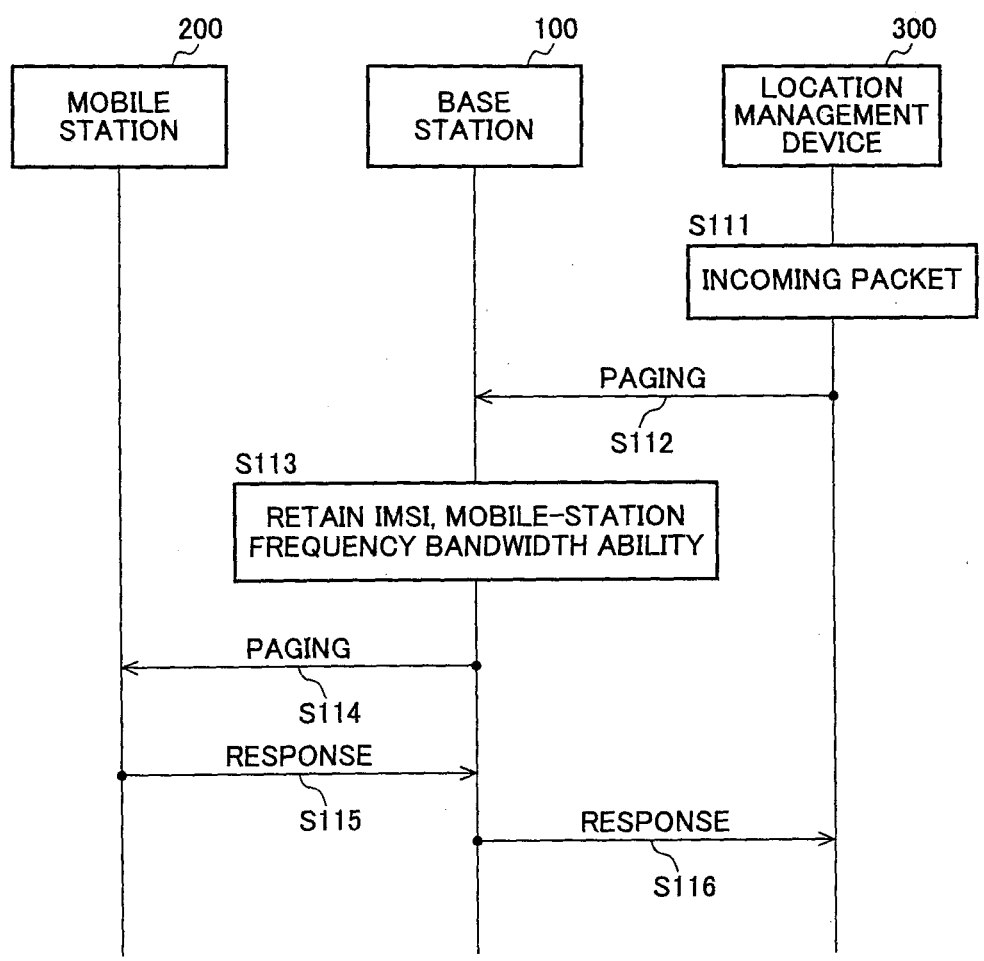
FIG. 36 is a view for explaining a procedure of paging according to the present invention.
Figure 37:
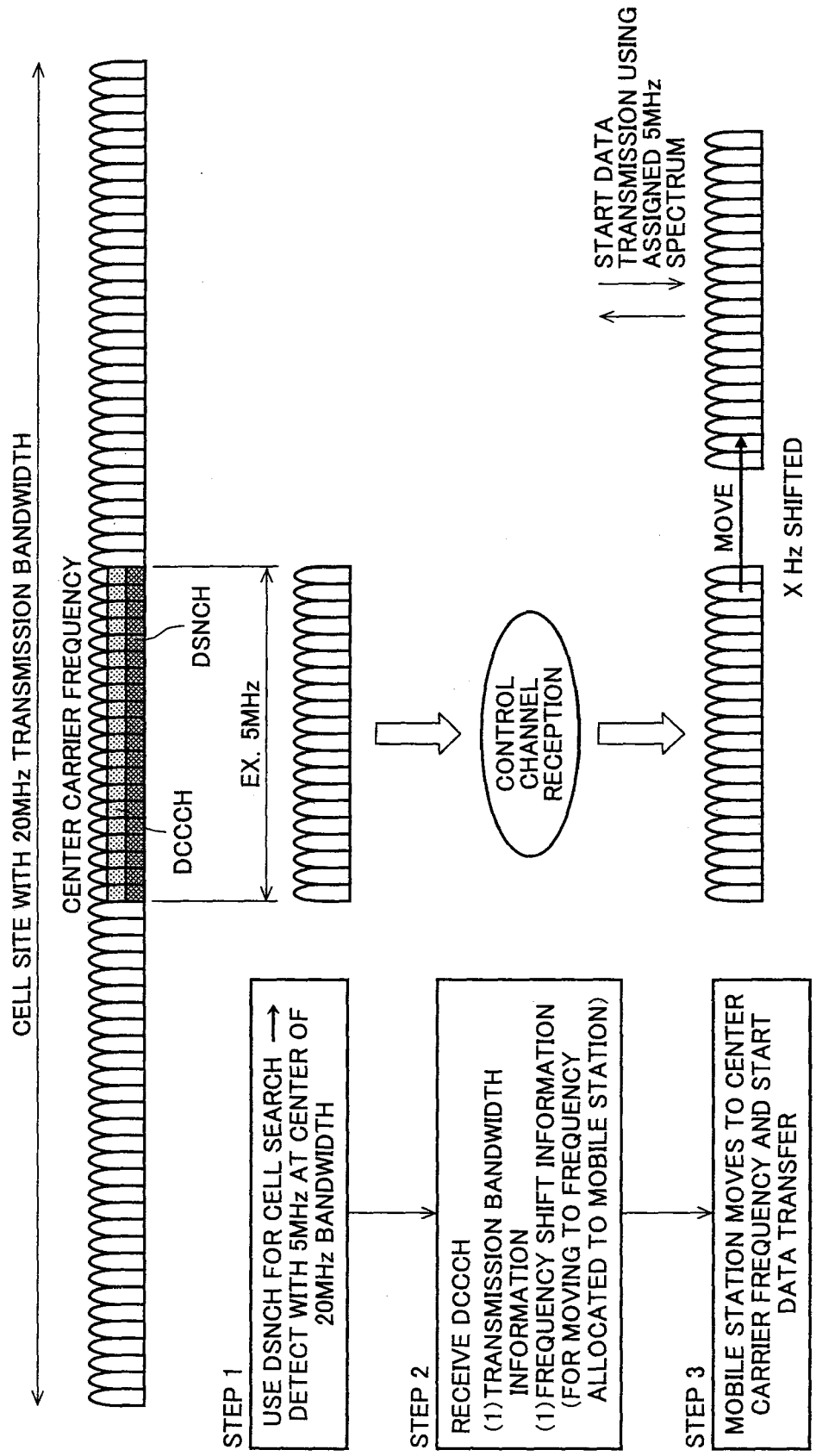
FIG. 37 is a view for explaining an example of a conventional method of specifying the operating frequency band position.
Figure 38:
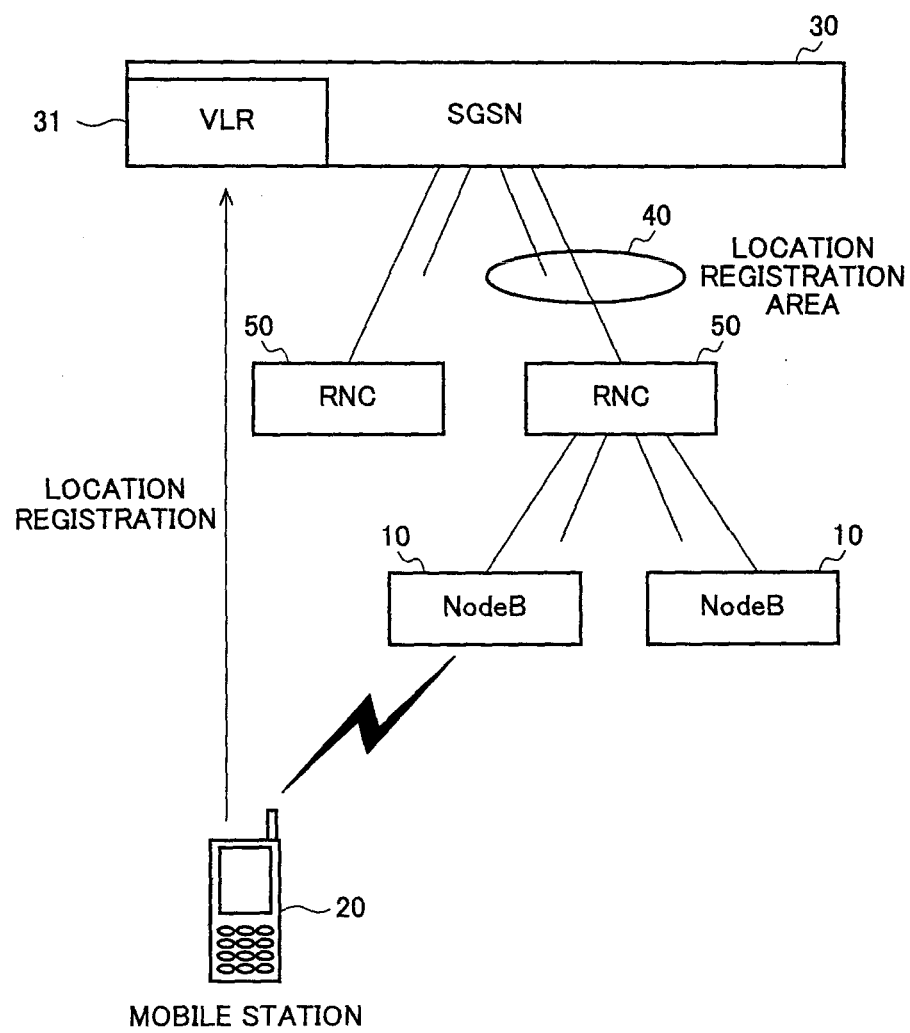
FIG. 38 is a view for explaining a movement management method of the W-CDMA mode.
Figure 39:
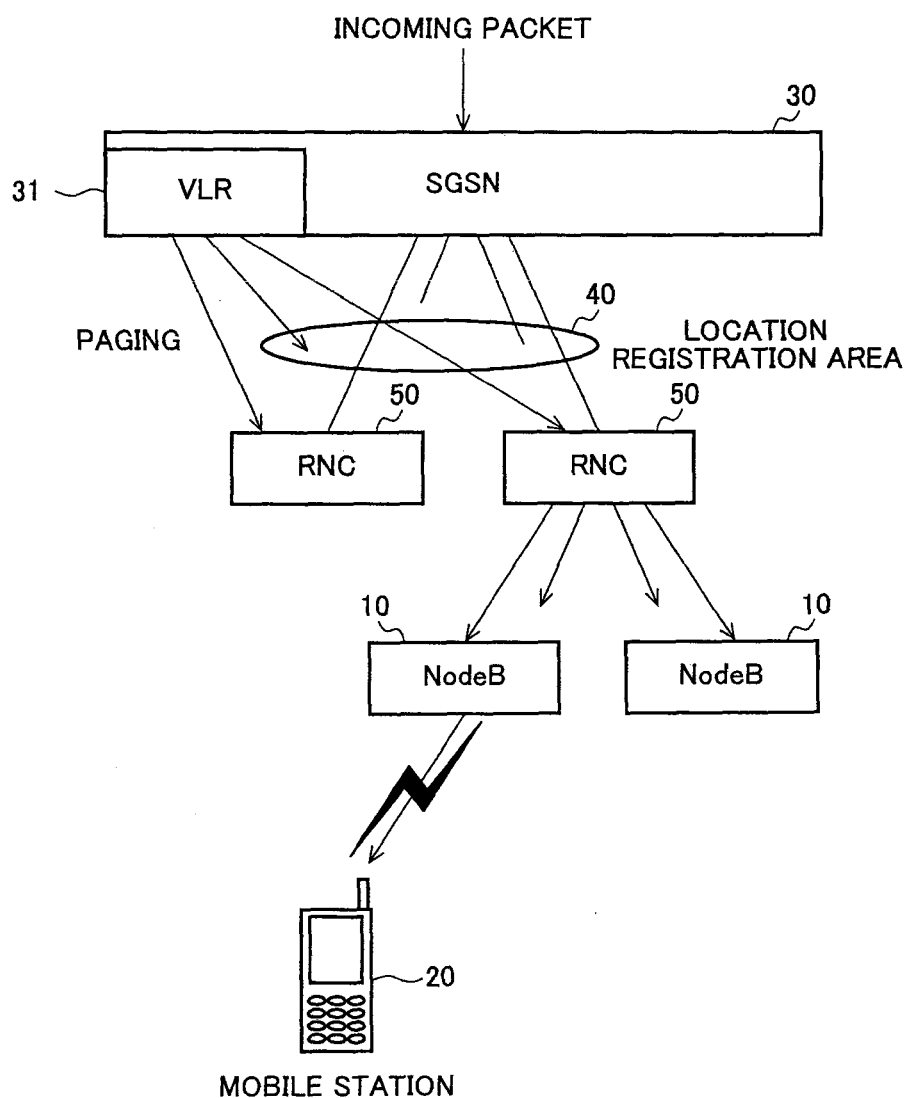
FIG. 39 is a view for explaining an example of a process procedure of paging.

FIG. 36 is a view for explaining a procedure of paging according to the present invention.

When receiving an incoming packet to the mobile station 200 (S111), the location management device 300 acquires the subscriber identification information of the destination mobile station 200 of the packet and the available frequency bandwidth and the location registration area of the mobile station 200 from the location management database and sends out a paging request including the subscriber identification information (IMSI) and the available frequency bandwidth of the mobile station to the base station of the location registration area (S112).

When receiving the paging request, the base station 100 calculates and retains the operating frequency band position of the mobile station 200 from the subscriber identification information and the available frequency bandwidth of the mobile station 200 (S113) and transmits the packet of the paging request at the operating frequency band position (S114).

When receiving the paging request at the own operating frequency band position, the mobile station 200 sends out a response to the location management device 300 (S115, S116).

Although the available frequency bandwidth of the mobile station 200 is registered in the location management device 300 in the description of FIGS. 35 and 36, the operating frequency band position of the mobile station 200 may be registered.

A program operating in the base station device, the mobile station device, and the location management device related to the present invention is a program controlling a CPU, etc., (program driving a computer to implement functions) such that the location registration method and the paging method of the mobile station related to the present invention are executed. The information handled by these devices is temporarily accumulated in a RAM at the time of process, subsequently stored in various ROMs and HDD, and read and modified/rewritten by the CPU as needed.

A recording medium having the program stored thereon may be any one of a semiconductor medium (e.g., ROM, nonvolatile memory card), an optical recording medium (e.g., DVD, MO, MD, CD, BD), a magnetic recording medium (e.g., magnetic tape, flexible disc), etc.

Although the functions of the above embodiment are implemented by executing the loaded program, the functions of the present invention may also be implemented by executing processes based on instructions of the program in conjunction with an operating system or other application programs.

When distributing to the market, the program can be stored and distributed in a portable recording medium or can be transferred to a server computer connected through a network such as the internet. In this case, a storage device of the server computer is also included in the recording medium of the present invention.

What is claimed:

1. A communication method used in a mobile communication system having a shared control signaling channel and a shared data channel in a same slot located within a communication frame, wherein a packet specified by the shared control signaling channel is arranged in the shared data channel, the method comprising:

transmitting, from a base station, a signal indicating that paging information to a mobile station is included in the shared data channel of the slot, the slot being specified based on identification information of a mobile station, using the shared control signaling channel arranged at the head of the specified slot, and in an idle mode of the mobile station, discontinuously receiving at the mobile station the signal indicating that the paging information to the mobile station is included in the shared data channel.

2. The communication method as defined in claim 1, wherein a slot number for the specified is specified by, (X/Y) mod Z, where X is the identification information of the mobile station, Y is a total number of paging groups, and Z is a total number of paging slots.

3. The communication method as defined in claim 1, wherein the identification information of the mobile station is IMSI.

4. A mobile station used in a mobile communication system having a shared control signaling channel and a shared data channel in a same slot located within a communication frame, wherein a packet specified by the shared control signaling channel is arranged in the shared data channel, comprising:

circuitry that receives and interprets a signal from a base station, the signal indicating that paging information to the mobile station is included in the shared data channel of the slot, the slot being specified based on identification information of the mobile station, using the shared control signaling channel arranged at the head of the specified slot, wherein when in an idle mode the mobile station receives discontinuously the signal indicating that the paging information to the mobile station is included in the shared data channel.

5. The mobile station as defined in claim 4, wherein a slot number for the specified is specified by (X/Y) mod Z, where X is the identification information of the mobile station, Y is a total number of paging groups, and Z is a total number of paging slots.

6. The mobile station as defined in claim 4, wherein the identification information of the mobile station is IMSI.

7. A base station used in a mobile communication system having a shared control signaling channel and a shared data channel in a same slot located within a communication frame, wherein a packet specified by the shared control signaling channel is arranged in the shared data channel, the base station comprising:

circuitry that generates and controls transmission of a signal indicating that paging information to a mobile station is included in the shared data channel of the slot, the slot being specified based on identification information of the mobile station, using the shared control signaling channel arranged at the head of the specified slot.

8. The base station as defined in claim 7, wherein a slot number for the specified is specified by (X/Y) mod Z, where X is the identification information of the mobile station, Y is a total number of paging groups, and Z is a total number of paging slots.

9. The base station as defined in claim 7, wherein the identification information of the mobile station is IMSI.

* * * * *